US012560675B2

(12) United States Patent
Feigl et al.

(10) Patent No.: US 12,560,675 B2
(45) Date of Patent: Feb. 24, 2026

(54) ROBUST TOA-ESTIMATION USING CONVOLUTIONAL NEURAL NETWORKS (OR OTHER FUNCTION APPROXIMATIONS) ON RANDOMIZED CHANNEL MODELS

(71) Applicant: Fraunhofer-Gesellschaft zur Förderung der angewandten Forschung e.V., Munich (DE)

(72) Inventors: Tobias Feigl, Erlangen (DE); Ernst Eberlein, Erlangen (DE); Christopher Mutschler, Erlangen (DE); Sebastian Kram, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 279 days.

(21) Appl. No.: 18/333,650

(22) Filed: Jun. 13, 2023

(65) Prior Publication Data

US 2023/0324501 A1 Oct. 12, 2023

Related U.S. Application Data

(63) Continuation of application No. PCT/EP2021/084463, filed on Dec. 6, 2021.

(30) Foreign Application Priority Data

Dec. 14, 2020 (DE) ..................... 10 2020 215 852.5

(51) Int. Cl.
*G01S 5/02* (2010.01)
*G06N 3/0464* (2023.01)
*G06N 3/08* (2023.01)

(52) U.S. Cl.
CPC .......... *G01S 5/0278* (2013.01); *G01S 5/0273* (2013.01); *G06N 3/0464* (2023.01); *G06N 3/08* (2013.01)

(58) Field of Classification Search
None
See application file for complete search history.

(56) References Cited

U.S. PATENT DOCUMENTS 5,812,083 A * 9/1998 Johnson .................. G01S 7/021
342/13
6,493,380 B1 * 12/2002 Wu .......................... G01S 5/011
342/417

(Continued)

FOREIGN PATENT DOCUMENTS

CA 2 540 152 A1 4/2005
WO 2020/205648 A1 10/2020

OTHER PUBLICATIONS

International Search Report and Written Opinion issued in application No. PCT/EP2021/084463.

(Continued)

*Primary Examiner* — Bernarr E Gregory
(74) *Attorney, Agent, or Firm* — McClure, Qualey & Rodack, LLP

(57) ABSTRACT

Methods and systems related to neural networks or other function approximators operate for training a neural network is provided, or another function approximator, for inferring a predetermined time of arrival of a predetermined transmitted signal on the basis of channel-impulse-responses, CIRs, of transmitted signals between a mobile antenna and a fixed antenna, the method having: obtaining a channel impulse response condition characteristic, CIRCC, descriptive of channel impulse responses of transmitted signals associated with mobile antenna positions within a reach of the fixed antenna; generating, by simulation, a training set of (Continued)

simulated CIRs which are associated with different times of arrival in one or more simulated scenes, and which fit to the CIRCC; training the neural network, or other function approximator, using the simulated CIRs and the different associated times of arrivals to obtain a parametrization of the neural network, or other function approximator, associated with the CIRCC.

35 Claims, 33 Drawing Sheets

(56) References Cited

U.S. PATENT DOCUMENTS

| | | | | |
|---|---|---|---|---|
| 6,510,186 | B1 * | 1/2003 | Chen | H04L 25/0202 |
| | | | | 375/343 |
| 7,627,063 | B2 | 12/2009 | Hofmann et al. | |
| 8,259,829 | B2 * | 9/2012 | Rodero | H04B 1/7183 |
| | | | | 375/259 |
| 10,051,423 | B1 * | 8/2018 | Feinmesser | H04W 40/12 |
| 11,041,948 | B2 * | 6/2021 | Shahar-Doron | H04L 25/0228 |
| 11,671,793 | B2 * | 6/2023 | He | G01S 11/08 |
| | | | | 455/456.1 |
| 12,015,452 | B2 * | 6/2024 | Marshall | G01S 5/0236 |
| 2005/0113042 | A1 * | 5/2005 | Felter | H01Q 3/30 |
| | | | | 455/121 |
| 2009/0046792 | A1 * | 2/2009 | Xu | H04L 25/0204 |
| | | | | 375/316 |
| 2013/0005358 | A1 * | 1/2013 | Medapalli | G01S 5/14 |
| | | | | 455/456.2 |
| 2016/0249316 | A1 * | 8/2016 | Kudekar | G01S 5/0284 |
| 2017/0207931 | A1 * | 7/2017 | Gul | H04L 25/0224 |
| 2018/0129918 | A1 | 5/2018 | Wang et al. | |
| 2020/0116817 | A1 | 4/2020 | Chuo et al. | |

OTHER PUBLICATIONS

Niitsoo, A., et al.; "Convolutional neural networks for position estimation in TDoA-based locating systems;" 2018 International Conference on Indoor Positioning and Indoor Navigation; Sep. 2018; pp. 1-8.

3GPP Radio Access Network Working Group, et al.; "Study on channel model for frequencies from 0.5 to 100 GHz (release 16);" tech. rep., 3GPP TR 38.901, V16.1.0; Dec. 2019; pp. 1-101.

Xiao, J., et al.; "A survey on wireless indoor localization from the device perspective;" ACM Computing Surveys; vol. 49; No. 2; Jun. 2016; pp. 1-31.

Mendoza-Silva, G.M.,et al.; "A meta-review of indoor positioning systems;" Sensors, vol. 19, No. 20; 2019; pp. 4507-4531.

Rovnakova, J., et al.; "ToA estimation and data association for through-wall tracking of moving targets," J. Wireless Communic. and Networking (EURASIP), vol. 2010, No. 1; 2010; pp. 1-11.

Zafari, F., et al.; "A survey of indoor localization systems and technologies;" IEEE Communic. Surveys & Tutorials, vol. 21, No. 3; Jan. 2019; pp. 1-32.

Radiocommunication Sector of ITU (ITI-R)—Spectrum Management; "Comparison of time-difference-of-arrival and angle-of-arrival methods of signal geolocation," tech. rep., SM.2211-2; Jun. 2018; pp. 1-40.

Guvenc, I., et al.; "A survey on ToA based wireless localization and NLOS mitigation techniques;" IEEE Communic. Surveys & Tutorials, vol. 11, No. 3; 2009; pp. 107-124.

Alavi, B., et al.; "Modeling of the distance error for indoor geolocation;" IEEE Wireless Communic. and Networking; 2003; pp. 668-672.

He, Z., et al.; "Improved high resolution ToA estimation for OFDM-WLAN based indoor ranging;" IEEE Wireless Communic. Letters, vol. 2, No. 2; Apr. 2013; pp. 163-166.

Li, X., et al.; "Super-resolution ToA estimation with diversity for indoor geolocation;" IEEE Trans. on Wireless Communic., vol. 3, No. 1; Jan. 2004; pp. 224-234.

Li, H., et al.; Fast estimation method of space-time two-dimensional positioning parameters based on Hadamard product; J. Antennas and Propagation, vol. 2018, No. 1; 2018; pp. 1-9.

Guvenc, I., et al.; "Ultra-wideband range estimation: Theoretical limits and practical algorithms;" Intl. Conf. on Ultra-Wideband, vol. 3; Oct. 2008; pp. 93-96.

Guvenc, I., et al.; "Joint ToA estimation and localization technique for UWB sensor network applications;" Vehicular Technology Conf.; 2007; pp. 1574-1578.

Stoica, L., et al.; "A low-complexity noncoherent IR-UWB transceiver architecture with ToA estimation;" Trans. On Microwave Theory and Techniques, vol. 54, No. 4; Apr. 2006; pp. 1637-1646.

Falsi, C., et al.; "Time of arrival estimation for UWB localizers in realistic environments;" J. Advances in Signal Processing (EURASIP), vol. 2006, No. 1; 2006; pp. 32-82.

Dardari, D., et al.; "Threshold-based time-of-arrival estimators in UWB dense multipath channels;" IEEE Trans. On Communic., vol. 56, No. 8; 2008; pp. 1366-1378.

Lee, J.Y., et al.; "Ranging in a dense multipath environment using an UWB radio link;" Selected Areas in Communications, vol. 20, No. 9; Dec. 2002; pp. 1677-1683.

Richter, A .; "Estimation of radio channel parameters: Models and algorithms;" 2005; pp. 1-214.

Pourkhaatoun, M., et al.; "A review on ToA estimation techniques and comparison;" Handbook of Position Location: Theory, Practice, and Advances; 2011; pp. 213-243.

Van Der Veen, A.J., et al.; "Joint angle and delay estimation using shift-invariance techniques;" IEEE Trans. On Signal Processing, vol. 46, No. 2; Feb. 1998; pp. 405-418.

Jin, Y., et al.; "Indoor localization with channel impulse response based fingerprint and nonparametric regression;" IEEE Trans. on Wireless Communic., vol. 9, No. 3; 2010; pp. 1120-1127.

Niitsoo, A., et al.; "A Deep learning approach to position estimation from channel impulse responses;" J. Sensors, vol. 19, No. 1064; 2019; pp. 1-24.

Vaghefi, S.Y.M., et al.; "A novel multilayer network model for ToA-based localization in wireless sensor networks", in Proc. Int. Conf. Neural Networks; 2011; pp. 3079-3084.

Singh, P., et al.; "TDOA based node localization in WSN using neural networks;" Proc. Intl. Conf. Communication Systems and Network Technologies; 2013; pp. 400-404.

Chen, C.S.; "Artificial neural network for location estimation in wireless communication systems;" Sensors, vol. 12, No. 1; 2012; pp. 2798-2817.

Yu, L. et al.; "Fingerprinting localization based on neural networks and ultra-wideband signals;" Proc. Intl. Symp. Signal Processing and Information Technology; 2011; pp. 184-189.

Kram, S., et al.; "UWB Channel Impulse Responses for Positioning in Complex Environments: A Detailed Feature Analysis;" J. Sensors, vol. 24, No. 1, 2019; pp. 1-26.

Li, W., et al.; "Experimental researches on an UWB NLOS identification method based on machine learning;" Proc. Intl. Conf. Comm. Tech.; 2013; pp. 473-477.

Savic, V., et al.; "Kernel methods for accurate UWB-based ranging with reduced complexity;" IEEE Trans. Wireless Communic., vol. 15, No. 3; Nov. 2015; pp. 1783-1793.

Cui, X.R., et al.; "Threshold selection for ultrawideband ToA estimation based on neural networks;" J. Networks, vol. 7, No. 9; Sep. 2012; pp. 1311-1318.

Ergut, S., et al.; "Localization via TDOA in a UWB sensor network using neural networks;" Proc. Intl. Conf. Communic.; 2008; pp. 2398-2403.

Guvenc, I., et al.; "NLOS identification and weighted least-squares localization for UWB systems using multipath channel statistics;" J. Advances in Signal Processing (EURASIP), vol. 2008, No. 1; 2007; pp. 30-39.

Wang, X., et al.; "Csi-based fingerprinting for indoor localization: A deep learning approach;" IEEE Trans. Vehicular Technology, vol. 66, No. 1; 2017; pp. 763-776.

(56)           References Cited

OTHER PUBLICATIONS

Wang, X., et al.; "Cifi: Deep convolutional neural networks for indoor localization with 5 GHz Wi-Fi", in Proc. Intl. Conf. Communic.; 2017; pp. 1-6.

Tiemann, J., et al.; "Ultra-wideband antenna-induced error prediction using deep learning on channel response data;" Proc. Vehic. Techn. Conf.; 2017; pp. 1-5.

Comiter, M.Z., et al.; "A structured deep neural network for data driven localization in high frequency wireless networks;" Intl. J. Computer Networks and Comm., vol. 9, No. 1; May 2017; pp. 21-39.

Xiao, C., et al.; "3-d BLE indoor localization based on denoising autoencoder;" IEEE Access, vol. 5, No. 1; 2017; pp. 12751-12760.

Stahkle, M., et al.; "NLOS detection using UWB channel impulse responses and convolutional neural networks", in Intl. Conf. on Localization and GNSS; 2020; pp. 1-6.

Shi, H., et al.; "A TDOA technique with super-resolution based on the volume cross-correlation function;" IEEE Trans. on Signal Processing, vol. 64, No. 21; Nov. 201;5; pp. 5682-5695.

Wang, R., et al.; "Enabling superresolution parameter estimation for mm-wave channel sounding;" IEEE Trans. on Wireless Communic., vol. 19, No. 5; 2020; pp. 3077-3090.

Vidal, J., et al.; "High resolution time-of-arrival detection for wireless positioning systems;" Proc. Intl. Conf. Vehicular Technology; 2002; pp. 2283-2287.

Fertig, L.B., et al.; "Instantaneous frequency estimation using linear prediction with comparisons to the DESAs;" IEEE Signal Processing Letters, vol. 3, No. 2; Feb. 1996; pp. 54-56.

Winter, J., et al.; "High resolution estimation of the time of arrival for GSM location;" Proc. Intl. Conf. Vehicular Technology; 2000; pp. 1343-1347.

Vidal, J., et al.; "First arriving path detection for subscriber location in mobile communication systems;" Intl. Conf. Acoustics, Speech, and Signal Processing; 2002; pp. 2721-2733.

Jakobsson, A., et al.; "Subspace-based estimation of time delays and doppler shifts;" IEEE Trans. on Signal Processing, vol. 46, No. 9; 1998; pp. 2472-2483.

Hanssens, B., et al.; "An extension of the RiMAX multipath estimation algorithm for ultra-wideband channel modeling;" Wireless Communic. and Networking, vol. 2018, No. 1; 2018; pp. 164-176.

Salmi, J., et al.; "Enhanced tracking of radio propagation path parameters using state-space modeling;" European Signal Processing Conf.; 2006; pp. 1-5.

Jaeckel, S., et al.; "QuaDRiGa: A 3-D multi-cell channel model with time evolution for enabling virtual field trials;" IEEE Trans. on Antennas and Propagation, vol. 62, No. 6; Jun. 2014; pp. 3242-3256.

Haneda, K., et al.; "5G 3GPP-like channel models for outdoor urban microcellular and macrocellular environments;" Vehicular Technology Conf. (VTC); Feb. 2016; pp. 1-7.

Grun, T.V.D., et al.; "A real-time tracking system for football match and training analysis;" Microelectronic Systems; 2011; pp. 199-212.

Feigl, T., et al.; "RNN-aided human velocity estimation from a single IMU;" Sensors, vol. 20, No. 13; 2020; pp. 3656-3690.

Feigl, T., et al.; "Recurrent neural networks on drifting time-of-flight measurements;" Intl. Conf. Ind. Positioning and Ind. Navigation; Sep. 2018; pp. 1-8.

Feigl, T., et al.; "A bidirectional LSTM for estimating dynamic human velocities from a single IMU;" Intl. Conf. Indoor Positioning and Indoor Nav.; Oct. 2019; pp. 1-8.

Bai, S., et al.; "An empirical evaluation of generic convolutional and recurrent networks for sequence modeling;" arXiv:1803.01271; Apr. 2018; pp. 1-14.

Vapnik, V.N.; "An overview of statistical learning theory;" Trans. Neural Networks, vol. 10, No. 5; Sep. 1999; pp. 988-999.

Pelletier, C., et al.; "Temporal convolutional neural network for the classification of satellite image time series;" J. Remote Sensing, vol. 11, No. 5; 2019; pp. 523-548.

Wang, P., et al.; "Temporal pyramid pooling-based convolutional neural network for action recognition;" IEEE Trans. Circuits and Systems for Video Technology, vol. 27, No. 12; Apr. 2015; pp. 2613-2622.

Kingma, D.P., et al.; "Adam: A method for stochastic optimization;" arXiv:1412.6980; Dec. 2014; pp. 1-9.

Williams, D.B.; "Detection: Determining the number of sources;" Boca Raton, FL: CRC Press Inc.; 1999; pp. 1-11.

Pillai, S.U., et al.; "Forward/backward spatial smoothing techniques for coherent signal identification;" IEEE Trans. Acoustics, Speech, and Signal Processing, vol. 37, No. 1; Jan. 1989; pp. 8-15.

Potorti, F., et al.; "Evaluation of indoor localisation systems: Comments on the ISO/IEC 18305 standard;" Intl. Conf. Indoor Positioning and Indoor Nav.; Sep. 2018; pp. 1-7.

Jaeckel, S., et al.; "QuaDRiGa—Quasi Deterministic Radio Channel Generator, User Manual and Documentation;" Fraunhofer Heinrich Hertz Institute, Tech. Rep., v1.2.32-458; 2015; pp. 1-116.

Sun, H., et al.; "Deep Learning Based Preamble Detection and TOA Estimation;" 2019, IEEE Global Communications Conference (GLOBECOM), IEEE; Dec. 2019; pp. 1-6.

* cited by examiner

301

| | |
|---|---|
| -----○ | CIR |
| -------- | Corr |

302

NO MULTIPATH

LOW DELAY SPREAD

HIGH DELAY SPREAD

PDF (DS) FOR 3GPP

PDF (KF) FOR 3GPP

JOINT PDFS FOR UMI

JOINT PDFS FOR INF

SIMULATED DATA

REAL DATA

OVERVIEW OF INPUT VECTOR TYPES

73(73a)

INPUT TRANSFORMATION

ARCHITECTURE OF OUR 1D-CNN

HIGH KF, I.E., KF>10

LOW KF, I.E., KF<0

ALL KFS

KFS VERSUS TOA ERROR

PEAK

IFP

MUSIC

DL

Figure 14:
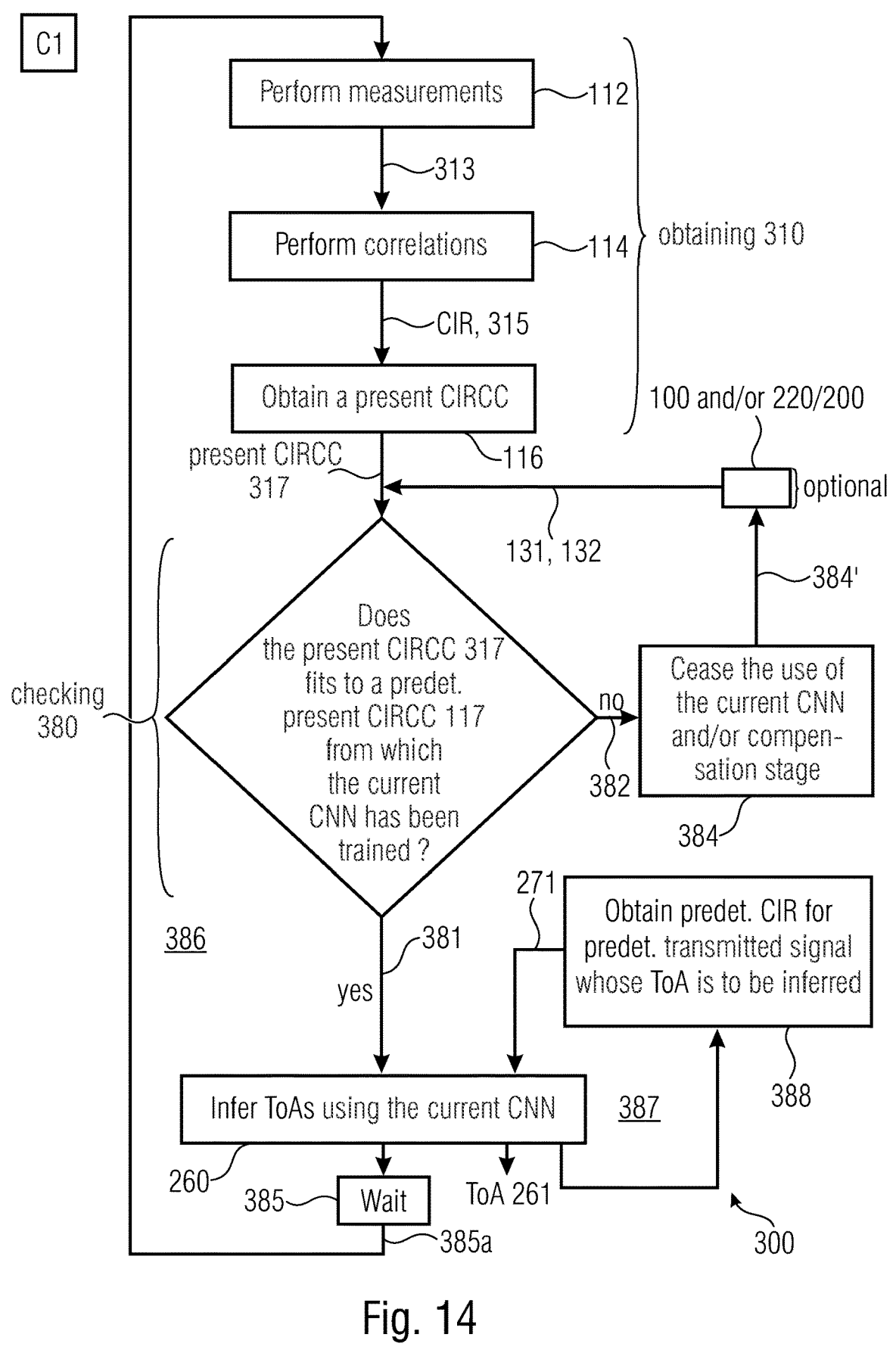

C1

Perform measurements — 112 ⎫
   ↓ — 313 ⎪
Perform correlations — 114 ⎬ obtaining 310
   ↓ — CIR, 315 ⎪
Obtain a present CIRCC — 116 ⎭ present CIRCC 317

100 and/or 220/200

⬜⬜ } optional 131, 132

384'

Does the present CIRCC 317 fits to a predet. present CIRCC 117 from which the current CNN has been trained ? — no → Cease the use of the current CNN and/or compensation stage checking 380

386

382

384 yes — 381

271 — Obtain predet. CIR for predet. transmitted signal whose ToA is to be inferred Infer ToAs using the current CNN    387

388

260

385 — Wait    ToA 261

ROBUST TOA-ESTIMATION USING CONVOLUTIONAL NEURAL NETWORKS (OR OTHER FUNCTION APPROXIMATIONS) ON RANDOMIZED CHANNEL MODELS

CROSS-REFERENCE TO RELATED APPLICATIONS

This application is a continuation of copending International Application No. PCT/EP2021/084463, filed Dec. 6, 2021, which is incorporated herein by reference in its entirety, and additionally claims priority from German Application No. 10 2020 215 852.5, filed Dec. 14, 2020, which is also incorporated herein by reference in its entirety.

FIELD

Herewith disclosed there are techniques for inferring times of arrivals and/or for training a neural network (or a function approximation) which is to be used for inferring times of arrivals (e.g., for ranging, positioning, etc.). For example, the invention refers to robust ToA-estimation using convolutional neural networks on randomized channel models.

BACKGROUND OF THE INVENTION

Radio-frequency (RF) positioning (ranging, locating) relies on systems that provide a geometric relation between the positions of transmitters and receivers. Recent 5G tele-communications standards [1] support positioning technologies based on radio access networks (RAN) that enables an efficient combination of communication and localization techniques. There are three principal approaches [9, 10]: angle-of-arrival (AoA), received-Signal-Strength (RSS), and time-of-flight (ToF). While AoA requires expensive directional antennas or antenna arrays [52, 64] and the RSS struggles from significant fluctuations over short distances and over time [38, 52, 54], ToF makes better use of the high bandwidth allocated to 5G services. This enables positional accuracy in the centimeter range under good propagation conditions. Since many applications require such positional accuracy, ToF-based systems are often the first choice [64].

In one possible RF (or more in general wireless) positioning system, multiple synchronized transceiver pipelines deliver sets of CIR (Channel Impulse Response) data. From each of that CIRs we estimate a ToA to multilaterate a position. An accurate and robust ToA estimate, if obtained, enables accurate radio-based Real-Time Locating Systems (RLTS). However, this remains a challenging task since there is usually a compromise between legal (or feasible) transmit power, available bandwidth, target coverage area, and consequently, the theoretically possible accuracy of the estimates.

FIG. 1 shows three scenarios that may impair measurements: A transmitter 145 (right) emits a radio burst 14 that travels through the environment and reaches different receivers (140-1 or RX1, 140-2 or RX2, 140-3 or RX3) (left), driving to different situations i.e., LoS (line-of-sight) 14/, NLOS (non-line-of-sight) 14n, and OLOS (obstructed-line-of-sight) 140. For the LoS case, estimating the ToA may require estimating the first and strongest peak in a channel impulse response (CIR): the direct path is ideally not affected by multipath components MPCs (or the MPCs arrive with a delay of more than 1/fSmin, where fSmin is the sampling frequency). In the known technology, there are some processes that at least theoretically permit to identify with some degree of reliability the correct FDPoA and ToA [28, 40]. However, in the OLOS and NLOS cases this path is impaired by effects that result from diffraction, weak signals, or reflection. While in the case of OLOS there may still be a direct path 14'o (which is very difficult to distinguish from MPC components 14"o and 14'''o), in the case of NLOS the first arriving path 14'n may be significantly delayed compared to the ToA of a LOS signal (as this first component may encounter many additional delays) (the ToA is not shown in FIG. 1 for the NLOS for receiver 140-2). In such cases it is extremely difficult to estimate the true ToA from the CIR. In practice, both the NLOS and OLOS cases are very common [46, 47], and therefore reliable solutions for obtaining them are pursued.

Previous work intends to estimate the ToA from multiple peaks in the CIR by selecting the maximum peak [36, 37], applying thresholds along with the SNR and power related to the strongest peak [31, 56] (PEAK), or by estimating the peak based on the maximum gradient along the first rising edge, i.e., inflection point method (IFP) [8]. However, such methods do not work well as multipath propagation violates their basic assumptions and as their performance also deteriorates with decreasing SNR. In addition, several high resolution ToA estimators have been examined, mainly in the frequency and time domain in multipath scenarios [30, 37, 45]. Such approaches include Multiple Signal Classification (MUSIC) [50, 51] and the Estimation of Signal Parameters via Rotational Invariance Technique (ESPRIT) [51, 57]. However, they require a-priori information about the channel and their computational complexity increases with an increasing number of paths [43, 50, 51], which makes them no longer applicable for (real-time) applications.

Recent deep learning (DL) approaches have been hypothesized which use convolutional neural networks (CNNs) [15, 16] to estimate the position directly from a series of CIRs. The basic assumption is in principle at least theoretically good, as the CIR (with its multitude of values corresponding to the different lags) is imagined to give some information regarding the environment. However, such methods only work for the environment for which they were trained and cannot generalize to different channel conditions.

Moreover, since during the initialization the mobile transmitter transmitting the signals from which the training dataset is obtained is in general not connected by cable to the receiver(s), it has been understood that synchronization errors in the data reception and in the consequent measurements can be caused. Hence, the training dataset of the NN is in general impaired by signalization errors, which will cause localization errors during operation.

Moreover, during the initialization, the mobile transmitter transmitting the signals from which the training dataset is obtained in general moves at a certain speed which is different from 0 (zero), hence impairing the measurements e.g. with errors due to motion fading and the fading effect. The following is noted:

Fading in general occurs due to the result of vector addition at any point in time of a signal wave received through the various (multi) paths. The phase cancellation (destructive) and addition (constructive) of the resulting received signal that takes place during vector addition in principle causes uncertainty in signal strength over small range changes on the order of wavelengths. Fading is expressed over time when people and/or objects move near the transmitter and receiver. The receiver must be able to handle the significant fluctuations in signal strength.

Motion fading: If the transmitter or receiver is in motion or if the physical environment changes (moving vehicles and people but also tree leaves flutter in the wind), so-called motion fading will occur over time, the amplitude and phase distortion as well as time and delay fluctuations. The receiver's automatic gain control (AGC), synchronization and demodulation circuitry cannot in general properly handle these effects. Fading that changes over time due to scattered objects or transmitter/receiver movements leads to Doppler spread. The time spreading effect of small-scale or microscopic fading (micro movements) manifests itself in the time domain as multipath delay spread. A temporal change in the path length causes the Doppler effect, which describes the shift of frequencies in the signal bandwidth.

Hence, the training dataset of the NN is in general impaired by motion fading errors, which will cause localization errors during operation.

Other issues are caused by clock shifts/drifts, which cause loss of synchronization. Moreover, the physical mountings of the antennas may move throughout the day as metal is expanding (e.g. by changes in temperature, wind, structural breakages, etc.).

All these impairments contribute to form unwanted noise.

Further, during the initialization, the mobile transmitter transmitting the signals from which the training dataset is obtained in general transmits the signals at specific (discrete) points, hence causing discretization errors. Hence, the training dataset of the NN is in general impaired by fading, which will cause localization errors during operation.

Moreover, the environment may in general change, either by virtue of human-made modifications (e.g. construction of buildings . . . ) or by natural causes (earthquakes, etc.), or by virtue of weather condition, seasonal conditions, climatic conditions, etc. The measurements are in general carried out at a particular day and time with a particular weather and climatic condition, and in case of different conditions some additional errors will imply the inference of the ToAs during operation. Also, the density of measurement points of the transmitter transmitting the signals from which the training dataset is obtained is in general determined manually. At least it is difficult to make sure that the measurements taken during the initialization are complete in terms of providing a picture of the environment, and do not over-represent—in terms of number of measurements—certain CIR variants over other CIR variants.

Moreover, the computational complexity often represents an important disadvantage, in particular when measurements are to be actually performed. Hence, it would be of advantage to reduce the computational effort.

SUMMARY

According to an embodiment, a method for classifying a mobile antenna, exchanging predetermined transmitted signals with a fixed antenna, on the basis of a predetermined channel impulse response, CIR, from which a time-of-arrival measurement is to be performed, may have the steps of: using a neural network or a function approximator (which comprises a multidimensional polynomial function that learns a fitting function) for inferring from the CIRs of the predetermined transmitted signals, times of arrival of the predetermined transmitted signals exchanged between the mobile antenna and the fixed antenna, determining, based on the times of arrival, or channel impulse response condition characteristic, CIRCC, which is descriptive of channel impulse responses of the transmitted signals exchanged between the mobile antenna and the fixed antenna, a movement profile of the mobile antenna, analyzing the movement profile of the mobile antenna in terms of plausibility, in case of the movement profile of the mobile antenna being plausible, classifying the mobile antenna to a first antenna group, in case of the movement profile of the mobile antenna not being plausible, classifying the mobile antenna to a second antenna group.

Another embodiment may have a non-transitory digital storage medium having stored thereon a computer program for performing a method for classifying a mobile antenna, exchanging predetermined transmitted signals with a fixed antenna, on the basis of a predetermined channel impulse response, CIR, from which a time-of-arrival measurement is to be performed, the method having the steps of: using a neural network or a function approximator (which comprises a multidimensional polynomial function that learns a fitting function) for inferring from the CIRs of the predetermined transmitted signals, times of arrival of the predetermined transmitted signals exchanged between the mobile antenna and the fixed antenna, determining, based on the times of arrival, or channel impulse response condition characteristic, CIRCC, which is descriptive of channel impulse responses of the transmitted signals exchanged between the mobile antenna and the fixed antenna, a movement profile of the mobile antenna, analyzing the movement profile of the mobile antenna in terms of plausibility, in case of the movement profile of the mobile antenna being plausible, classifying the mobile antenna to a first antenna group, in case of the movement profile of the mobile antenna not being plausible, classifying the mobile antenna to a second antenna group, when the computer program is run by a computer.

Still another embodiment may have a user equipment, UE, for inferring a predetermined time of arrival of a predetermined transmitted signal on the basis of channel-impulse-responses, CIRs, of transmitted signals between the UE and a fixed antenna, the UE including a mobile antenna and being configured for: intermittently obtaining a present channel impulse response condition characteristic, CIRCC, which is descriptive of CIRs of transmitted signals associated with UE positions within a reach of the fixed antenna; checking whether the present CIRCC fits to a predetermined present CIRCC with which a predetermined parametrization of a neural network, or a function approximator (which comprises a multidimensional polynomial function that learns a fitting function), is associated, and as long as the check reveals that the present CIRCC fits to the predetermined present CIRCC, inferring, using the neural network or the function approximator, parametrized using the predetermined parametrization, the predetermined time of arrival, and as soon as the present CIRCC no longer fits to the predetermined present CIRCC, cease the use of the neural network, or the function approximator, parametrized using the predetermined parametrization, for inferring the predetermined time of arrival, and/or initiate a compensation step in which the neural network, or the function approximator is analyzed and/or retrained.

A embodiment may have a system for classifying a mobile antenna, exchanging predetermined transmitted signals with a fixed antenna, on the basis of a predetermined channel-impulse-response, CIR, from which a time-of-arrival measurement is to be performed, the system having the fixed antenna and being configured for: using a neural network or a function approximator (which comprises a multidimensional polynomial function that learns a fitting function) for inferring, from the CIRs of the predetermined transmitted signals, times of arrival of the predetermined transmitted signals exchanged between the mobile antenna and the fixed antenna, determining, based on the time of arrival measurements, or channel impulse response condition characteristic, CIRCC, which is descriptive of channel impulse responses of the transmitted signals exchanged between the mobile antenna and the fixed antenna, a movement profile of the mobile antenna, analyzing the movement profile of the mobile antenna in terms of plausibility, in case of the movement profile of the mobile antenna being plausible, classifying the mobile antenna to a first antenna group, in case of the movement profile of the mobile antenna not being plausible, classifying the mobile antenna to a second antenna group.

In accordance to an example there is provided a method for training a neural network, or a function approximator (which comprises a multidimensional polynomial function that learns a fitting function), for inferring a predetermined time of arrival of a predetermined transmitted signal on the basis of channel-impulse-responses, CIRs, of transmitted signals between a mobile antenna and a fixed antenna, the method comprising: obtaining a channel impulse response condition characteristic, CIRCC, which is descriptive of channel impulse responses of transmitted signals associated with mobile antenna positions within a reach of the fixed antenna; generating, by simulation, a training set of simulated CIRs which are associated with different times of arrival in one or more simulated scenes, and which fit to the CIRCC; training the neural network, or the function approximator, using the simulated CIRs and the different associated times of arrivals so as to obtain a parametrization of the neural network, or the function approximator, associated with the CIRCC.

In accordance to an example there is provided a method for inferring a predetermined time of arrival of a predetermined transmitted signal on the basis of channel-impulse-responses, CIRs, of transmitted signals between a mobile antenna and a fixed antenna, the method comprising: obtaining a present channel impulse response condition characteristic, CIRCC, which is descriptive of channel impulse responses of transmitted signals associated with mobile antenna positions within a reach of the fixed antenna; selecting, using the present CIRCC, out of a plurality of parametrizations associated with CIRCCs, a predetermined parametrization fitting to the present CIRCC, and inferring, using a neural network, or a function approximator (which comprises a multidimensional polynomial function that learns a fitting function), parametrized using the predetermined parametrization, from the channel impulse response of the predetermined transmitted signal, the predetermined time of arrival.

In accordance to an example there is provided a method for inferring a predetermined time of arrival of a predetermined transmitted signal on the basis of channel-impulse-responses, CIRs, of transmitted signals between a mobile antenna and a fixed antenna, the method comprising: intermittently obtaining a present channel impulse response condition characteristic, CIRCC, which is descriptive of CIRs of transmitted signals associated with mobile antenna positions within a reach of the fixed antenna; checking whether the present CIRCC fits to a predetermined present CIRCC with which a predetermined parametrization of a neural network, or a function approximator (which comprises a multidimensional polynomial function that learns a fitting function), is associated, and as long as the check reveals that the present CIRCC fits to the predetermined present CIRCC, inferring, using the neural network or the function approximator, parametrized using the predetermined parametrization, the predetermined time of arrival, and as soon as the present CIRCC no longer fits to the predetermined present CIRCC, cease the use of the neural network, or the function approximator, parametrized using the predetermined parametrization, for inferring the predetermined time of arrival, and/or initiate a compensation step in which the neural network, or the function approximator is analyzed and/or retrained.

In accordance to an example there is provided a method for locating a mobile antenna, the method involving at least one fixed antenna and a neural network, or a function approximator (which comprises a multidimensional polynomial function that learns a fitting function), the method including: training a neural network, or the function approximator; inferring a time of arrival of a signal transmitted between the transmitting antenna and the at least one fixed antenna, by using the neural network, or the function approximator; inferring the position of the transmitting mobile antenna from time differences of arrival.

In accordance to an example there is provided a method for locating a mobile antenna, the method involving at least one fixed antenna and a neural network or a function approximator (which comprises a multidimensional polynomial function that learns a fitting function), the method including: using a method according to any of the previous examples, inferring, at a time of arrival of a signal transmitted between the mobile antenna and the at least one fixed antenna, by using a neural network or the function approximator, wherein the time of arrival is a relative time of arrival; synchronizing the relative time of arrival to obtain an absolute time of arrival; inferring the position of the transmitting mobile antenna from the absolute time of arrival.

In accordance to an example there is provided a method according to previous examples, the method involving a plurality of fixed antennas, wherein: inferring is instantiated for each antenna of the plurality of fixed antennas antenna of the plurality of fixed antennas, so as to obtain one relative time of arrival associated to each fixed antenna; synchronizing is instantiated for each fixed antenna of the plurality of fixed antennas, so as to obtain an absolute time of arrival associated to each fixed antenna; inferring includes comparing the absolute times of arrival associated to the plurality of fixed antennas to infer the position of the mobile antenna.

In accordance to an example there is provided a non-transitory storage storing instructions which, when executed by a processor, cause the processor to perform a method according to any of the precedent examples.

In accordance to an example there is provided a system for training a neural network, or a function approximator (which comprises a multidimensional polynomial function that learns a fitting function), for inferring a predetermined time of arrival of a predetermined transmitted signal on the basis of channel-impulse-responses, CIRs, of transmitted signals between a mobile antenna and a fixed antenna, the system comprising at least one fixed antenna, the system including: an obtaining unit configured for obtaining a channel impulse response condition characteristic, CIRCC, which is descriptive of channel impulse responses of transmitted signals associated with mobile antenna positions within a reach of the fixed antenna; a generating unit configured for generating, by simulation, a training set of simulated CIRs which are associated with different times of arrival in one or more simulated scenes, and which fit to the CIRCC; and a training unit configured for training the neural network, or the function approximator, using the simulated CIRs and the different associated times of arrivals so as to obtain a parametrization of the neural network, or the function approximator, associated with the CIRCC.

In accordance to an example there is provided a system for inferring a predetermined time of arrival of a predetermined transmitted signal on the basis of channel-impulse-responses, CIRs, of transmitted signals between a mobile antenna and a fixed antenna, the system including at least one predetermined fixed antenna, the system being parametrized by: obtaining a present channel impulse response condition characteristic, CIRCC, which is descriptive of channel impulse responses of transmitted signals associated with mobile antenna positions within a reach of the fixed antenna; and selecting, using the present CIRCC, out of a plurality of parametrizations associated with CIRCCs, a predetermined parametrization fitting to the present CIRCC, the system being configured, for inferring, using a neural network, or a function approximator (which comprises a multidimensional polynomial function that learns a fitting function), parametrized using the predetermined parametrization, from the channel impulse response of the predetermined transmitted signal, the predetermined time of arrival, wherein the predetermined transmitted signal is between the at least one predetermined fixed antenna and a predetermined mobile antenna.

In accordance to an example there is provided a user equipment, UE, for inferring a predetermined time of arrival of a predetermined transmitted signal between the UE and a fixed antenna on the basis of channel-impulse-responses, CIRs, of transmitted signals, the UE including at least one mobile antenna, the UE using a neural network, or a function approximator (which comprises a multidimensional polynomial function that learns a fitting function), parametrized by: obtaining a present channel impulse response condition characteristic, CIRCC, which is descriptive of channel impulse responses of transmitted signals associated with mobile antenna positions within a reach of the fixed antenna; and selecting, using the present CIRCC, out of a plurality of parametrizations associated with CIRCCs, a predetermined parametrization fitting to the present CIRCC, the UE being configured for inferring, using the neural network, or the function approximator, parametrized using the predetermined parametrization, from the channel impulse response of the predetermined transmitted signal, the predetermined time of arrival.

In accordance to an example there is provided a system for inferring a predetermined time of arrival of a predetermined transmitted signal on the basis of channel-impulse-responses, CIRs, of transmitted signals between a mobile antenna and a fixed antenna, the system including the fixed antenna and being configured for: intermittently obtaining a present channel impulse response condition characteristic, CIRCC, which is descriptive of CIRs of transmitted signals associated with mobile antenna positions within a reach of the fixed antenna; checking whether the present CIRCC fits to a predetermined present CIRCC with which a predetermined parametrization of a neural network, or a function approximator (which comprises a multidimensional polynomial function that learns a fitting function), is associated, and as long as the check reveals that the present CIRCC fits to the predetermined present CIRCC, inferring, using the neural network or the function approximator, parametrized using the predetermined parametrization, the predetermined time of arrival, and as soon as the present CIRCC no longer fits to the predetermined present CIRCC cease the use of the neural network, or the function approximator, parametrized using the predetermined parametrization, for inferring the predetermined time of arrival, and/or initiate a compensation step in which the neural network, or the function approximator is analyzed and/or retrained.

In accordance to an example there is provided a user equipment, UE, for inferring a predetermined time of arrival of a predetermined transmitted signal on the basis of channel-impulse-responses, CIRs, of transmitted signals between the UE and a fixed antenna, the UE including a mobile antenna and being configured for: intermittently obtaining a present channel impulse response condition characteristic, CIRCC, which is descriptive of CIRs of transmitted signals associated with UE positions within a reach of the fixed antenna; checking whether the present CIRCC fits to a predetermined present CIRCC with which a predetermined parametrization of a neural network, or a function approximator (which comprises a multidimensional polynomial function that learns a fitting function), is associated, and as long as the check reveals that the present CIRCC fits to the predetermined present CIRCC, inferring, using the neural network or the function approximator, parametrized using the predetermined parametrization, the predetermined time of arrival, and as soon as the present CIRCC no longer fits to the predetermined present CIRCC, cease the use of the neural network, or the function approximator, parametrized using the predetermined parametrization, for inferring the predetermined time of arrival, and/or initiate a compensation step in which the neural network, or the function approximator is analyzed and/or retrained.

In accordance to an example there is provided a system for classifying a mobile antenna, exchanging predetermined transmitted signals with a fixed antenna, on the basis of a predetermined channel-impulse-response, CIR, from which a time-of-arrival measurement (261) is to be performed, the system comprising the fixed antenna and being configured to: using a neural network or a function approximator (which comprises a multidimensional polynomial function that learns a fitting function) for inferring from the CIRs of the predetermined transmitted signals, times of arrival of the predetermined transmitted signals exchanged between the mobile antenna and the fixed antenna, determining, based on the time of arrival measurements, or channel impulse response condition characteristic, CIRCC, which is descriptive of channel impulse responses of the transmitted signals exchanged between the mobile antenna and the fixed antenna, a movement profile of the mobile antenna, analyzing the movement profile of the mobile antenna in terms of plausibility, in case of the movement profile of the mobile antenna being plausible, classifying the mobile antenna to a first antenna group, in case of the movement profile of the mobile antenna not being plausible, classifying the mobile antenna to a second antenna group.

In accordance to an example there is provided a user equipment, UE, including a mobile antenna, configured for exchanging predetermined transmitted signals with a fixed antenna, the UE being configured for performing a classification on the basis of a predetermined channel-impulse-response, CIR, from which a time-of-arrival measurement is to be performed, the UE being configured for: using a neural network or a function approximator (which comprises a multidimensional polynomial function that learns a fitting function) for inferring from the CIRs of the predetermined transmitted signals, times of arrival of the predetermined transmitted signals exchanged between the mobile antenna and the fixed antenna, determining, based on the time of arrival measurements, or channel impulse response condition characteristic, CIRCC, which is descriptive of channel impulse responses of the transmitted signals exchanged between the mobile antenna and the fixed antenna, a movement profile of the mobile antenna, analyzing the movement profile of the mobile antenna in terms of plausibility, in case of the movement profile of the mobile antenna being plausible, classifying the UE to a first antenna group, in case of the movement profile of the mobile antenna not being plausible, classifying the UE to a second antenna group.

In accordance to an example there is provided a system for locating a mobile antenna, the system including at least one fixed antenna and using a neural network, or a function approximator (which comprises a multidimensional polynomial function that learns a fitting function), trained according to previous examples, the system being configured for: inferring a time of arrival of a signal transmitted between the transmitting antenna and the at least one fixed antenna, by using the neural network, or the function approximator; and inferring the position of the transmitting mobile antenna from time differences of arrival.

In accordance to an example there is provided a system for locating a mobile antenna, the system including at least one fixed antenna and using a neural network or a function approximator (which comprises a multidimensional polynomial function that learns a fitting function), the system being configured for: by using a method according to previous examples, inferring, at a time of arrival of a signal transmitted between the mobile antenna and the at least one fixed antenna, by using a neural network or the function approximator, wherein the time of arrival is a relative time of arrival; synchronizing the relative time of arrival to obtain an absolute time of arrival; inferring the position of the transmitting mobile antenna from the absolute time of arrival.

In accordance to an example there is provided a user equipment, UE, including a mobile antenna, the UE using a neural network, or a function approximator (which comprises a multidimensional polynomial function that learns a fitting function), trained according to previous examples, the UE being configured for: inferring a time of arrival of a signal transmitted between the transmitting antenna and at least one fixed antenna, by using the neural network, or the function approximator; and inferring the position of the transmitting mobile antenna from time differences of arrival.

In accordance to an example there is provided a user equipment, UE, including a mobile antenna, the UE using a neural network, or function approximator (which comprises a multidimensional polynomial function that learns a fitting function), the UE being configured for: by using a method according to previous examples, inferring, at a time of arrival of a signal transmitted between the mobile antenna and the at least one fixed antenna, by using the neural network or the function approximator, wherein the time of arrival is a relative time of arrival; synchronizing the relative time of arrival to obtain an absolute time of arrival; inferring the position of the transmitting mobile antenna from the absolute time of arrival.

BRIEF DESCRIPTION OF THE DRAWINGS

Embodiments of the present invention will be detailed subsequently referring to the appended drawings, in which:

FIG. 14 shows a method checking the correctness of the neural network;

DETAILED DESCRIPTION OF THE INVENTION

Function Approximator

Figure 1:
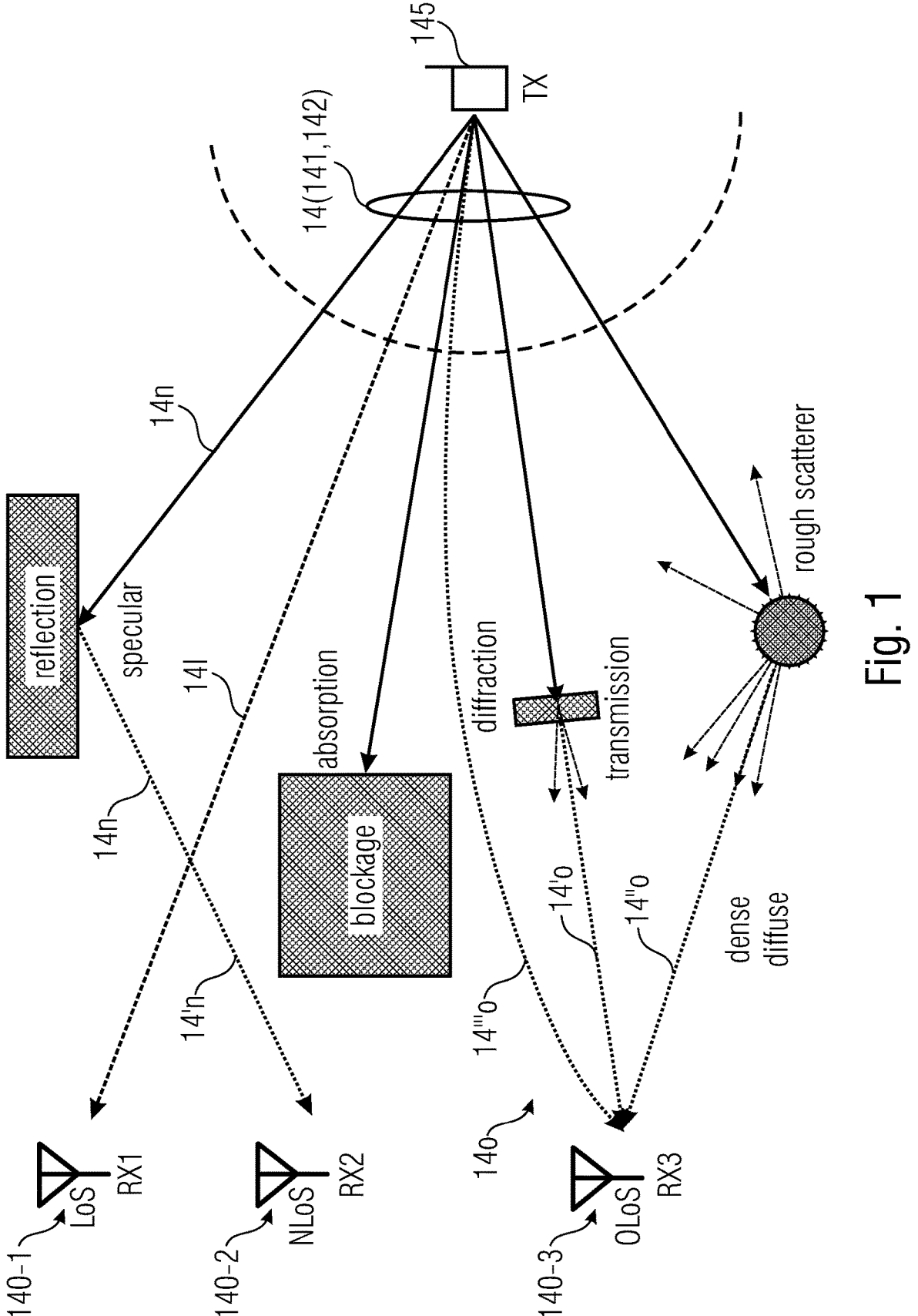
FIG. 1 shows multipath propagation scenarios with specular and dense multipaths and respective LoS, OLOS, and NLOS (red: affected; green: unaffected)

Here below reference is often made to a neural network (NN) or more specifically to a convolutional NN (CNN). It will be explained that the NN may be trained, so as to be used (e.g. subsequently) for inferring ToAs (it may be parametrized, retrained, etc.).

However, it is here noted that it is not necessary to use an NN, but it is more in general possible to use another learning function (which can also be trained, parametrized, retrained, etc.). Hence, in most of the subsequent examples it is not necessarily an NN to be used, but also another technique, e.g. based on a nonlinear function. For example, nonlinear functions may form a multidimensional polynomial function that learns a fitting function for a complex information. However, in the examples below which are specifically directed to CNNs, it is shown that functions as simple as CNNs are satisfactory.

In general terms, even if NNs (and more in the specific CNNs) are mentioned below (and are here considered to be particularly advantageous), it is maintained that the methods below more in general refer to the more general category of "function approximators", which encompass both the NNs and the other applications (e.g., based on non-linear functions, learning functions, and so on) and constitutes an extension of the concept of NN.

In general, the function approximator may be seen as needing to be based on original measurement data and/or simulated data. We may therefore have:

A training phase (initialization phase), during which the function approximator is trained. For example, a mobile transmitter (mobile antenna) moves along different positions, and measurement data (e.g., CIRs, etc.) shall be obtained by receiver(s) to constitute a dataset for training the function approximator.

An operation phase, in which the function approximator is used e.g. for permitting the localization of a transmitter which transmit a determined signal.

During the training phase, a minimization of a cost function may be performed, so as to obtain the most appropriate weights (e.g., kernels) on the basis of the specific dataset.

The dataset may contain CIRs and/or times of arrival which may be obtained by simulation, hence reducing the computational effort and reducing the numeric of the measurements.

It is to be noted that the retraining of the function approximator is possible in the examples below. Basically, to retrain the function approximator during use, it is possible to copy its weights (e.g. kernels etc.) to obtain a copy of the function approximator (function approximator replica), and retrain the function approximator replica while the original function approximator still runs in parallel. Then when the function approximator replica is trained, the original function approximator is abandoned and the function approximator replica is used for inferences.

Direction of Transmissions

In the examples below, reference is in general made imagining that the transmitter is the mobile antenna and the receiver is one or more fixed antenna. This is however not necessary. The transmitter(s) may be a fixed antenna(s) and the receiver may be a mobile antenna.

The ToA inference (and, in case, the subsequent TDoA and/or multilateration or other techniques) may therefore be performed in uplink (where the position and/or ToA of a mobile transmitter is to be inferred by a system at the side of the fixed antenna(s)) or in downlink (where the position and/or ToA of a mobile receiver is to be inferred by the mobile receiver itself receiving signals from fixed antenna (s)).

Physical Layer (Signal Layer)

Signals between the mobile antenna and one of more fixed antennas (e.g. fixed antennas) are wireless signals and may be, for example, radio-frequency (RF) signals, ultrasound signals, or visible light signals. Fixed antennas (e.g. fixed receivers or transmitted) may be connected with each other via cable and may be synchronized with each other reliably.

Initial Discussion of Concepts at the Basis of the Examples Below

In several of the examples below, we do not follow the teaching of [15, 16], since methods below do not necessarily use function approximators (e.g. NNs) to directly map CIRs onto a position in the space. We understood that this is in principle a non-satisfactory technique: the environment may change with time and, therefore, the function approximator can result, with the passing of time, useless. Its previous training risk therefore to become a useless waist of computational power.

Contrary to the teaching of [15, 16], some methods below may use function approximators (e.g. NNs) which map one CIR onto one ToA, and only thereafter the ToA may be used for arriving at the determination of the position.

The advantages of the concept are maximized in some examples if there is one single function approximator for one single fixed receiver (or, in case of uplink technique, one function approximator for one single transmitter). This because different trainings will provide different function approximators (e.g. NNs) and will permit to arrive, for each fixed receiver (respectively transmitter) at inferring the ToA more reliably. Hence, most of the methods exemplified below do not have one single function approximator for the whole plurality of fixed receivers (respectively transmitters), but multiple different function approximators for the different fixed receivers (e.g. three CNNs for three fixed receivers).

Another important concept is that the ToA may be the time of arrival of a signal component in the first and direct path of arrival (FDPoA), even though the receiver may experience different multipath components (MPCs) and the signal component could also not be actually received. A wireless transmitted signal in general propagates though multipath components (MPCs) in general reaching the receiver at different time instants. We may want to locate the transmitter by obtaining the ToA associated to that signal component which propagates through the first and direct path of arrival (FDPoA), from which we may arrive at inferring the position of the transmitter. Hence, we call "true ToA", "correct ToA", (or more simply "ToA") as the time in which the signal component associated to the FDPoA is arrived or is supposed to arrive. It is to be noted that in some cases (e.g. in some cases like those indicated as NLoS, see below) the signal component associated to the FDPoA could also not arrive to the receiver, but other multipath components could arrive at different times. Notwithstanding, the ToA ("true ToA", "correct ToA") still exists even if its FDPoA component does not actually arrive to the receiver: the ToA is the time of arrival of a signal component (potentially) propagating through the FDPoA, even though this signal component does not really exist and/or is not measured. Hence, we want to arrive to the ToA associated to a transmission even though the transmission actually arrives from MPCs which actually reach the receiver only after the ToA.

In combination with the advantages above, other advantages are achieved by making use of relative ToAs instead of complete (absolute) ToAs. The relative ToA may be, for example, a particular lag in the CIR. The relative ToA is not the complete time of arrival of the transmitted signal. Therefore, the relative ToA may be assumed as being the lag in the CIR associated to the FDPoA, and some methods below permit to obtain the relative ToA from the MPCs of the CIR.

Basically, each function approximator (e.g. NN, CNN) may be trained through relative ToAs, and not through complete ToAs (see below for the reference numerals):

during training the function approximator may be fed with relative ToAs, e.g. in the dataset 121, together with simulated and/or measured CIRs;

during inference 260, the output 261 provided by the function approximator may be constituted by relative ToAs.

The final (global) ToA may be obtained, for example, by adding a global timestamp to each relative ToA obtained by each fixed receiver (or from each fixed transmitter, respectively), but this is external to the function approximator. Examples below permit therefore to generalize the function approximator to particular scenarios, without only referring to one particular fixed antenna configuration.

Accordingly, examples below permit to transcend from a particular antenna configuration, and may be used for a plurality of environments, even geographically distant form each other. Simply, the function approximator will in general appear to be trained for any particular antenna configuration and environment, even though it has been trained using measurements taken from different environments and/or simulations.

Moreover, examples below are based on spatial and relative interpretation of a propagation path from the perspective of a transmitter-receiver pair. It is simulated this relative view, for example of the transmitter on its surroundings: the position does not initially play a role (at least, not at the function approximator), but it is obtained only after the ToA inference.

Examples below can be seen as trying to find the "optimal" path (FDPoA) from the point of view of the sender in the relative CIRs, but at the receiver, without trying to directly arrive at the position from the function approximator. Let us consider the situation in FIG. 1, with mobile antenna 145 sending a signal to the three fixed receivers 140-1 (RX1), 140-2 (RX2), and 140-3 (RX3):

the CIR of the signal component which propagates through the path 14? (which here happens to be the FDPoA) can be easily simulated, without even performing measurements at the receiver 140-1 (RX1);

however, the CIR of the signal components which propagate through the paths 14'o, 14"o, 14'''o, will be much more difficult to be simulated, and therefore actual measurements may be performed in this case.

In general, methods according to the known technology use synchronized bundles of absolute ToA values from multiple antenna units to determine a position; if there is LoS, a ToA value is fine and can be used without a problem; if there is NLOS, it is learnt from the bundles of ToAs how they are affected by NLOS to estimate a position that suffers from NLOS. On the contrary, some concepts of the examples below are that a function approximator is trained on a CIR to find best relative ToA in the CIR and only then to them outside the network to estimate a position.

Examples of Training a Neural Network (or More in General a Function Approximator)

Figure 12A:
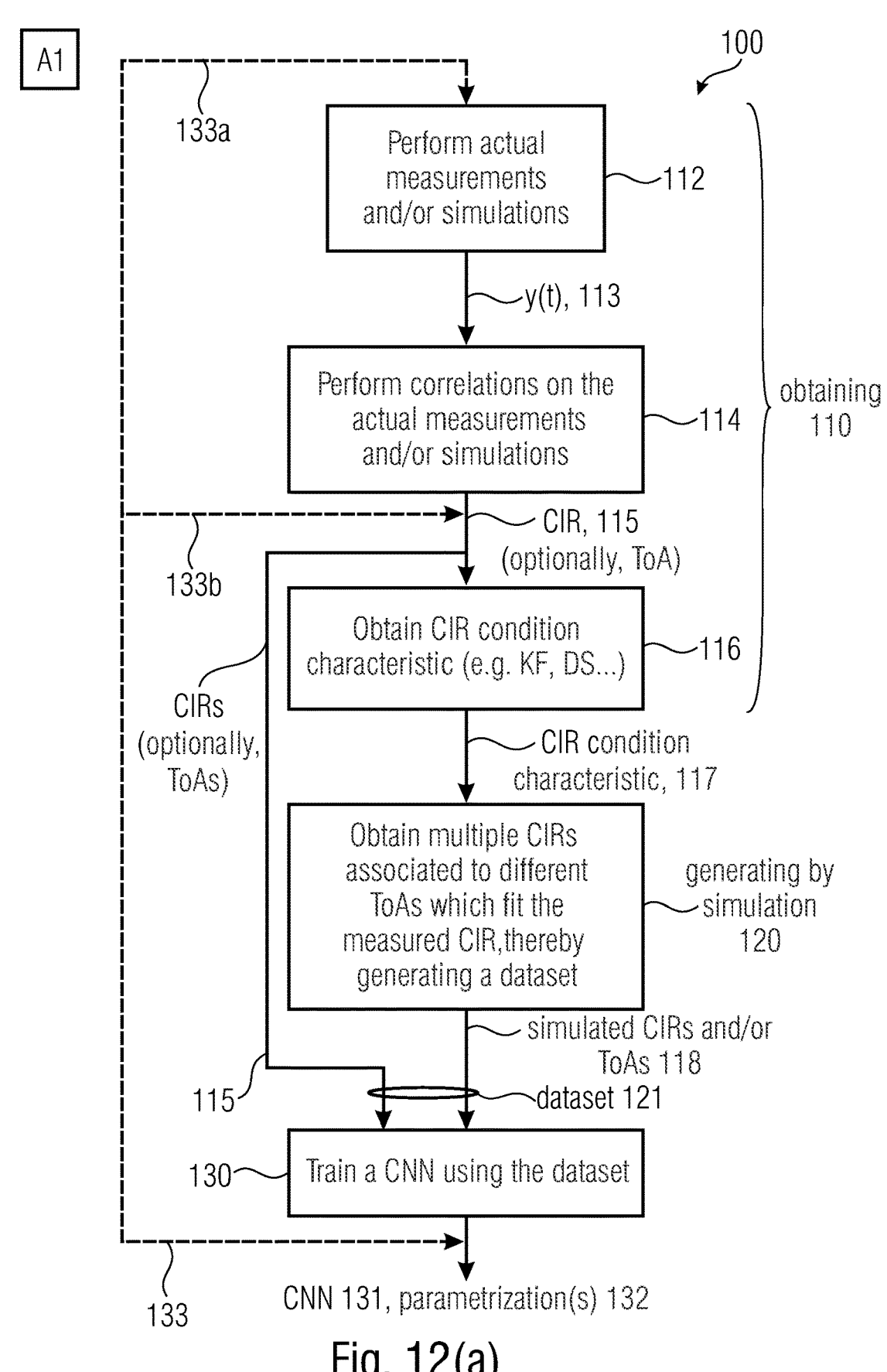
FIGS. 12($a$) and 12($b$) show a method for training a neural network.
Figure 12B:
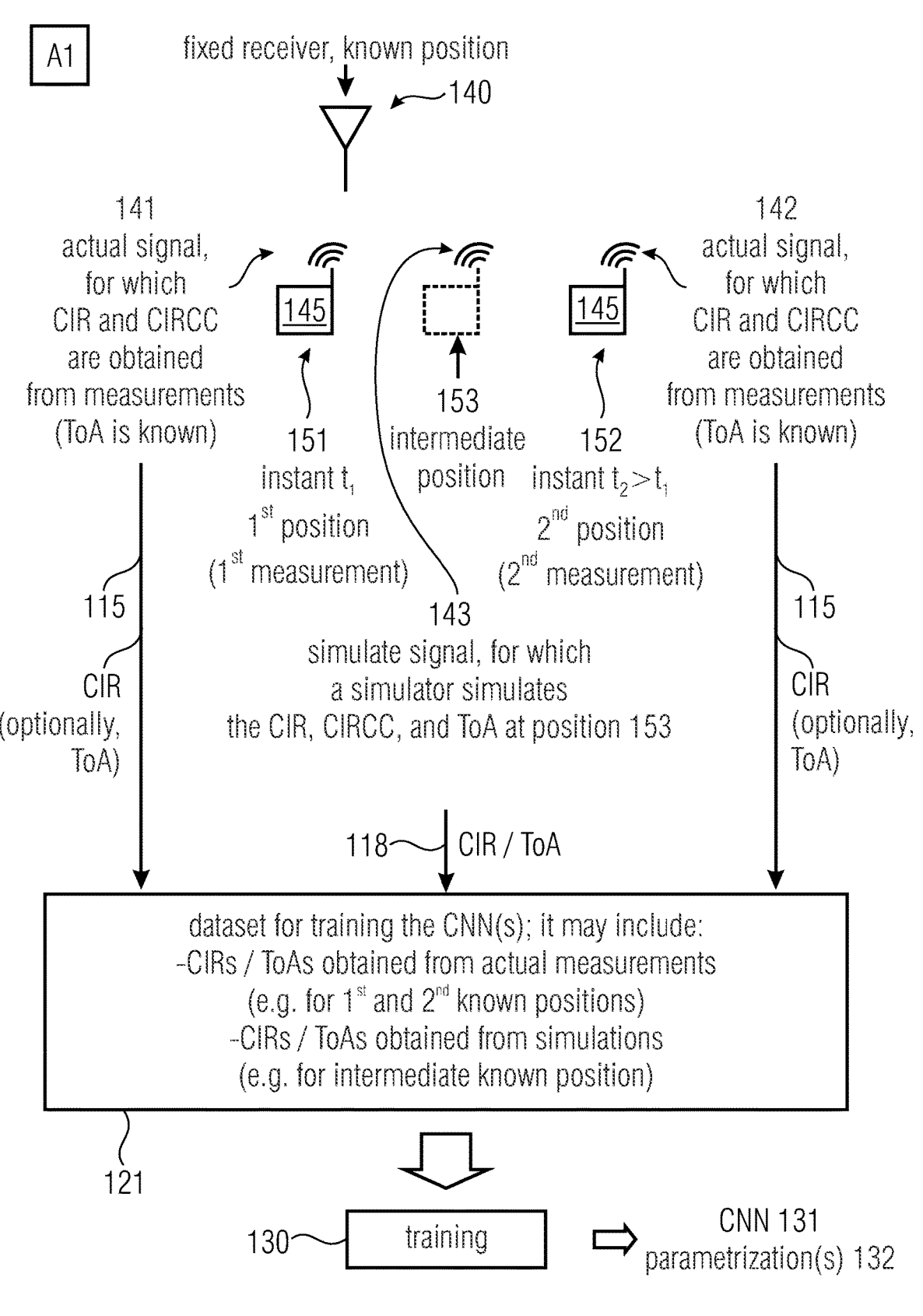

FIGS. 12(a) and 12(b) show an example of a method 100 for training a neural network (NN) (or a function approximator) 131, which will be subsequently used for inferring time of arrivals (ToAs) of a transmitted signal, to be used, for example, for locating (positioning) a user (e.g. navigation system, or more in general a positioning system, e.g. for mobile telecommunications). The neural network NN is here mostly referred to as Convolutional Neural Network (CNN) 131. Therefore, in use (in operation) the previously-trained CNN 131 will be used for inferring the position of a mobile antenna (which may be the transmitter or receiver). However, other kinds of function approximators may be used.

As explained above, the ToAs that have been obtained are the lag at which in which the transmitted signal component propagating through the FDPoA impinges (or is supposed to impinge) the receiver (keeping into account that, in case of perfect NLOS, no signal component actually reaches the receiver, but notwithstanding its ToA may be calculated).

Further, the ToAs are not necessarily obtained as absolute ToAs, but can also be obtained as relative ToAs: the relative ToA may be associated to a particular lag in the CIR, while the absolute ToA would be the relative ToA plus an absolute time reference (which may be, for example, obtained by a reference clock used by all the fixed receiver(s), which may be synchronized via cable). In general terms, the absolute ToA may not have an important meaning (or not at all) for the purpose of training the NN (or more in general the function approximator) or for inferring the ToA in operation, while the relative ToA may be more easily used for the training (and also for the inference).

FIG. 12(a) shows the method 100 as including at least one of the steps 110, 120, and 130. The method 100 may be used during the initialization of a multiple antenna system (e.g., for obtaining the features of the environment, e.g., for a mobile communication network, for a ranging system, etc.).

The step 110 is shown in FIG. 12(a) as including at least one of the steps 112, 114, and 116 (substeps of step 110).

The step 112 may be a step of performing measurements 113 (see also FIG. 12(b)). The measurements 113 may be obtained by measuring wireless signals transmitted between a mobile transmitter (mobile antenna) 145 and a fixed antenna. The mobile transmitter 145 may send (or receive) actual signals towards (or from) at least one fixed antenna 140 whose position is known (there may be a plurality of fixed receivers 140, e.g. the three fixed receivers 145-1, 145-2 and 145-3 of FIG. 1, each receiving the actual signal transmitted by the mobile antenna (transmitter) 145: for each fixed antenna (receiver) 140 there may therefore be obtained a relative measurement of the received signal transmitted from the mobile transmitter 145). The mobile antenna 145 may be understood, in some examples, as being fixedly installed in a mobile vehicle (e.g. driven by a human driver). The mobile vehicle could, for example, be operated by an operator which intends to acquire knowledge of the environment (e.g., network operator, telecommunication mobile phone operator, etc.). The measurements 113 (also indicated as y (t)) may therefore be associated to the position of the mobile antenna 145 (e.g., in the terrestrial globe, or in a geographical area, etc.). As shown in FIG. 12(b), at a first time instant $t_1$ the mobile antenna 145 may be at a first position 151 and at a subsequent time instant $t_2$ (with $t_2 > t_1$) the mobile antenna 145 may be in a second position 152 (different from the first position 151). At the first position 151, the mobile antenna 145 transmits an actual signal 141, which is received by the at least one fixed receiver 140, while at the second position 152, the mobile antenna 145 transmits the actual signal 142. The movement may be understood in FIG. 12(b) in the sense that from the first time instant $t_1$ to the second time instant $t_2$, position of the mobile antenna 145 has moved towards the right direction in FIG. 12(b). Instead, at the intermediate position 153 no signal has been transmitted by the mobile antenna 145. Therefore, the reference numeral 143 does not refer to an actual signal really transmitted from the mobile antenna 145.

Step 112 can also be skipped in some examples: instead of actually performing the measurements, previously obtained measurements may be obtained. In some examples, instead of at least part (or all) of the measurements, simulations may be performed, and the signals 141 and/or 142 may be simulated. In some examples, while some signals are actually performed and measured, some other are only simulated.

In general terms, the signal 141, 142 which is transmitted by the mobile antenna 145 is a known signal (e.g. pilot sequence), whose evolution is predefined.

At step 114, correlations 115 (e.g. cross correlations) are obtained from the measurements 113. The correlations may be obtained by comparing the evolution of the signal 141, 142, as received by the at least one receiver 140, and the know evolution of the signal 141, 142 as transmitted. Correlations are as such known by the skilled person, and are also discussed below with reference to FIGS. 3a-3c.

From the correlations, a channel input response (CIR) 115 for each position (and for each of the receivers 140) may be obtained. Also the concept of the CIR is known as such, and are also discussed below with reference to FIGS. 3*a*-3*c*.

In some cases, not only the CIR but also the ToA of the actual signal 141, 142 may be measured. However, in some cases, this is not necessary. In one example, for some measurements, the CIR 115 is measured but the ToA is not measured, while for other measurements, the CIR 115 is still measured, but the ToA is also measured. In some cases, even if the ToA is actually measured, its reliability is so low, that it is discarded: accordingly, it may be that for some positions the ToA results to have been obtained, while for other positions the ToA results to have been discarded.

The CIR 115 (some examples of which are depicted in FIGS. 3(*a*)-3(*c*)) can give, at least theoretically, information regarding the environment. It will be shown how we can reach an extremely reliable positioning by making use of the CNN 131, once trained.

At step 116, a CIR condition characteristic (CIRCC) 117 may be obtained. The CIRCC 117 may represent a statistic on the signal 141, 142. The CIRCC 117 may be formed by a list of relationships of CIRs and other measured parameters of the signal 141, 142. The CIRCC may be associated to statistical values of the signal at a particular position 151, 152. Particularly advantageous are the so-called large-scale parameters (LSPs), which tend not to vary too much within some meters. Examples of elements of the CIRCC 117 may be channel response parameters, such as the Rician K-factor (KF), the delay spread (DS), probability density function (PDF), and so on (KF, DS, PDF are also LSPs). Examples of these measurements are provided below, e.g. in association to formulas (3) and (4). The CIR condition characteristic may be understood as a list of couples, or triplets, or n-ples of parameters (KF, DS, PDF, etc.) associated to a particular CIR (in some cases, the ToA and/or the position can also be an entry of the list and in some cases the position of the transmitter).

For example, the CIRCC 117 could have, for the positions 151 and 152 of FIG. 12(*b*):

1) Information, in one first field, on:
    a. the ToA of the actual signal 141 (optional),
    b. the CIR of the actual signal 141,
    c. parameters like the DS and/or KF and/or PDF of the actual signal 141;
2) Information, in one second field, on:
    a. the ToA of the actual signal 142 (optional),
    b. the CIR of the actual signal 142,
    c. parameters like the DS and/or KF and/or PDF of the actual signal 141.

(The CIRCC in general does not provide for a particular value for position 153, for which it may be provided that no measurement has been performed.)

It is noted that some ToAs may be actually obtained, e.g., by taking into account LoS signal components on other fixed antennas. For example, a in FIG. 1, the signal component in the path 14*l* and reaching the antenna 140-1 (RX1) may be used to obtain a good measurement of the ToA of the signal reflected through the path 14*n* and impinging the antenna 140-2 (RX2) the same instant: in fact, the positions of the antennas 140-1 (RX1) and 140-2 (RX2) are known, and the position of the mobile antenna 145 is therefore known not only in respect to the antenna 140-1 (RX1), but also in respect to the antenna 140-2 (RX2). From the obtained position in respect to the antenna 140-2 (RX2), it is possible to obtain the true ToA 115 between the mobile antenna 145 and the antenna 140-2 (RX2). This ToA 115 between the mobile antenna 145 and the antenna 140-2 (RX2) will be used in the CIRCC in association with the CIR of the actual signal as received by the antenna 140-2 (RX2) from the mobile antenna 145 and the statistic parameters like the DS and/or KF and/or PDF for obtaining further, additional simulated CIRs and ToA 118.

The ToA may also be obtained through other sensors like satellite navigation etc.

At this point, in ideal (theoretical and in general unachievable) conditions, it could be possible to store the list, and use the list subsequently, when inferring the position of a mobile transmitter (e.g., a final user). This, however, is in general not feasible, because of the technical impairments discussed above (i.e., lack of synchronization between the mobile transmitter 145 and the at least one fixed receiver 140, multipath fading, motion fading, fading effect, discretization of the positions, for example, the signal not having been measured at the intermediate position 153, changes in the environment, density of measurement points, and so on).

However, it has been understood that it is possible to cope with such impairments e.g. by making use of step 120. In step 120, there is generated, e.g. through a simulator, a training set (data set) 141 of simulated CIRs 118 (e.g. in addition to the measured CIRs measured for the actual signal 141, 142), the simulated CIRs being associated with multiple, different ToAs in simulated scenes. A simulator (one of them is known as QuaDRiGa, see below) may simulate the ToAs of the signal (e.g. 143) which may be transmitted (transmittable) by the mobile transmitter 145 in multiple conditions, and may therefore find out the most probable ToA after having identified, based on the CIRCC 117, the most probable scene. The simulator may include, for example, a stochastic component that creates random propagation environments, from which the most probable scenario is chosen. For example, the simulator at step 120 may obtain, in some cases, at least one of:

1. The simulated signal 143 as simulatively transmitted by the mobile transmitter 145 in the intermediate position 153 as simulated, by taking into account the CIRs 115 and the CIRCC 117 (e.g., KF, DS, PDF . . . ), and perhaps other parameters (e.g., ToAs, positions . . . ) of the signals 142 and 143 as actually sent and measured;
2. The ToA of a transmitted and measured signal, for which the CIR 115 is actually obtained at step 114, but for which the ToA has not been measured (either because a measure ToA it was not deemed to be stable or reliable enough, or because the measurement of ToA had been skipped, or for other reasons);
3. The motion fading and fading errors (measurement error due to the fading effect) that can appear at different speeds of the mobile transmitter 145;
4. Objects that block and/or refract the transmitted signals.
5. Diffractions data (a diffracting object lets a first path transmit, but weakens it; hence diffracted path comes later but with much more power, so transmission may make FDPoA weaker and lets them seem to be noise)

In the simulation, the ToA may be based on the most probable scene that has been identified by the simulator: once the simulator has retrieved, from the CIRCC 117, CIR 115, etc. the most probably scene for a particular position (or ToA), then the ToA may be easily calculated by taking into account the speed of the transmission (e.g., known a priori). In some cases, the ToA is a theoretical ToA, in the sense that a signal does not really arrive to the receiver from that specific position (e.g., because of an obstruction): the ToA is notwithstanding obtained for the direct path of propagation.

In case of multiple fixed receiving antennas 140 (e.g., 140-1 to 140-3 in FIG. 1), multiple instantiations of the simulation are performed for different fixed receiving antennas 140. In some cases, the simulator at step 120 may make use of the results of the different instantiations of the simulation for different receiving antennas 140 (e.g., 140-1 and 140-3) for obtaining a simulation of another antenna (e.g., 140-2). For example, measurements from a FDPoA of a first antenna 140-1 may be used for obtaining the simulations.

One simulator chosen among a plurality of simulators may be used at step 120. Here, a particular type of simulator (e.g., $Q_{ua}DR_iG_a$) is taken into particular account, even though other simulators may be used. The simulator may simulate a plurality of virtual scenes (e.g., "obstructed line of sight, OLOS"; "non-line of sight, NLOS"; "diffraction"; and so on), by keeping into account different obstacles that may impair the transmission of signal 141, 142, 143. Different positions of the obstacles may be simulated. The simulator may simulate a plurality of (ideally all) the different environments (e.g., "urban", "indoor", "industrial", "real-word", etc.). The simulator may take into account the positions close to the position for which the parameters KF, DS, PDF (more in general, parameters of the CIRCC 117) are simulated (e.g. the simulator may take into account signals 141 and 142 for simulating signal 143). The simulator may try to find an adequate environment that permits to obtain the measured CIR 115 at a particular point (the simulated values are indicated with 118 in FIG. **12(*b*)). The simulator may simulate CIRs and/or ToAs (simulated values) 118 which fit with the CIRCC 117** as measured.

At the end of step 120, a data set 121 may therefore be obtained in which, together with the CIRs 115 (and maybe simulated ToAs) as obtained at step 114, also simulated CIRs and/or simulated ToAs are present, each simulated CIR and/or ToA being associated to a particular position (of course, a subset of the data set 121 will only have simulated CIRs, even though also the actually measured CIRs 115 may actually be present in the data set 121).

At step 130, the CNN (or a function approximator) 131 may be trained using the data set 121. In examples, at step 130 it may make no difference whether some CIRs and/or ToAs are obtained by measurements or are only simulated: the CNN 131 will be notwithstanding trained without distinguishing between the simulated values and the values obtained by measurement. Examples of CNNs are provided here below (e.g., in association to FIGS. **7(*a*)-7(*b*)), even though it is here anticipated that the CNN may be of the deep learning (DL) type. At the end of step 130, the CNN (or function approximator) 131 is obtained, which may therefore subsequently be used in operation for inferring ToAs of a mobile antenna(s). The CNN (or function approximator) 131 will be used, in operation, to provide a ToA when a CIR is input: the at least one fixed receiver 140 will receive a signal from the final user and will obtain the final ToA (the final ToA may be received by multiple fixed receivers 140-1 to 140-3** from which, for example, the ToA may be calculated, for arriving at the final positioning of the user, e.g. implementing a TDoA technique). (It is recalled that the ToA is in general the relative ToA of the FDPoA.)

In some cases, the method 100 may be iteratively repeated multiple times, each time achieving a particular parameterization 132 of the CNN 131 (or more in general, a parametrization of the NN or even more in general a parametrization of the function approximator). An iteration 133 is shown in FIG. **12(*a*). In some cases, the iteration 133 is obtained by performing new measurements or simulations (option 133*a* of iteration 133), while in other cases the iteration 133 is obtained by maintain the same new measurements or simulations of the previous iterations, and by obtaining a new CIRCC on the basis of the choice of new parameters (e.g. new KF, DS, PDF). At the end of each iteration 133 (in either the option 133*a* or 133*b*) there may be a related parametrization 132 (e.g. one for each iteration 133), so that a plurality of iterations 132 is obtained: among the parametrizations 132, one will be selected for inferring the ToA of a mobile transmitter (see below, e.g. methods 200 and 300**).

For example, the mobile transmitter 145 could move multiple times at different speeds, which could imply different errors (e.g. due to fading) or more in general different measured CIRs and CIRCCs, and which would permit to have different parameterizations 132 of the same CNN 131 (or different CNNs 131 based on different parameterizations 132). The same can be performed, for example, in the case of different weather conditions, climates, etc. Therefore, multiple iterations 133 (according to option **133*a*) may be performed, and measurements 113 are repeated, so as to arrive at different parametrizations for different measurements 113**.

In examples, different iterations 133 (according to option **133*b*) may be performed for different environments, so as to train the NN (or function approximator) to recognize different CIRs associated to different environments. It is not strictly necessary (despite being possible) to always maintain the same mobile antenna 145 for different iterations and it is not strictly necessary (despite being possible) to always maintain the same receiving antenna(s) (e.g. 140, 140-1, 140-2, 140-3**) for different iterations. This is in particular possible because relative ToAs are obtained, and it will be possible in the future to reuse the function approximator (or more in specific the NN) for different fixed antenna systems.

In examples there may be the case (e.g. option **133*b*) in which different CIRCCs 117 are obtained by reiterating the step 116 and/or 120. The step 116 may be reiterated multiple times for example by simulating at least some of the parameters associated to the statistical distribution (LSPs like KF, DS, PDF, etc.) using different values for each iteration of step 116. Different CIRCCs will cause different simulated CIRs 118 and different instantiations of dataset 121, which will cause the NN (or function approximator) to present different parametrizations 132 (or different NNs or different function approximators) (e.g., different weights, kernels, etc.) which fit the obtained CIRs. In this case, for different parameters there will be the possibility, during subsequent operations (e.g. method 200, see below), to search for the best parametrization (among the plurality of parametrizations 132**) for each receiving antenna or for each group of receiving antennas. Also this result is possible also due to the use of relative ToAs.

To summarize some important aspects that may be achieved:

A step "obtaining" 110 may permit to obtain a "CIR condition characteristic" (CIRCC), which could be constituted by a set {DS, KF, (ToA and/or position)}.

A step "generating by simulation" 120 may involve e.g. Quadriga, and new multiple CIRs and ToAs are generated from the CIRCC (actually this step can be repeated for a multiplicity of scenes).

At the end of step 120, a training dataset 121 is populated, the training dataset 121 being formed e.g. by couples (CIR/ToA) (obtained from "obtaining" 110, and/or simulated from "generating by simulation" 120).

Then, at step 130 there is trained a CNN (or function approximator) 131 from the training dataset 121.

The present example may therefore be seen as referring to a method (100) for training (130) a neural network (131) for inferring a predetermined time of arrival of a predetermined transmitted signal on the basis of channel-impulse-responses, CIRs (117), of transmitted signals (141, 142) between a mobile antenna (145) and a fixed antenna (140), the method comprising at least one of:

(110) obtaining [e.g. by way of a measurement and/or by simulation] a channel impulse response condition characteristic (117) [examples: the set of {DL, KF, position}'s, the set of {DL, KF}; the pdf of the latter set] which is descriptive of channel impulse responses of transmitted signals (141, 142) associated with mobile antenna positions (151, 152) within a reach of the fixed antenna (140);

(120) generating, by simulation, a training set (121) of simulated CIRs (118) which are associated with different times of arrival in one or more simulated scenes [e.g. a "scene" or "scenario" may include information like LoS/NLoS/OLOS and/or Urban/'RealWorld/Indoor], and which fit to the channel impulse response condition characteristic (117) [e.g., the simulated CIRs may result into the same channel impulse response condition characteristic, and they belong to different virtual positions of the mobile antenna in one or more virtual scenes of different scattering areas, diffraction areas, reflective walls, blocking walls . . . ];

(130) training the neural network (131) using at least the simulated CIRs (118) and the different associated times of arrivals so as to obtain a parametrization (132) of the neural network (131) associated with the channel impulse response condition characteristic (117). It is noted that, accordingly, problems of synchronization between the mobile transmitter 145 and the fixed position receiver 140 are less stringent: many ToAs are simulated. Moreover, by making use of the parameters like KF, DS, PDF, or the like, it is possible to obtain a simulated ToA which works even better than an unreliable ToA which would be simply measured.

Further, the occurrence of fading errors may be tolerated, either by the simulation (which may determine the fading errors/which may tolerate the fading effect), or by training different CNNs at different speeds (e.g. by performing different trainings for different speeds.)

Moreover, errors implied by the quantization of the mobile antenna positions in the actual measurements can be overcome, because the simulator may easily simulate the signal 143 as it could be transmitted in the intermediate position 153. Changes in the environment may be addressed by retraining the CNN after having obtained new measurements.

Here above, reference is often been made to actual measurements as obtained in step 112. It is to be noted, however, that, instead of performing actual measurements, also simulations may be performed. In some cases, also the environment, instead of being real, can be simulated (it will be shown that the Rayleigh and Rician distribution are a good approximation of NLoS/LoS propagation scenarios).

Moreover, even though the different ToAs (obtained or simulated), the different CIRs 115 (obtained or simulated) and the different statistical parameters (LSPs, like KF, DS, PDF, etc.) of the CIRCC 117 are associated to different positions, it is not strictly necessary to really know the positions to which they pertain (and it is not strictly necessary to put the position in the CIRCC or in the CNN). Simply, in operation the position of a user will be finally measured making use of the inferred ToA (e.g., using a TDoA technique).

Summarizing the explanations above, through method 100 it is possible to arrive to an NN (or function approximation) which, in operation, "recognizes" a measured CIR and infers a ToA associated to the measured CIR (e.g. the relative ToA may be associated to the lag of the FDPoA).

Notably, it is in principle not strictly necessary (although it is possible) that the receiving antenna(s) (e.g., 140, 140-1, 140-2, 140-3) for which the method 100 has been used is the same antenna for which the ToA will be inferred, during operation. For example, in case of obtaining multiple parametrizations 132, it will be subsequently possible, when initializing another fixed antenna (e.g. different from that from which the NN has been trained), to simply choose that parametrization, among the plurality of generated parametrizations 132, which best fits to the environment of the other fixed antenna. For example, the method 100 may be reiterated (e.g. according to different iterations 133 according to the option 133a or 133 according to the option 133b) for different (real or simulated) environments, so that the NN (or function approximator) learns to recognize different CIRs (inherently associated to different environments and/or different situations) and to infer the ToA accordingly.

Even though it is here, for simplicity of explanation, in general imagined that the training of the CNN (or NN, or function approximator) is performed in a different time period from the time period in which the ToA inference will be performed, this is actually not strictly necessary: NNs and more in general function approximations are known which may be retrained during operation, and method 100 may therefore be used also for retraining (or re-parametrizing) an NN or function approximation which is already existing. Therefore, in some examples, the same measurements 113 (or the same CIRs 114 or CIRCCs 117) that are used for (re) training a function approximation 131 may also be used for inferring ToAs. Basically, to retrain the model, it is possible to copy its weights and retrain a copy of it while the old one still runs in parallel. Then when the new one is trained, it is possible to use this instead of the old one. It is possible to do this with many neural networks in parallel at different time steps.

Notably, one neural network (or more in general one function approximator) may be obtained for each of the fixed receivers 140-1, 140-2, 140-3. It may be of advantage that the different measurements 113, CIRs 113 and/or CIRCCs 117 are obtained through the use of different receiving antennas at the same time instants (which implies the same positions 151, 152 of the mobile transmitter 140 when transmitting the signal 141, 142). Notably, the fixed receivers 140-1 140-2, 140-3 are in general cabled (wired) together and are easily and reliably synchronized with each other. Therefore, from one single transmitting antenna 140 transmitting the signal 141, 142, the method 100 may therefore be reinstantiated for each receiving antenna (e.g. one first instantiation of method 100 for antenna 140-1, one second instantiation of method 100 for antenna 140-2, one third instantiation of method 100 for antenna 140-3). When at step 112, instead of actual measurements, simulations are performed, then it is also possible to reinstantiated method 100 for each of the receiving antennas.

It is noted that it is possible to use a plurality of fixed antennas cabled with each other so as to achieve synchronous measurements and to obtain at least one of a CIR, CIRCC and ToA associated to a first fixed antenna using at least one synchronous measurement associated to a second fixed antenna. hence, problems of synchronization between the fixed antennas are solved.

Even though the present technique has been mainly explained in terms of a method, it may also be implemented in one system. The system may be a system for training (e.g. 130) a neural network, or function approximator, (e.g. 131) for inferring (e.g. 260) a predetermined time of arrival (e.g. 261) of a predetermined transmitted signal on the basis of channel-impulse-responses, CIRs (e.g. 115), of transmitted signals (e.g. 141, 142) between a mobile antenna (e.g. 145) and a fixed antenna (e.g. 140), the system comprising at least one fixed antenna (e.g. plurality of antennas). The system may include:

an obtaining unit (e.g. performing step 110) configured for obtaining a channel impulse response condition characteristic, CIRCC (e.g. 117), which is descriptive of channel impulse responses of transmitted signals (e.g. 141, 142) associated with mobile antenna positions (e.g. 151, 152) within a reach of the fixed antenna (e.g. 140);

a generating unit (e.g. performing step 120) configured for generating, by simulation, a training set (e.g. 121) of simulated CIRs (e.g. 118) which are associated with different times of arrival in one or more simulated scenes, and which fit to the CIRCC (e.g. 117); and a training unit (e.g. performing step 130) configured for training the neural network, or function approximator, (e.g. 131) using the simulated CIRs (e.g. 118) and the different associated times of arrivals so as to obtain a parametrization (e.g. 132) of the neural network, or function approximator, (e.g. 131) associated with the CIRCC (e.g. 117).

Basically, any of the features of the methods above and below may characterize operations of the system.

Examples of Using Different Parametrizations for the Neural Network (or Function Approximator)

Figure 13:
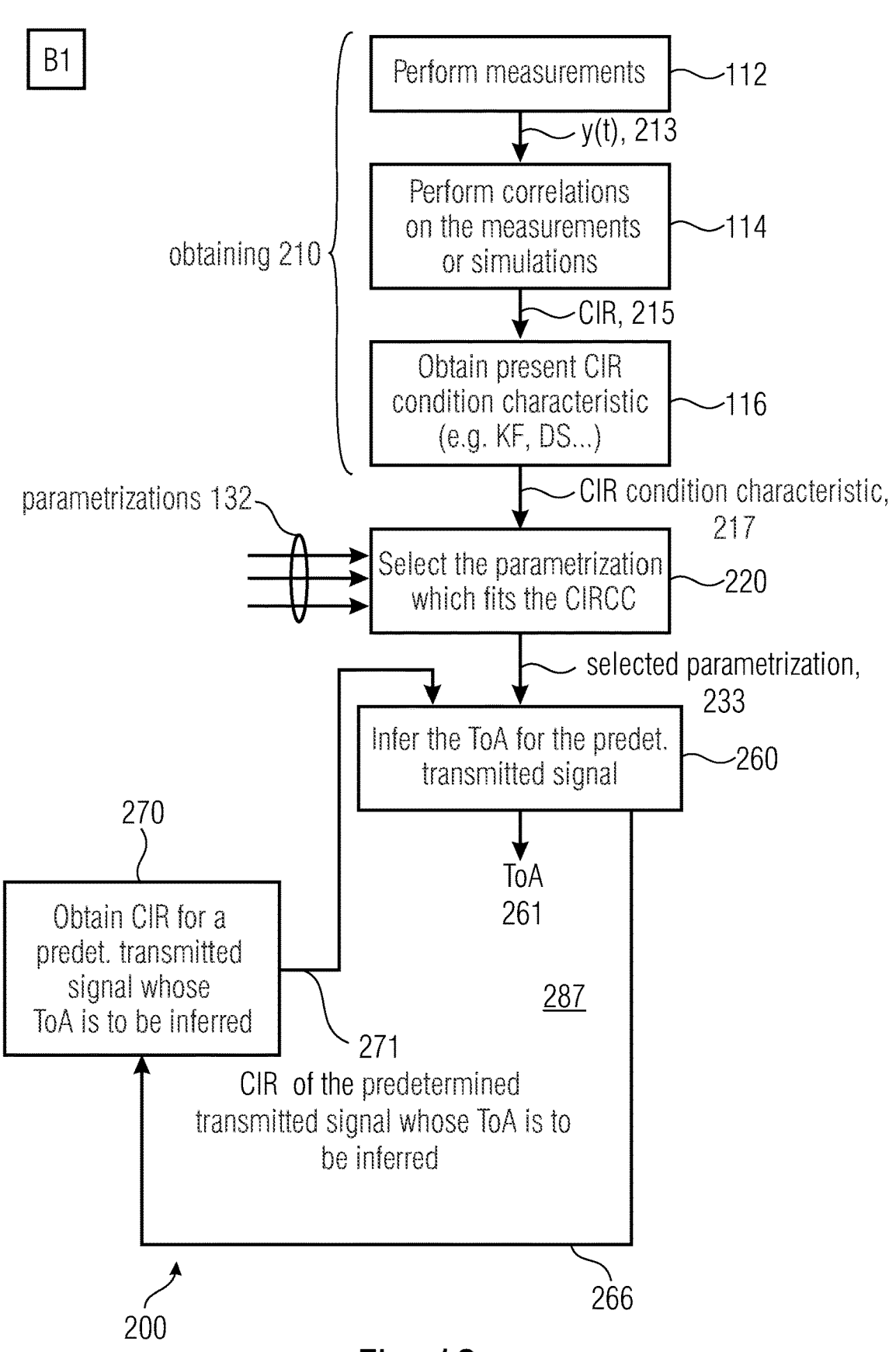
FIG. 13 shows a method using different parametrizations for the neural network.

An example of using different parametrizations 132 for inferring a ToA is now discussed with reference to FIG. 13. FIG. 13 shows a method 200 as including at least one of a step 210, a step 220, a step 260 and a step 270. It is here assumed that a CNN (or, more in general, an NN, or even more in general a function approximator) is already present (e.g., already trained, or somehow obtained, e.g. through method 100). The CNN may be subjected to multiple parametrizations 132, e.g. obtained at different iterations 133 (e.g., obtained through different measurements and/or simulations; different speeds of the mobile device 145; different day of performing the measurements; different climates; different statistical parameters, such as PDF, KF, DS, or other LSPs, chosen during the step 120 etc.). Therefore, different parametrizations 132 are already present, but we don't know yet which one, among them, is to be chosen e.g. for a particular receiving antenna or a system of multiple receiving antennas. Another way to say it is that there are multiple different CNNs 132, one of which is to be chosen. It is here not necessary (despite being possible) that the receiving antenna (or antennas) to be used in method 200 is (or are) the same of the antenna (or antennas) used for method 100. Notably, also this method may make use of the notion of relative ToA, e.g. the lag associated to the FDPoA.

The step 210 may be the same as, or similar to, the step 110 of method 100 (e.g., including at least one of the sub steps 112, 114, and 116) which are discussed above and here not repeated for brevity. Substep 112 may be performed, in some examples, by actual measurements, and not by simulations. Substep 114 may obtain a CIR 215. Substep 116 may obtain a present CIRCC 217 which is based on statistical parameters such as large-scale parameters (LSPs) like KF, DS, PDF, etc., or other statistical values. More in general, the step 210 may obtain a CIR 215 (which may be obtained substantially in the same way through which the CIR 115 of method 100 is obtained, but without simulations, e.g. only relying on actual measurements), a CIRCC 217 (which may be obtained substantially in the same way through which the CIRCC 117 of method 100 is obtained, e.g. without using simulations), and maybe also at least one of the ToA and/or at least one of the positions the same way of any of the examples of step 110.

FIG. 13 shows a step 220 of selecting a particular parametrization 233 (among the multiple parametrizations 132) which fits the present CIRCC 217. This step 220 may be performed, for example, during the installation of the fixed receiver 140 (or multiple fixed receivers), when it is chosen the most suitable parametrization is determined. In other examples, step 220 may be performed when it is intended to obtain the position of a user (and it is necessary to know which parametrization 132 is to be chosen for positioning the user). The chosen (selected) parametrization 233 may be that parametrization (out of the pre-trained parametrizations 132), which mostly fits the present CIRCC 217 as obtained at step 210. Therefore, measurements may be performed (e.g. during step 210) for choosing, at step 220, the most suitable parametrization 233 and among multiple, previously obtained parametrizations 132 (the multiple parametrizations 132 may be those obtained through method 100).

Once the best parametrization 233 is chosen (selected), it is subsequently possible to use, in operation, the CNN 131 with the selected parametrization 233 for inferring the ToA (and subsequently the position) of mobile antennas.

In operation, at step 270 a CIR 271 may be obtained, from an actual measurement, for a predetermined transmitted signal (e.g., transmitter between a user of which the position is to be inferred and one or more fixed antennas 140-1, 140-2, 140-3).

At step 260, the time of arrival (ToA) 261 (e.g. relative ToA) of the predetermined transmitted signal (each associated to the user of which we want to know the position) is inferred by using the CNN (or function approximator) according to the selected parametrization 233.

For example, the CNN, already trained and for which the parametrization 233 has already been selected, receives in input the CIR 271 of the predetermined transmitted signal whose ToA 261 is to be inferred, and the ToA 261 may therefore be obtained through the CNN 233.

Any of steps 210, 220, 260, and 270 may be instantiated several times for each of the fixed receiving antenna (e.g. 140-1 to 140-3). In case, it may be intermittently repeated (in some cases, method 200 may be an instantiation of method 300; see below). FIG. 13 only shows an iteration 266 between the blocks 260 and 270 to form a loop (cycle) 287, to indicate that, after inferring a ToA 261 at 260, another ToA may be wished, and step 270 is to be reinstantiated.

This is normal for many applications (e.g., telecommunications, navigation, etc.) but it is not strictly necessary for all the applications. Even if not shown in FIG. 13, it is also possible (additionally or alternatively) to start a new obtaining step 210 after step 260, so as to iterate the steps 210 and 220 once again, and to obtain another cycle parallel to cycle 287.

In some cases, at least one of the steps 210 and 220 are not necessarily (or not only) performed during initialization, but may be additionally or in alternative performed online when the signals transmitted by the user of which the ToA 261 is to be inferred. In some of those cases, the blocks 270 and 116 of FIG. 13 may actually be the same block, and the CIRs 215 and 271 may be actually the same CIR which is both input to the block 220 (for selecting the most suitable parametrization 233) and to the block 260 (for inferring the ToA). Therefore, in some examples, a reparameterization may be performed online, e.g. choosing every time the most advantageous parametrization (e.g. the most suitable on the basis of the position, the weather conditions, the situation, etc.).

Summarizing, method 200 may be seen as referring to the technique of selecting one CNN from multiple ones CNNs (or, in other terms, by choosing one parametrization 233 amount multiple parametrizations 132 for the CNN 131). Each of the parametrizations can be understood as a set of CNN parameters (weights, kernels . . . ). There may be at least one of:

An "obtaining" step 110 (e.g. at the initialization or in operation) for obtaining a present CIRCC 117 from real signals associated to known ToAs;

A "selecting" step 220 (e.g. at the initialization or in operation), in which one parametrization is chosen among the other ones;

An "inferring" step 260 (in operation) during which unknown ToAs are measured (the CIR 271 of the transmitted signal of which it is intended to infer the ToA may be calculated at step 270).

Method 200 may be understood as a method for inferring a predetermined time of arrival (261) of a predetermined transmitted signal on the basis of channel-impulse-responses, CIRs (215), of transmitted signals between a mobile antenna (145) and a fixed antenna (140), the method comprising:

obtaining a present channel impulse response condition characteristic [examples: the set of {DL, KF, position}'s, the set of {DL, KF}; the pdf of the latter set] which is descriptive of channel impulse responses of transmitted signals associated with mobile antenna positions within a reach of the fixed antenna;

selecting, using the present channel impulse response condition characteristic, out of a plurality of parametrizations associated with channel impulse response condition characteristics, a predetermined parametrization fitting to the present channel impulse response condition characteristic [e.g. selecting the parametrization associated with those one or more channel response parameters which are nearest to the one or more measured channel response parameters; here the selection may be done out of pre-trained parametrizations], and inferring [e.g. when using the transmitter and its position is to be inferred], using a neural network, parametrized using the predetermined parametrization (132), from the channel impulse response of the predetermined transmitted signal, the predetermined time of arrival.

Changes in the environment, weather, condition, situation, etc. may be addressed by choosing the most appropriated parametrization 233 among the plurality of pre-trained parametrizations 132. The choice of the parametrization may be performed during an initialization process or may be performed on line, during inference operations (260), e.g. embodying a reparameterization.

In some examples of method 200 the step 20 is not used, and simulations are not always strictly necessary.

Notably, one parametrization may be obtained for each of the fixed antennas 140-1, 140-2 140-3. Hence, each of the plurality of fixed receivers may be associated to a different CNN and/or may be parametrized according to a different parametrization. Method 200 may therefore be reinstantiated for each fixed antenna (the mobile transmitter's transmission needs not to be repeated; however, the method 200 may be instantiated once for each of the fixed receivers). For example, from one single transmitting antenna transmitting the signal, the method 200 may therefore be reinstantiated for each receiving antenna (e.g. one first instantiation of method 200 for a first receiving antenna 140-1, one second instantiation of method 200 for a second receiving antenna 140-2, one third instantiation of method 200 for a third receiving antenna 140-3, and so on).

Even though the present technique has been mainly explained in terms of a method, it may also be implemented in one system. The system may infer a predetermined time of arrival (e.g. 261) of a predetermined transmitted signal on the basis of channel-impulse-responses, CIRs (e.g. 115), of transmitted signals (e.g. 141, 142) between a mobile antenna (e.g. 145) and a fixed antenna (e.g. 140). The system may include at least one predetermined fixed antenna (which receives or transmits the predetermined transmitted signal from or to a predetermined mobile antenna). The system may be parametrized by the method 200 and/or by:

obtaining (e.g. 210) a present channel impulse response condition characteristic, CIRCC (e.g. 217), which is descriptive of channel impulse responses of transmitted signals (e.g. 141, 142) associated with mobile antenna positions (e.g. 151, 152) within a reach of the fixed antenna (e.g. 140); and selecting (e.g. 220), using the present CIRCC (e.g. 217), out of a plurality of parametrizations (e.g. 132) associated with CIRCCs, a predetermined parametrization (e.g. 233) fitting to the present CIRCC (e.g. 217).

The system may infer (e.g. 260), using a neural network, or function approximator (e.g. 131), parametrized using the predetermined parametrization (e.g. 132), from the channel impulse response (e.g. 271) of the predetermined transmitted signal, the predetermined time of arrival (e.g. 261).

Basically, any of the features of the methods above and below may characterize operations of the system.

In addition or alternatively, the technique may be implemented in one UE, e.g. a UE, for inferring a predetermined time of arrival (e.g. 261) of a predetermined transmitted signal on the basis of channel-impulse-responses, CIRs (e.g. 115), of transmitted signals (e.g. 141, 142). The UE may include at least one mobile antenna. The UE may use a neural network, or function approximator, parametrized through method 200 or by:

obtaining (e.g. 210) a present channel impulse response condition characteristic, CIRCC (e.g. 217), which is descriptive of channel impulse responses of transmitted signals (e.g. 141, 142) associated with mobile antenna positions (e.g. 151, 152) within a reach of the fixed antenna (e.g. 140); and selecting (e.g. 220), using the present CIRCC (e.g. 217), out of a plurality of parametrizations (e.g. 132) associated with CIRCCs, a predetermined parametrization (e.g. 233) fitting to the present CIRCC (e.g. 217).

The UE may infer (e.g. 260), using the neural network, or function approximator (e.g. 131), parametrized using the predetermined parametrization (e.g. 132), from the channel impulse response (e.g. 271) of the predetermined transmitted signal, the predetermined time of arrival (e.g. 261). The predetermined transmitted signal of which the predetermined time of arrival (e.g. 261) is obtained may be a signal between the mobile antenna of the UE and at least one predetermined fixed antenna.

Basically, any of the features of the methods above and below may characterize operations of the UE.

Examples of Checking the Correctness of the Neural Network (or Function Approximator)

It is here mainly discussed method 300 using the notion of "CNNs", which however can be generalized in "NNs" and more in general in function approximators.

FIG. 14 shows a method 300 for inferring a ToA 261. The method 300 may also permit to check the correctness of a currently-used CNN or of function approximator (e.g. the correctness of the chosen parametrization 233 as chosen at step 220 of method 200). The currently-used NN (or more in general function approximator) may have been obtained (trained) for example though method 100, and/or its parametrization 233 may have been chosen through method 200 (other methods may however be used). Method 300 may have an obtaining step 310, which may be the same or similar of one of steps 110 and 210 of the methods 100 and 200, the discussion thereof being therefore skipped for brevity. However, at step 112 and/or 114 of method 300 simulations may be avoided. Actual measurements 313 may be obtained from a mobile device which is operated by a network operator, and whose position may be already known with high degree of precision and reliability (alternative examples are discussed below). At substep 114 there may be performed correlations to obtain CIRs 315 associated to the signals obtained from the measurements 313. At substep 116 a present CIRCC 317 may be obtained, e.g. similarly than in steps 117 and/or 217 (but, in some examples, without simulations). Hence, a present CIRCC 317 (having statistical parameters, such as LSPs, obtained from the CIRs 315) may be obtained on the basis of actual measurements 313, for example.

The method 300 may be considered to have a first cycle 386 parallel to a second cycle 387.

In the first cycle 386, the obtaining step 310 may be performed intermittently. The obtaining step 310 may be repeated e.g. every "n" time units (e.g., after having waited, by virtue of step 385 of a time period of "n" hours, days, months, e.g. n=1 or n=2, or every "n" days, e.g. n=20 or n=30 . . . ).

In other cases, the new iteration of cycle 386 may be triggered by determining a condition of changed environment, e.g., based on an inertial sensor (which may determine a sensed profile which suggests a change of the environment) or other sensors, such as navigation sensors.

The sensor may provide information suggesting a change of environment, the information suggesting the change of environment triggering a new session of intermittently obtaining a present CIRCC (317).

At a new repetition of step 310 (after transition 385*a*), a new present CIRCC 317 may be obtained (e.g., through new measurements of the type of those disclosed for FIG. 12(*b*)), e.g. by using a vehicle operated by an operator (e.g., network operator, etc.). Therefore, a new present CIRCC 317 is obtained (e.g., in the same way of the CIRCC 117 and/or 217, but maybe without simulations). As explained above, the currently-used CNN (e.g. 233) is already trained (e.g., obtained through method 100 or 200 as discussed above) and is operating. The step 310 of FIG. 14 is not necessarily meant at specifically training a new CNN, but may be primarily used to subsequently (at step 380) verify the correctness of the currently-used CNN (e.g. 233). Basically, the cycle 386 is mainly defined for intermittently checking the correctness of the currently-used CNN (or at least one of the parametrizations of the current CNN).

At step 380, a check may be performed to verify whether the present CIRCC 317 (e.g. as obtained at the step 310) fits to the previously obtained CIRCC (e.g. 117 or 217) which had been used for training the currently-used CNN and/or for choosing the selected parametrization 233. For embodying the check at step 380, it is possible to use a similarity check, such as cosine similarity, cross correlation, Pearson correlation etc. In some examples, it is possible to train a function approximation (e.g. NN) that learns to reconstruct the same CIR that it has seen in the training: if we train such a function approximation with "healthy" LoS CIRs it is then possible to reconstruct healthy LoS CIRs without error. When this technique is used live and feed a NLOS or unhealthy CIR there will be the possibility of measuring the reconstruction error at the output. These techniques may therefore be used for embodying the check at step 380.

If the check at step 380 reveals that the CIRCC 317 fits to the CIRCC (e.g. 117 or 217) previously obtained through method 100 or 200 at the time of training the CNN or selecting the parametrization 233, then it may be concluded that the current CNN and/or the current parametrization is still valid, and (transition 381) the current CNN for inferring new ToAs 261 is still relied on for the next inferences at step 260. Therefore, a loop (cycle) 387 may exist in which ToAs 261 are inferred by using always the same (assumed valid) CNN and/or selected parametrization. In particular, at step 388 new CIRs 271 ("predetermined CIRs") may be obtained for predetermined signals for which a ToA is to be inferred (the "predetermined signals" may be, for example, those transmitted from a mobile transmitter whose position is to be inferred). At step 260, the ToAs 261 are inferred by using the present CNN and/or the present parametrization (previously selected).

If the check at step 380 reveals that the CIRCC 317 as obtained at step 310 does not fit to the CIRCC (e.g. 117 or 217) which had been previously obtained through method 100 or 200 (at the time of training the CNN or selecting the parametrization 233), then (transition 382) the use of the current CNN may be ceased as step 384. In case, it is possible to train a new CNN (indicated in FIG. 14 with a new instantiation of the method 100 after transition 384') which may provide a new CNN 131 and/or new parametrization(s) 132. In addition or alternatively, the method 200 may be performed, or another method for training the CNN, so as to obtain a better parametrization 233 among a plurality of pre-constituted parametrizations 132.

Therefore, at least some of the features of method 300 are here resumed:

A current CNN (or a current parametrization) may already be present, trained and currently used, and it may be verified at step 380 whether a new CNN shall be used (e.g. newly trained, with or without performing new measurements) or if the existent CNN (or parametrization) can remain.

There may be a step 310 of (intermittently) "obtaining", in which a new present CIRCC 317 is obtained (using known ToAs) (in FIG. 14, the intermittency is depicted with the step "wait" 385).

There may be a step 380 of "checking" whether the freshly-obtained CIRCC 317 is similar to the previous CIRCC 117 (which has been previously used for training the currently used CNN) or 217 (which has been used for choosing the selected parametrization 233).

If the check at step 380 is positive, then (381) at steps 260 and 388 (cycle 387) the next inferences 261 will be still performed using the current CNN and/or the current parametrization.

Otherwise (382), at step 384 the process may end (it could be possible to use method 100 to start training a new CNN with a fresh CIRCC, and/or choose another parametrization 233 among the plurality of parametrizations 132 at step 220 of method 200, or different methods for inferring the next ToAs could be used, hence deactivating the current instance of step 260 of method 300).

Method 300 may therefore be regarded as a method for inferring a predetermined time of arrival (261) of a predetermined transmitted signal on the basis of channel-impulse-responses, CIRs, of transmitted signals between a mobile antenna (145) and a fixed antenna (140), the method comprising:

(310) intermittently obtaining [e.g. by way of a intermittently performed measurements, e.g. in case of first initialization or reinitialization; this situation may encompass the mobile transmitter 145 which intermittently passes the fixed antenna, as well as identifying trustful mobile antennas whose CIRs fit to a new CIR-statistic—suggesting a changed environment— and for which we can by other means determine the ToA data pretty well (because the car is driving in a continuous traffic, for instance, and we have other sensors on board such as inertial sensors, satellite navigation etc.)] a present CIRCC (317) [examples: the set of {DL, KF, position}'s, the set of {DL, KF}; the pdf of the latter set] which is descriptive of channel impulse responses of transmitted signals associated with mobile antenna positions within a reach of the fixed antenna (140);

(380) checking whether the present CIRCC (317) fits to a predetermined present CIRCC (117, 217) with which a predetermined parametrization (233) of a neural network (131) is associated, and as long as the check (380) reveals that (381) the present CIRCC (317) fits to the predetermined present CIRCC (117, 217) through which the CNN has been trained, inferring (260), using the neural network (131), parametrized using the predetermined parametrization (131) (e.g. from the channel impulse response of transmitted signals), the predetermined time of arrival (261), and as soon as the present CIRCC (317) no longer fits to the predetermined present CIRCC (117, 217), cease (384) the use of the neural network (131), parametrized using the predetermined parametrization (132), for inferring from the channel impulse response of transmitted signals the time of arrival.

In some examples, the step 310 may be based on signals which are not transmitted through a vehicle operated by an operator, but on the signals of the mobile antenna whose position is to be inferred. Hence, in some examples, the step 310 (and in particular its substep 114) may actually also embody the step 388, and the CIRs 315 and 271 may also be the same. Therefore, the check at step 380 may be based on the signal sent by the mobile device whose position is to be inferred.

In addition or in alternative, the measurements 313 (and/or the subsequent CIRs 315 and/or CIRCC 317) may also be used for retraining the CNN after the transition 384'. Hence, the instantiation of method 200 or step 220 (or method 200) as obtained through the transition 384' from step 384 may actually be performed by using the measurements 313 (and/or the subsequent CIRs 315 and/or CIRCC 317).

In some examples, the same measurements 313 (and the subsequent CIRs 315 and/or CIRCC 317), if transmitted by or received by a mobile device (UE) whose position is to be inferred, may be used for both the check at step 380, for inferring the position of the mobile device at step 388, and for retraining the CNN or reparametrizing it after transition 384'. Notably, in some cases, the triggering of the new obtaining step 310 may be initiated by the mobile device (UE), e.g. on the basis of sensors of which the mobile device is embedded with. For example, an inertial sensor may provide a sensed profile compatible with the change of environment. In other cases, it could be another sensor, such as a navigator sensor (a GPS sensor, etc.). Hence, if internal sensors of the mobile device provide information suggesting the change of environment, new measurements 313 may be triggered for starting a new cycle 386 and perform a new check 380.

Notably, one neural network (or more in general one function approximator) may be checked for each of the fixed receivers 140-1 to 140-3, and method 300 may be reinstantiated for each of the fixed receivers. Hence, it may in principle happen that, while the present CNN or parametrization is correct for one fixed receiver (and the relative instantiation of step 380 outputs a positive result 381), simultaneously the present CNN or parametrization is invalid for one fixed receiver (and the relative instantiation of step 380 outputs a negative result 382). At that point, it may be decided whether it is still possible to infer some ToAs at step 260 or whether the service is to be discontinued. Basically, steps 310, 380 and the steps originated from them (e.g. steps 260, 384) may be instantiated for each antenna independently from each other.

Above, reference has mainly be made to the step 384 as ceasing the use of the NN. However, in some examples it is possible to start a compensation stage, in which the use of the NN is not fully abandoned, but switched to a compensation stage which does not provide a service (e.g., ranging the mobile antenna) but interprets and/or learns from the situation, to improve the system and to retrain the method.

As discussed above, the ToAs may be relative ToAs (see above).

The mobile antenna may be the transmitter (and in that case the receiving antenna is the fixed antenna(s)), or the mobile antenna may be the receiver (and in that case the transmitting antenna is the fixed antenna(s)).

Elements above therefore may contribute to define a system for inferring a predetermined time of arrival (e.g. 261) of a predetermined transmitted signal on the basis of channel-impulse-responses, CIRs, of transmitted signals between a mobile antenna and a fixed antenna, the system including the fixed antenna. The system may be configured for:

(e.g. at step 310) intermittently obtaining a present channel impulse response condition characteristic, CIRCC (e.g. 317), which is descriptive of CIRs (e.g. 315) of transmitted signals associated with mobile antenna positions within a reach of the fixed antenna (e.g. 140);

(e.g. at step 380) checking whether the present CIRCC (e.g. 317) fits to a predetermined present CIRCC (e.g. 117, 217) with which a predetermined parametrization (e.g. 233) of a neural network, or a function approximator, (e.g. 131) is associated, and (e.g. at step 387) as long as the check (e.g. 380) reveals that (e.g. 381) the present CIRCC (e.g. 317) fits to the predetermined present CIRCC (e.g. 117, 217), inferring (e.g. 260), using the neural network or the function approximator (e.g. 131), parametrized using the predetermined parametrization (e.g. 233), the predetermined time of arrival (e.g. 261), and as soon as (e.g. 382) the present CIRCC (e.g. 317) no longer fits to the predetermined present CIRCC (e.g. 117), cease (e.g. 384) the use of the neural network, or the function approximator (e.g. 131), parametrized using the predetermined parametrization (e.g. 233), for inferring the predetermined time of arrival, and/or initiate a compensation step in which the neural network, or the function approximator (e.g. 131) is analyzed and/or retrained.

Basically, any of the features of the methods above and below may characterize operations of the system.

There is also defined a user equipment, UE, for inferring a predetermined time of arrival (e.g. 261) of a predetermined transmitted signal on the basis of channel-impulse-responses, CIRs, of transmitted signals between the UE and a fixed antenna. The UE may include a mobile antenna. The UE may be configured for:

(e.g. 310) intermittently obtaining a present channel impulse response condition characteristic, CIRCC (e.g. 317), which is descriptive of CIRs (e.g. 315) of transmitted signals associated with UE positions within a reach of the fixed antenna (e.g. 140);

(e.g. 380) checking whether the present CIRCC (e.g. 317) fits to a predetermined present CIRCC (e.g. 117, 217) with which a predetermined parametrization (e.g. 233) of a neural network, or a function approximator, (e.g. 131) is associated, and (e.g. 387) as long as the check (e.g. 380) reveals that (e.g. 381) the present CIRCC (e.g. 317) fits to the predetermined present CIRCC (e.g. 117, 217), inferring (e.g. 260), using the neural network or the function approximator (e.g. 131), parametrized using the predetermined parametrization (e.g. 233), the predetermined time of arrival (e.g. 261), and as soon as (e.g. 382) the present CIRCC (e.g. 317) no longer fits to the predetermined present CIRCC (e.g. 117), cease (e.g. 384) the use of the neural network, or the function approximator (e.g. 131), parametrized using the predetermined parametrization (e.g. 233), for inferring the predetermined time of arrival, and/or initiate a compensation step in which the neural network, or the function approximator (e.g. 131) is analyzed and/or retrained.

Basically, any of the features of the methods above and below may characterize operations of the UE.

Examples of Classification of a Mobile Antenna

Similarly to above and below, it is here mainly discussed method 400 using the notion of "CNNs", which however can be generalized in "NNs" and more in general in function approximators.

In operation (e.g. when a position of a user's mobile device is to be inferred), it is possible to perform a classification of a mobile antenna of which ToA 261 is inferred. This result may be obtained, for example, when the CNN 131 has already been trained (e.g., after having used method 100) and/or when the selected parametrization 233 has already been chosen (e.g., like in method 200 and in method 300), and/or when the correctness of a CNN is verified (e.g. at method 300).

Figure 15A:
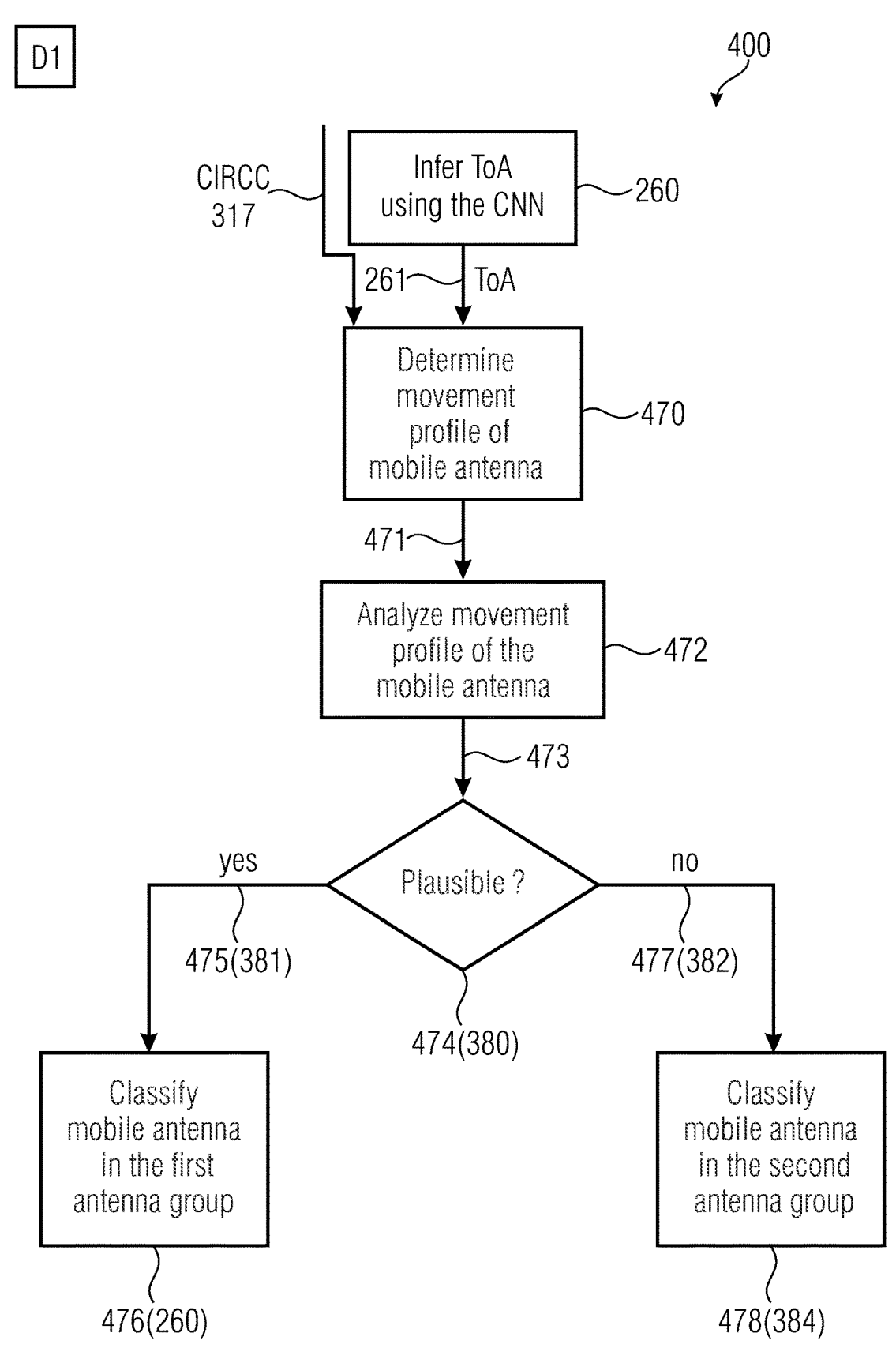
FIGS. 15($a$) and 15($b$) show a method for classifying a mobile antenna.
Figure 15B:
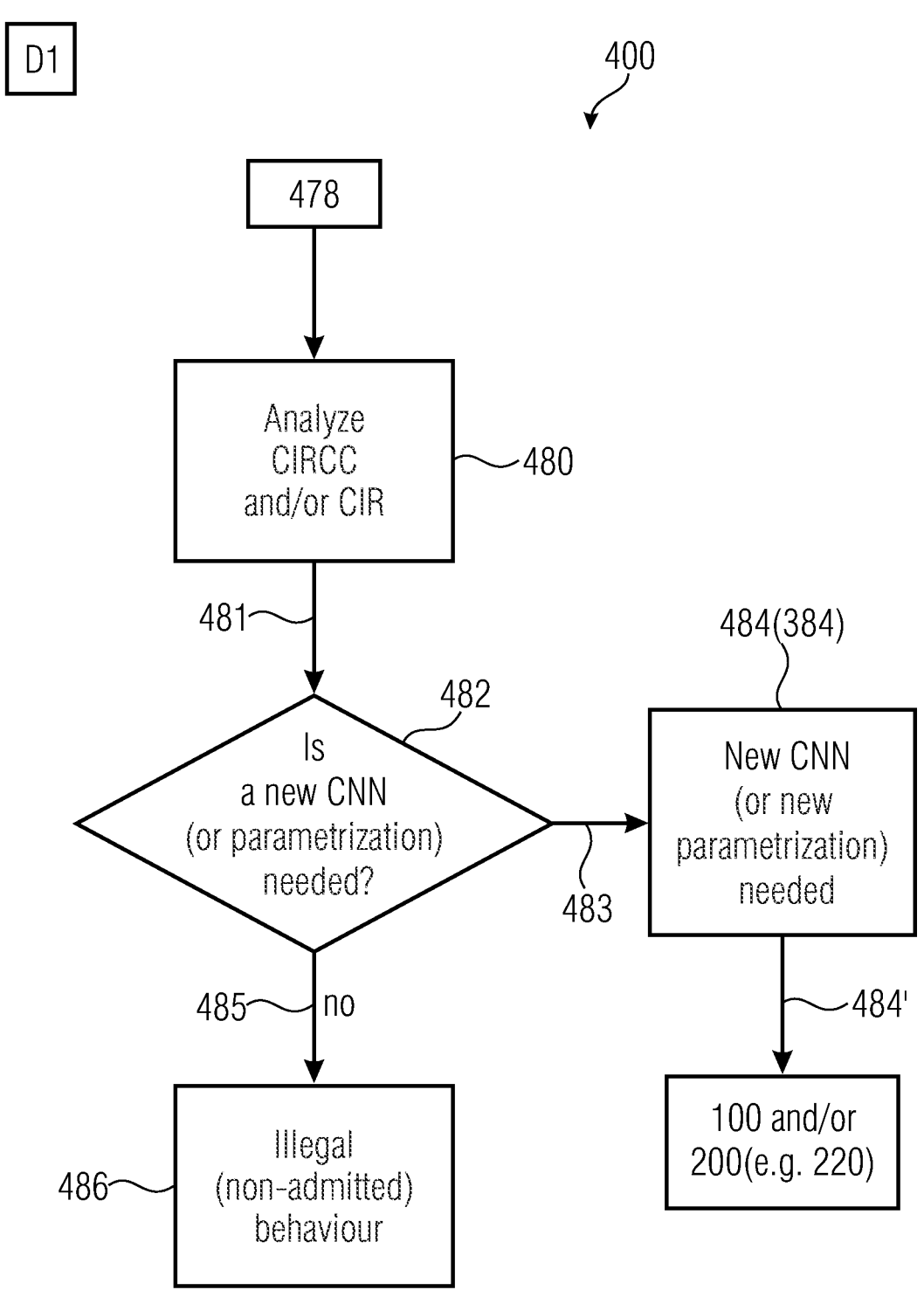

In FIG. 15(*a*), an example of method 400 is presented.

A step 260 of inferring a ToA 261 may be e.g. instantiated by one fixed antenna 140 or multiple fixed antennas 140-1 to 140-3 scattered throughout the terrestrial surface. By taking into consideration the evolution of the ToAs (e.g., by analyzing the subsequent positions taken in the movement of the user or in any case by determining the sequence of the obtained ToAs), it is possible to determine a movement profile 471 of the mobile antenna at step 470. The movement profile 471 of the mobile antenna (e.g. user's mobile transmitter or receiver) may be, for example, associated to the speed of the mobile antenna in the space (e.g., the speed of a vehicle in which the mobile antenna is stably mounted). The determination of the movement profile 471 at the step 470 may take into consideration the different ToAs obtained at multiple fixed antennas 140-1 to 140-3 (e.g., by making use of a TDoA technique or other techniques).

At step 472, the determined movement profile 471 of the mobile antenna may be analyzed. The output 473 of step 472 may be subjected to a plausibility check 474. If the movement profile 471 of the mobile antenna is plausible (transition 475), then the mobile antenna is classified as an antenna encompassed in a first antenna group at step 476. By classifying the mobile antenna in the first antenna group, both the movement profile of the mobile antenna and the CNN (and/or its parametrization) used for inferring the ToA are approved. Basically, the CNN (and/or its parametrization) is considered to be validated and/or the behavior of the user of the vehicle is also considered to be legal.

If, at the plausibility check 474, the movement profile 471 is held non-plausible (transition 477), then the mobile antenna is classified in a second antenna group. The second antenna group may be understood as either comprising antennas for which the user's behavior is illegal (e.g., the vehicle's speed is so high that the CNN) or antennas for which the current parametrization of the CNN does not permit to obtain plausible data, or that the CNN is not correct (e.g., the environment or the weather or other conditions have been changed from the time to which the CNN had been trained, or from the time at which the parametrization had been selected, or at the time at which the check 380 had been performed with success), and the CNN is therefore invalid and shall be retrained).

FIG. 15(*b*) shows a subsequent method that can be implemented after method 400 (and may also be considered to be part of an example of method 400). Step 480 is initiated after step 478 of FIG. 15(*a*), but not from step 476. More in general, at step 480, it may be possible to analyze statistical data regarding measurements taken from the transmissions sent by the classified mobile antenna. When the statistical data 481 (e.g., CIRCC and/or CIR) is obtained, a check is performed at step 482. In particular, it may be verified whether a new CNN is needed (or a new parametrization for the CNN is needed). For example, step 482 may analyze whether the characteristics of the CIRCC 481 are compatible with the presence of a modified environment or weather or other conditions, for example. For example, the simulator of step 120 (e.g. Quadriga) may be used for finding out whether the environment (or weather or other conditions) has been changed or whether simply a non-admitted (e.g., illegal) behavior is detected. If at step 482 it is understood that simply a new CNN or a new parametrization is needed, then (transition 483) it will be concluded at step 484 that a new CNN or a new parametrization is needed. Accordingly, for example, (transition 484') the method 100 could be performed again and/or the statistical data (e.g., CIRCC and/or CIR 481, together with the ToA 261 obtained at step 260 or method 400) will be used for training a new CNN or for finding out a new parametrization suitable to the new situation, environment, weather, condition, etc.

To the contrary, if at check 482 it is understood that a new CNN or a new parametrization is not needed but simply an illegal (or, in any case, unadmitted) behavior is present, then (transition 485) the presence of an illegal behavior is acknowledged at step 486. Accordingly, the CNN will not be changed. In case, legal consequences may follow for the user.

The method 400 may be performed in case of plurality of fixed antennas (e.g. synchronized with each other), each antenna having its own NN or parametrization independently. In this case, the plausibility check at step 474 (and its consequences at steps 476 and 478) may be reinstantiated for each fixed antenna. Also steps 480 and 482 may be reinstantiated for each fixed antenna. However, the judgment of illegal behavior at step 486 is in general unique.

It is noted that method 400 may be instantiated together with method 300. For example, in addition or in alternative to obtaining the movement profile 471 from the inferred ToA 261, the movement profile 471 could also be obtained from the new present CIRCC 317 (e.g. when in method 300 the obtaining method 380 is performed on the same signals transmitted by the mobile antenna of which the ToA 261 is to be inferred). In that case, it could also be possible to implement the plausibility check at step 474 as being an embodiment of the step 380 of checking of method 300. The correspondences between method 400 and method 300 are indicated in FIG. 15(*a*) in parentheses: if the check at 474 (380) is positive (plausible), then the mobile antenna is classified in the first group (476), which means that it is possible to perform further inferences at step 260; and if the check at 474 (380) is negative (non-plausible), the mobile antenna is classified in the second group at 478, with consequences like ceasing the use of the current NN (384) and retraining or reparametrizing the NN (and in fact, in FIG. 15(*b*) step 484 has the same consequences of step 384 of FIG. 14).

In other examples, methods 300 and 400 are different methods.

As explained above, the ToAs may be relative ToAs (see above). The mobile antenna may be the transmitter or receiver (as discussed above).

There is also disclosed a system (e.g. 400) for classifying (e.g. 476, 478) a mobile antenna, exchanging predetermined transmitted signals with a fixed antenna, on the basis of a predetermined channel-impulse-response, CIR (e.g. 217, 317), from which a time-of-arrival measurement (e.g. 261) is to be performed. The system may comprise the fixed antenna. The system may be configured for:

using a neural network or function approximator (e.g. 131) for inferring (e.g. 260) from the CIRs of the predetermined transmitted signals, times of arrival (e.g. 110) of the predetermined transmitted signals exchanged between the mobile antenna and the fixed antenna, determining (e.g. 470), based on the time of arrival measurements (e.g. 261), or channel impulse response condition characteristic, CIRCC (e.g. 317), which is descriptive of channel impulse responses of the transmitted signals exchanged between the mobile antenna and the fixed antenna, a movement profile (e.g. 471) of the mobile antenna, analyzing (e.g. 472) the movement profile (e.g. 473) of the mobile antenna in terms of plausibility, in case of the movement profile (e.g. 471) of the mobile antenna being plausible (e.g. 475), classifying (e.g. 476) the mobile antenna to a first antenna group, in case of the movement profile (e.g. 471) of the mobile antenna not being plausible (e.g. 477), classifying (e.g. 478) the mobile antenna to a second antenna group.

Basically, any of the features of the methods above and below may characterize operations of the system.

There is also disclosed a user equipment, UE, including a mobile antenna, configured for exchanging predetermined transmitted signals with a fixed antenna, the UE being configured for performing a classification on the basis of a predetermined channel-impulse-response, CIR (e.g. 217, 317), from which a time-of-arrival measurement (e.g. 261) is to be performed, the being configured for:

using a neural network or function approximator (e.g. 131) for inferring (e.g. 260) from the CIRs of the predetermined transmitted signals, times of arrival (e.g. 110) of the predetermined transmitted signals exchanged between the mobile antenna and the fixed antenna (e.g. from the fixed antenna to the mobile antenna), determining (e.g. 470), based on the time of arrival measurements (e.g. 261), or channel impulse response condition characteristic, CIRCC (e.g. 317), which is descriptive of channel impulse responses of the transmitted signals exchanged between the mobile antenna and the fixed antenna, a movement profile (e.g. 471) of the mobile antenna, analyzing (e.g. 472) the movement profile (e.g. 473) of the mobile antenna in terms of plausibility, in case of the movement profile (e.g. 471) of the mobile antenna being plausible (e.g. 475), classifying (e.g. 476) the UE to a first antenna group (see above), in case of the movement profile (e.g. 471) of the mobile antenna not being plausible (e.g. 477), classifying (e.g. 478) the UE to a second antenna group (see above).

Basically, any of the features of the methods above and below may characterize operations of the UE.

Example of Ranging (Positioning, Locating)

Figure 2:
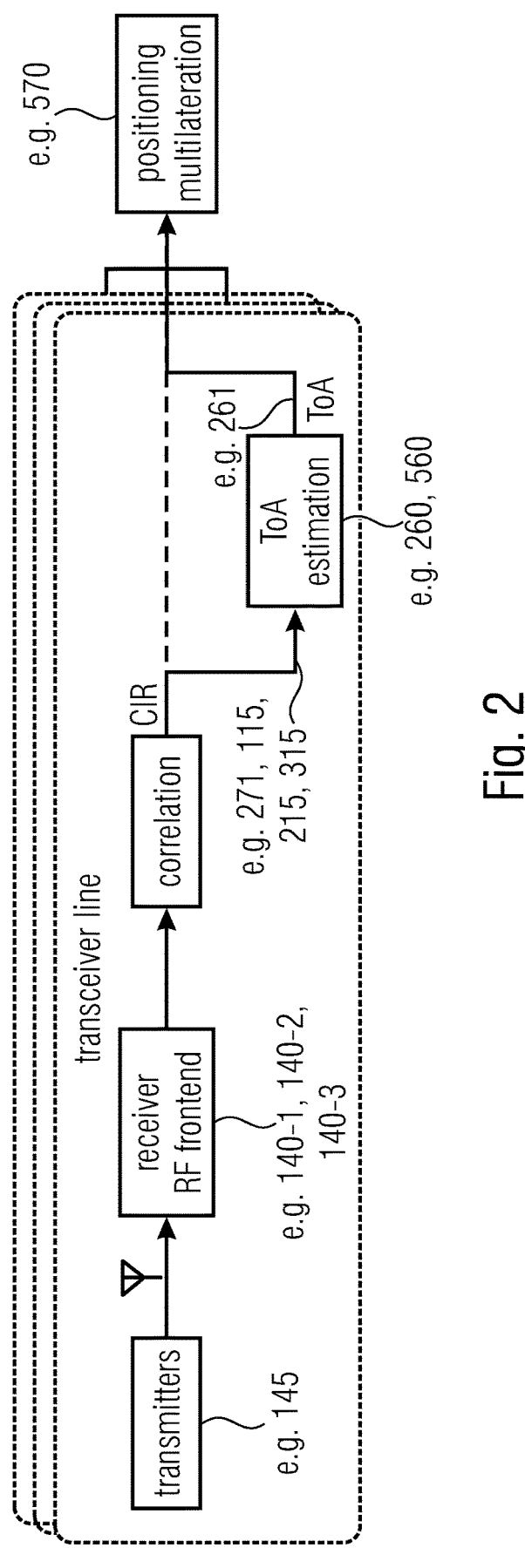
FIG. 2 shows a RF-based positioning: multiple synchronized transceiver pipelines provide a set of either ToA or CIR data. From there, a least-squares optimizer multilaterates a position.
Figure 16A:
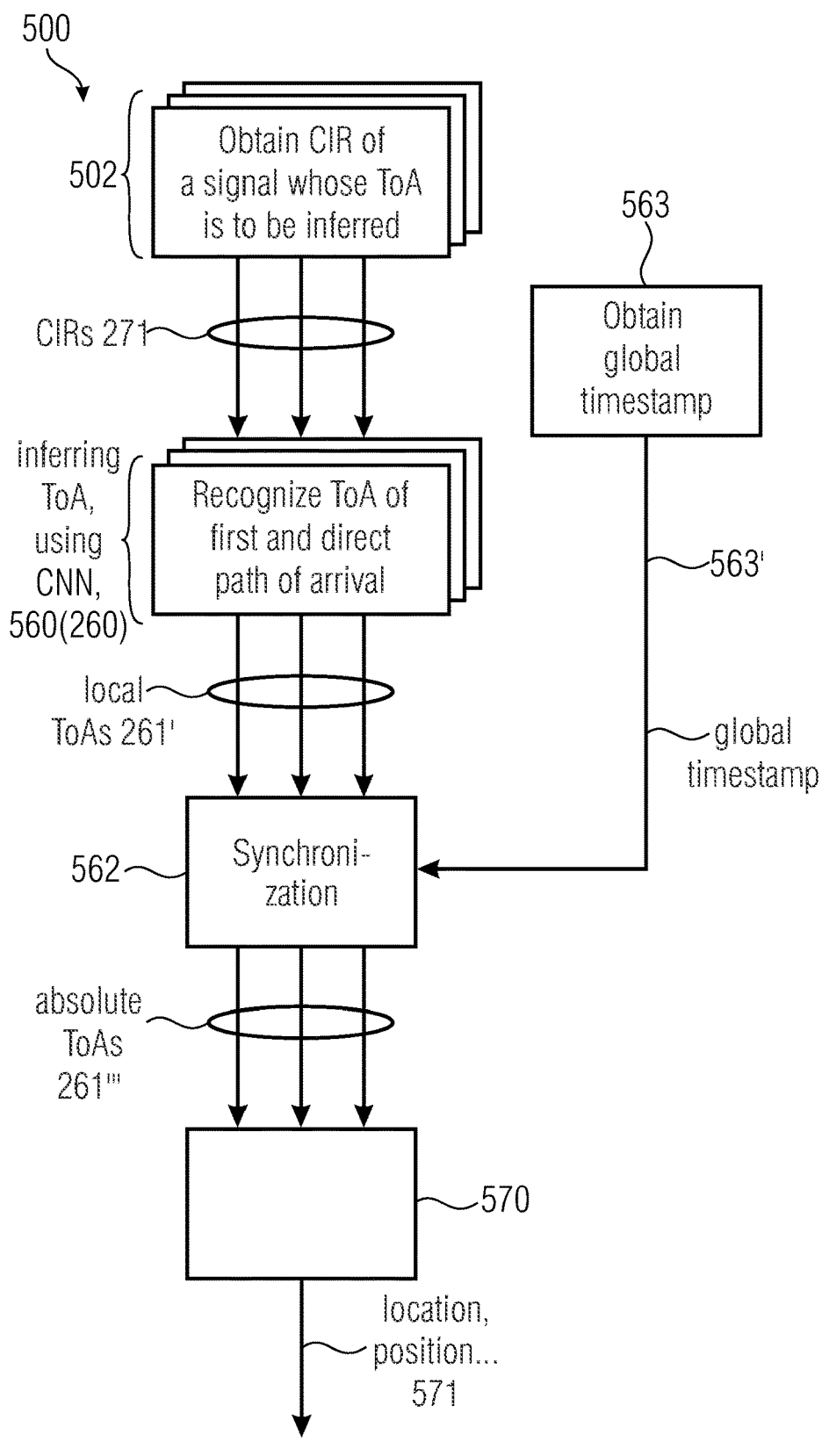
FIGS. 16($a$) and 16($b$) show methods associated to inferring ToAs, e.g. used for ranging (positioning, locating) operation.
Figure 16B:
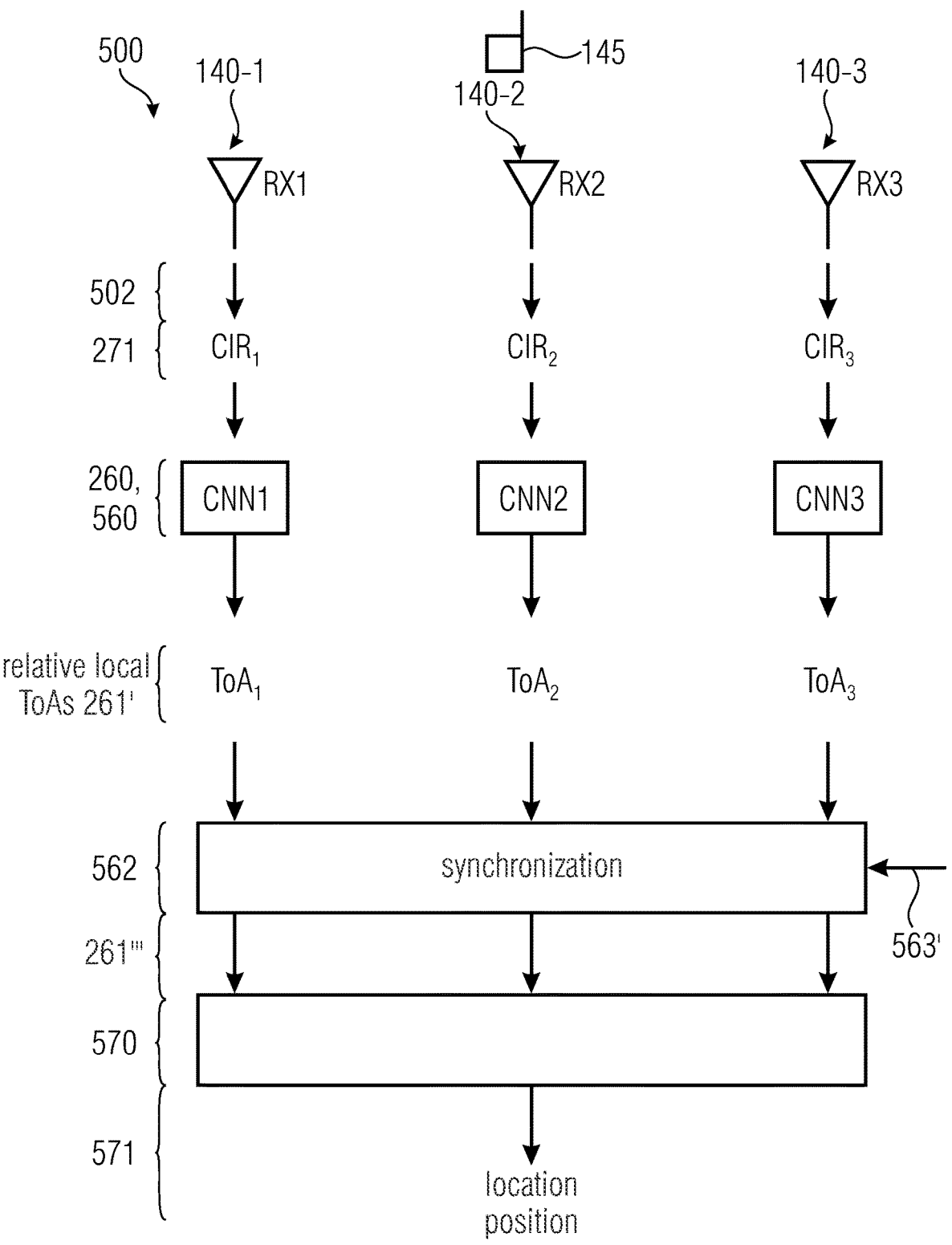

It is now possible to exemplify a positioning method using a CNN (or an NN, or a function approximator) as above, with reference to FIGS. 16(*a*), 16(*b*) (reference could also made to FIG. 2, where some reference numerals are shown to correspond to the reference numerals of other figures for the sake of clarity).

A positioning (ranging, locating) method 500 may include using a CNN 131 as obtained from method 100 and/or as parametrized in method 200.

The method 500 may include a step of (560) inferring (which may be step 260 of method 200, 300 or 400) a ToA of a signal transmitted between a mobile antenna, whose position is to be obtained, and a plurality of fixed-position antennas (whose position is known), e.g. 140-1, 140-2, 140-3 as in FIG. 1. It is here imagined that the signal is transmitter from the mobile antenna 145 to the fixed-position antennas 140-1, 140-2, 140-3, but the reversed direction is also possible.

The method 500 may comprise comparing the relative ToAs obtained at the different antennas 140-1, 140-2, 140-3, e.g. comparing the time difference of arrival (TDoA) between the different fixed antennas 140-1, 140-2, 140-3 (the faxed antennas may be synchronized with each other through cable).

The method 500 may include inferring the position of the mobile transmitter (mobile antenna) from the obtained TDoAs.

Any of methods 100, 200, 300, 400 and 500 may be used, for example, in a telecommunication system (e.g., LTE, 3G, 4G, 5G) for inferring the position of the mobile transmitter (which may be a user equipment, UE, for which transmissions/receptions are to be directioned.

In addition or alternative, the fixed antennas may send, to the mobile transmitter, signaling data encoding the positional data (e.g. the position in the terrestrial globe) so as to permit the mobile transmitter to provide positioning information to a user (e.g. for navigating in the traffic, etc.).

As shown in FIGS. 16(*a*) and 16(*b*), the method 500 may include instances 502 (e.g., one for each fixed receiver 140-1, 140-2, 140-3) obtaining CIRs 271 of a signal whose ToA is to be inferred. Notably, each fixed receiver 140-1, 140-2, 140-3 obtains in general a different CIR 271, since the fixed receivers are in different places and the MPCs arrive differently to the different fixed receivers 140-1, 140-2, 140-3. Further, different fixed receivers may be associated, as discussed above, to different function approximators and/or to different parametrizations.

At step 260 (560), using the CNN (e.g. as obtained through method 100 and/or parametrized through method 200 and/or verified through method 300) instances 560 of a step for recognizing a ToA (associated to the FDPoA) are performed. Each ToA is in general different for each fixed receiver 140-1, 140-2, 140-3, due to the (probable) different distances (and different FDPoAs) of the mobile transmitter from the different receivers 140-1, 140-2, 140-3 and also because of the (probable) different CIRs 271 obtained from different receptions (by the different receivers 140-1, 140-2, 140-3) of the signal transmitted by the mobile transmitter whose position is to be inferred. Therefore, different local ToAs 261' are obtained for each receiver 140-1, 140-2, 140-3. Notably, the local ToAs are relative ToAs (e.g. lags of the FDPoA in the CIR).

The local ToAs 261' may then be synchronized at step 562, to obtain three absolute ToA 261" synchronized with each other.

At step 564 a global timestamp 563' (obtained at step 563) may be added, so as to obtain an absolute ToAs 261".

At step 570 a positioning (e.g., in the terrestrial globe) may be performed to correctly infer the mobile transmitter at position 571. Step 570 may be performed by relying on known techniques: however, the precision and the reliability reached at step 570 (and more in general in all the inferences of the ToA) is higher than in the known technology: since the ToA of the FDPoA is correctly recognized, the ToA is more precise and the position of the transmitter is more reliable.

Notably, we "calibrate" the signals to the environment, but this happens "outside" the neural network (not used in steps 562, 563, 564), hence the present technique is quasi "relative" and therefore, can generalize to different propagation scenarios.

A way for obtaining the synchronization may embed multiple steps, such as at least one of:

1) collecting the data from all receivers, or (transmitters in case of inverse TDoA, i.e., downlink TDoA),
2) sorting and finding the corresponding ones, here sometimes upscaling is used to find a common time base with a reference signal,
3) padding the data such that the time is embedded into the CIR, in some examples.

(There is also the possibility to let various NN estimate the best relative ToA for each relative CIR before the synchronization, then the absolute time is fed to a NN next to all the relative ToAs, this absolute time holds the synchronization semantic, used at this stage is that the we first sort the relative ToAs and total ToAs for each CIR such that we find the oldest one, the one that arrived first, than such that the network can pad and align the relative ToAs to that absolute timestamp.)

There is also disclosed a system for locating a mobile antenna. The system may include at least one fixed antenna (e.g. 140, 140-1, 140-2, 140-3) and use a neural network, or function approximator, e.g. trained according for example method 100. The system may be configured for:

inferring (260) a time of arrival of a signal transmitted between the transmitting antenna and the at least one fixed antenna (140, 140-1, 140-2, 140-3), by using the neural network, or the function approximator, (131); and inferring the position of the transmitting mobile antenna from time differences of arrival.

There is also disclosed a system for locating a mobile antenna, the system including at least one fixed antenna (140, 140-1, 140-2, 140-3), e.g. a plurality of antennas, and using a neural network (e.g. 131) or a function approximator. The system may be configured for:

by using a method according to any of claims B1-C99, inferring (260), at a time of arrival (261) of a signal transmitted between the mobile antenna (145) and the at least one fixed antenna (140, 140-1, 140-2, 140-3), by using a neural network or a function approximator, (131), wherein the time of arrival (261) is a relative time of arrival;

synchronizing (562) the relative time of arrival to obtain an absolute time of arrival;

inferring (570) the position of the transmitting mobile antenna from the absolute time of arrival.

There is also disclosed a user equipment, UE, including a mobile antenna, the UE using a neural network, or function approximator, trained according to method 100, for example.

The UE may be configured for:

inferring (260) a time of arrival of a signal transmitted between the transmitting antenna and at least one fixed antenna (140, 140-1, 140-2, 140-3), by using the neural network, or the function approximator, (131); and inferring the position of the transmitting mobile antenna from time differences of arrival.

Further, a UE may include a mobile antenna. The UE may use a neural network (e.g. 131), or function approximator. The UE may be configured for:

by using a method according to e.g. method 100, inferring (260), at a time of arrival (261) of a signal transmitted between the mobile antenna (145) and the at least one fixed antenna (140, 140-1, 140-2, 140-3), by using the neural network or the function approximator (131), wherein the time of arrival (261) is a relative time of arrival;

synchronizing (562) the relative time of arrival to obtain an absolute time of arrival;

inferring (570) the position of the transmitting mobile antenna from the absolute time of arrival.

Any of the features discussed above and below may be used for characterizing the operation of the UE or the system.

Discussion

The time-of-flight (ToF) serves as the basis for many radio-based Real-Time Locating Systems (RLTS). We obtain it from the first and direct path of arrival (FDPoA) in a corresponding set of multipath components (MPC) of the underlying channel status information (CSI). While detection of the FDPoA under Line-of-Sight (LoS) is simple, it is prone to errors in environments with specular and diffuse reflections, as well as nonlinear diffraction, absorption, and transmission of a signal. Such Obstructed- or Non-Line-of-Sight (OLOS, NLOS) situations lead to incorrect FDPoA and consequently to incorrect ToF estimates and inaccurate positions. prior-art estimators suffer from a high computing effort and most of them fail at low signal-to-noise ratios (SNRs).

We propose, inter alia, a deep learning (DL) approach to identify optimal FDPoAs as time-of-arrival (ToA) directly from the raw CSI. A 1D Convolutional Neural Network (CNN), e.g. 131, may learn the spatial distribution of MPCs of the CSI to predict correct estimates of the ToA. To train the DL model (CNN), we may (e.g. at step 120) use a simulator such as QuaDRiGa to generate datasets (e.g. 121) with CIRs (e.g. 115) and ground truth ToAs e.g. for typical 5G channel models. We have compared our DL model with the prior-art estimators such as threshold (PEAK), inflection point (IFP), and MUSIC, and show that we consistently outperform them by about 17% for SNRs below-10 dB. Index Terms-ToA Channel Parameter Estimation, Inflection Point, MUSIC, Machine Learning, Deep Learning.

1. Introduction

One of the main contributions is an improved DL-based ToA estimator along with a training concept that simplifies its deployment. We generate synthetic data to implicitly identify and mitigate environmental distance estimation errors by learning a mapping of synthetic CIRs directly to ToAs. This enables us to replace the ToA estimator of a conventional positioning system pipeline. One key idea is (e.g. at step 120) to simulate all possible sets of CIRs and their corresponding FDPoAs as ToAs for a variety of channel models, e.g. typical 5G channel models. Thus, the synthetic CIRs are understood as describing generic propagation environments under different LoS, OLOS, and NLOS conditions. Such data are generated by sampling parameters that may represent a CIR: for example, at least one of bandwidth or delay spread (DS), Rician k-factor (KF), and signal-to-noise ratio (SNR). This allows to learn the complex transition between LOS, OLOS, and NLOS, respectively DS, KF, and SNR, to generalize to unknown propagation environments.

Our experiments show that our DL approach outperforms simple ToA estimators (such as PEAK and IFP, but also MUSIC), at least at SNRs below-10 dB by about 17% on average. Unlike peak and threshold-based methods, our method does not require a-priori information, and unlike super-resolution methods, its performance does not degrade with the number of MPCs. At the same time, our method generalizes well to unknown propagation environments.

The rest discussion is structured as follows. Sec. 2 reviews related work. Sec. 3 formalizes the problem. Sec. 4 describes how we generated training data and introduces our DL architecture. Sec. 5 describes our experimental setup and our baselines. Sec. 6 discusses the results. Sec. 7 concludes.

2. Related Work

Previous work estimates a radio-based position directly from CIRs [9, 10, 16], AoA [52, 64], RSS [38, 52, 54], ToA [19, 22] or combinations thereof [2, 64]. As they concentrate on the estimation of absolute positions, they cannot generalize well to unknown environments with signal information of unknown propagation paths. Hence, we focus on related work that extract features (Sec. 2.1) or ToAs (Sec. 2.2) from CIR.

2.1 CIR-Embedded Information about the Propagation Path.

Handcrafted Information Extraction. The extraction of features from CIRs and their use together with a classifier has been researched in various contexts: energy and delay features for position estimation with neural networks (NN) or classic ML methods [44]; LoS/NLOS classification with support vector machines (SVMs) [13]; Kernel-PCAs combined with Gaussian processes (GP) for ranging [18]; Skew and kurtosis features to approximate the SNR [4]; Approximation of the CIR from subcarrier amplitudes of OFDM signals as a fingerprint along with GP regression [11]. Ergut et al. [5] use a set of anchors to create multipath profiles, i.e., a number of time differences between peaks within a single CIR that are used along with ground truth data to train a NN with a single hidden layer. Another approach estimates channel states (typically LoS or NLoS) from CIRs to allow systematic rejection of multipath impaired signals [14].

However, all of these approaches focus on direct positioning and extract handcrafted functions (all different from ToA) from the CIR. But those features only capture a small part of the information available. Instead, our method estimates a single parameter, a relative ToA, that keeps complexity low and allows better generalization to other environments.

Supervised Information Extraction. In contrast to a handcrafted feature extraction, DL identifies and extracts the relevant features directly from the CSI. Wang et al. [23, 24] estimate AoAs or positions from the CSI of OFDM-signals (using phase fingerprint) with CNNs. Tiemann et al. estimate orientation-dependent error induction properties from the CIR of synchronized antennas with DL. Comiter et al. [3] derive AoAs from two NNs that estimate the antenna beam. Xiao et al. model the noise from reference locations and estimate a location with a denoising auto-encoder along with a k-nearest-neighbor (KNN) classifier. CNNs have also been used to identify NLOS from CIRs [20].

However, while all of these approaches use DL methods to automatically extract features from CIRs, they do not focus on estimating a ToA. This limits the generalization of the trained estimators to different environments and channel models. In practice, such methods have to be (re-)trained with fresh data from the target environment.

2.2 Explicitly Extracting ToAs from CIRs.

Peak and Threshold (PEAK). The simplest technique estimates the ToA by detecting the maximum peak of the correlation function [36]. Other ToA estimators are threshold-based and use fixed SNR and power values [31, 56]. They take into account all peaks above a threshold in relation to the strongest peak. However, the threshold is tuned by hand and only works reliably in LoS situations.

Inflection Point (IFP). Instead, the more sophisticated inflection point method [8] estimates the peak based on the maximum gradient along the first rising edge. This helps to account for the peak detection errors caused by MPCs with similar delays. Although IFP is an improvement over PEAK, it still suffers from multipath and low SNRs.

Super-Resolution. In addition to PEAK and IFP, several super-resolution algorithms have been proposed which in addition to the ToA also estimate different channel parameters (CP) [46, 55, 62] in the frequency and time domain in multipath propagation scenarios [46]: Minimum norm [60], linear forward-backward prediction [35], singular value decomposition [63], and (normalized) minimum variance of a CIR [59]. Often, Expectation Maximization is used to estimate the CSI of individual MPCs using subspace fitting algorithms such as Multiple Signal Classification (MUSIC) [42, 46, 51] and least squares Estimation of Signal Parameters using Rotation Invariance Techniques (ESPRIT) [51]. These are efficient ToA estimators based on superimposed signals. However, a Fourier transform that translates the received signal into its frequency domain causes high computational effort. Moreover, as these methods also use a-priori information, they may not cover all possible propagation scenarios at runtime. Instead, iterative maximum likelihood estimators such as Space Alternating General Expectation (SAGE) and RiMAX [39, 51] are based on maximum likelihood and have less computational complexity. Such estimators outperform other CP estimators that estimate channel characteristics based on SNR or performance thresholds on a single-path channel. While super-resolution techniques can increase the time domain resolution and thus estimate ToA more precisely in multi-path environments, their computational complexity increases significantly [51, 53] in such environments. Hence, they are impractical for many real-world applications.

Previous work either derives several CPs (and thus increases model complexity), reduces generalizability, used a-priori information, or estimates parameters that are irrelevant for a downstream localization task. To the best of our knowledge, we are the first to simulate different channel models to train a DL model on CIRs that estimates ToAs. This allows our model to generalize to both synthetic and real channel models, and is also computationally efficient.

FIG. 2: RF-based positioning: multiple synchronized transceiver pipelines provide a set of either ToA or CIR data. From there, a least-squares optimizer may be used to multilaterate a position.

3. Problem Formalization

It has been understood that the technical issues discussed above can be coped with by studying the problematic as follows.

A radio channel that characterizes the environment is usually defined by a set of parameters that mathematically describes its MPCs. Thus, the channel estimate (CE) describes the propagation of a signal and is used for the receivers to approximate the signals concerned.

3.1 ToA Estimation from Channel Impulse Responses

The input to a ToA estimator is usually a CIR extracted by decorrelating a received signal y(t) with a known pseudo-random sequence s(t). A CIR describes the influence of path-loss and material interactions for a particular signal path. The ToA estimator extracts a signal propagation time from a set of CIR observations of synchronized receivers. Thus, it identifies the delta time, i.e., the relative ToA $\delta(t-T_i)$ in h(t), that corresponds to the FDPoA. The distance between the transmitter and receiver is then determined using the speed of light to multilaterate a position, see the illustration in FIG. 2. Assuming an (ideal) LoS channel with minor MPCs (and unlimited bandwidth), we obtain a correlation by correlating the received signal with the transmitted signal:

$$h(t) \approx y(t) * s(-t), \qquad (1)$$

where * is a convolution. The CIR is modeled as a sum of $N_s$ individual signal paths, represented by Dirac pulses $\delta(t-T_i)$, that are convolved with the CIR of the bandwidth-limited filters with an aligned complex weight at. Thus, $T_i$ refers to the signal propagation time and at describes the influence of path-loss and material interactions for a specific signal path:

$$h(t) \approx \Sigma_{i=0}^{N_s} \alpha_i \cdot \delta(t-T_i). \qquad (2)$$

The actually observed CIRs may, however, differ considerably in a band-limited channel with the bandwidth $B_w$. The limitations are described as multiplication by a rectangular function in the frequency domain. This corresponds to a convolution of the received signal with a normalized sinus cardinalis (SINC) function in the time domain, which leads to a significant overlap of the spatial information contained in the CIR. Thus, the convolution mixes the different impulses with one another. The resulting band-limited CIR $h_{B_w}(t)$ is:

$$h_{B_w}(t) \approx (\Sigma_{i=0}^{N_s} \alpha_i \cdot \delta(t-T_i) * 2 \cdot B_w \cdot SINC(2B_w t). \qquad (3)$$

Figure 3A:
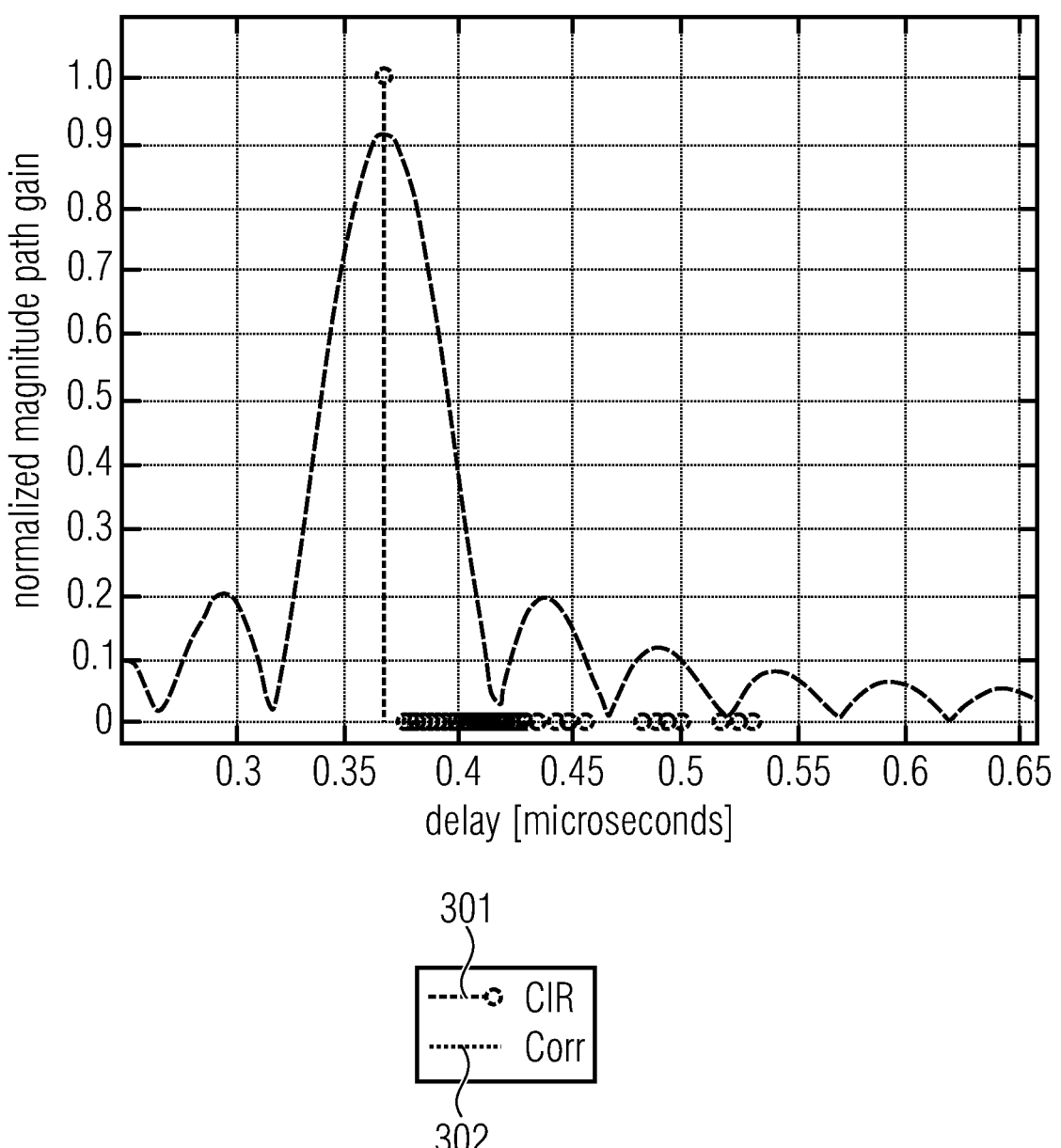
FIGS. 3($a$) to 3($c$) show CIR and related correlator output of different delay spreads (301 unlimited bandwidth; 302: limited bandwidth)
Figure 3B:
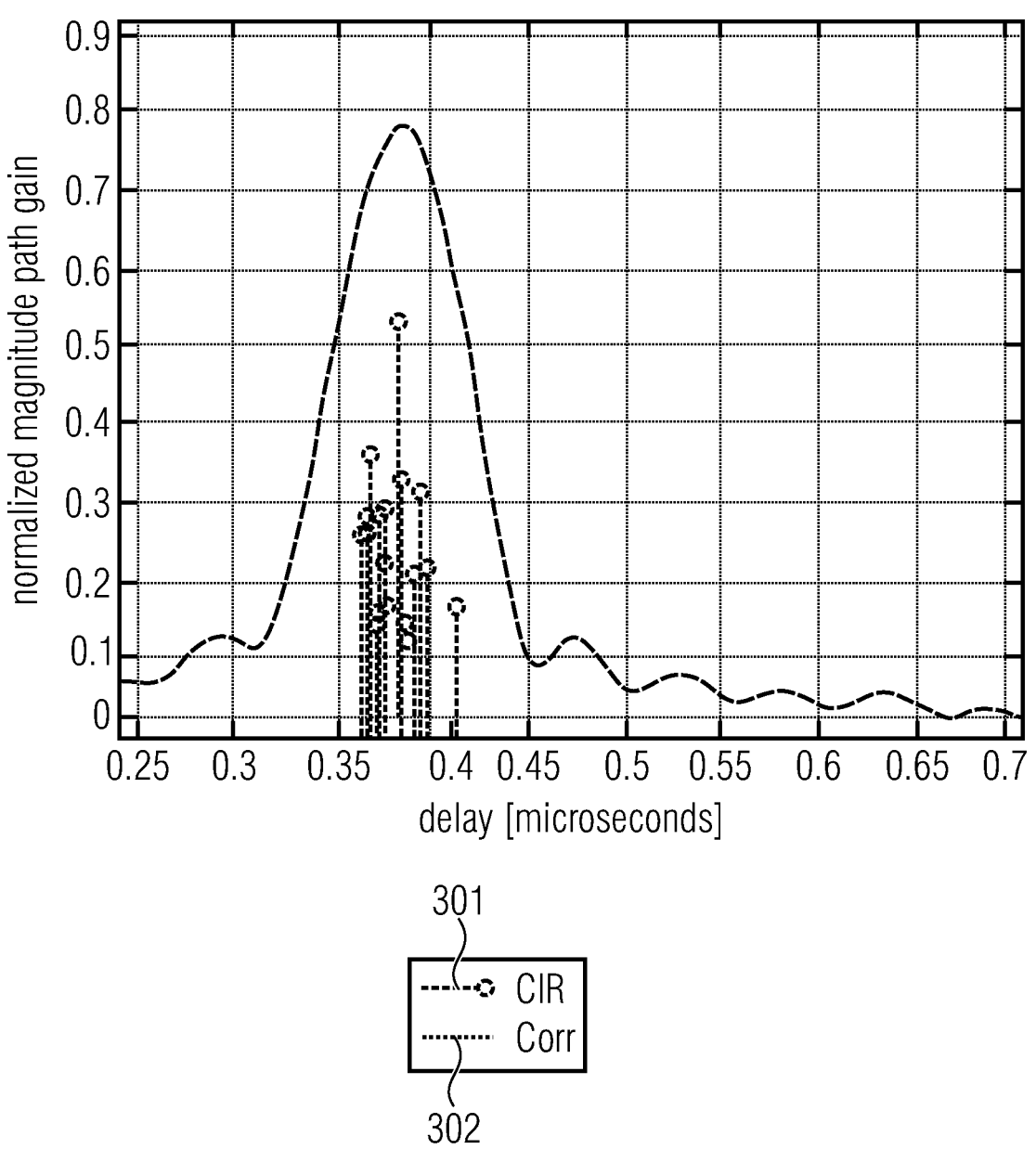
Figure 3C:
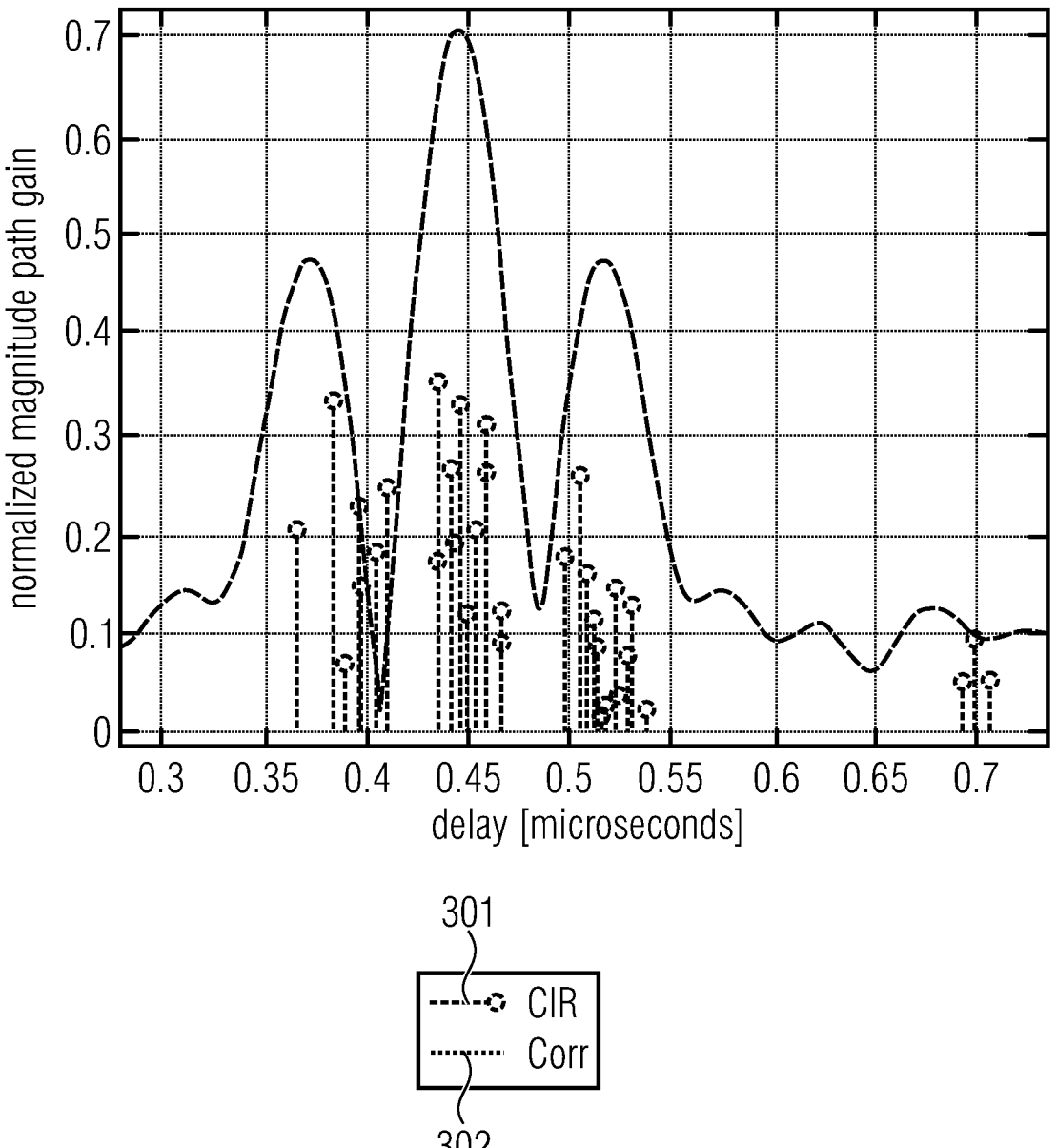

FIGS. 3(a)-3(c) show the impact of different propagation conditions on the magnitudes of the CIRs. The leftmost CIR contains only a single impulse (red). Convolution with the SINC function leads to the correlation signal indicated with 302. If there are multiple peaks (FIGS. 3(b) and (c)), the correlated signal results from an overlap of the SINCs generated by the convolution with the Dirac impulses. The peaks become less distinguishable and we cannot identify the FDPoA easily.

3.2 Characteristics and Limitations of RF-Channels

Extracting the information that represents the correct ToA is challenging. Under multipath propagation the CIR contains many different MPCs. Furthermore, the limited temporal resolution (especially in narrowband channels) limits the accuracy of ToA. The cross-correlation of the received—with the transmitted-signal is a composite of many SINC functions: FIG. 3(b) shows a single cluster of CIRs that form a single peak in the correlation curve, while FIG. 3(c) shows multiple clusters that form three peaks in the magnitude of the correlation function in relation to the CIR. The clusters in FIG. 3(c) show two typical examples of 1) an OLOS case in which the FDPoA, the first cluster, is less delayed but also weaker (due to diffraction and transmission, see also the paths between TX and $RX_3$ in FIGS. 1); and 2) several NLOS cases, the second and third clusters, are higher delayed but are more powerful (due to reflection and scattering, see also the paths between TX (145) and $RX_1$ (140-1), $RX_2$ (140-2), and $RX_3$ (140-3) in FIG. 1).

Therefore, it has been understood that it is possible to state that the expected ToA estimation performance depends on the overall channel statistics, which in turn depends on the environment and the deployment parameters.

Some of these parameters may be used, as explained above, for forming entries of the CIRCC 117, 217, or 317 as discussed above.

At least one of the root-mean-square Delay Spread (DS) and the Rician K-factor (KF) may be used to characterize a CIR (other parameters may be used, but DS and KF are particularly good, as they are LSPs which they tend not to vary too much within some meters). For example, at blocks 116 of the methods 100, 200, 300 discussed above, the CIRCC 117, 217, 317 may include KF and/or DS for characterizing one measurements at each position taken by the transmitter 145.

These statistical model parameters are derived from channel measurements and best describe the propagation conditions within an environment:

(1) The Rician K-factor (KF) that is defined as $$KF = P_{LoS}/P_{NLoS}, \qquad (4)$$

where $P_{LoS}$ is the power of the direct path and $P_{NLoS}$ is the sum of the power of all multipath components. $P_{LoS}$ and $P_{NLoS}$ may be obtained through a rough estimation, e.g. by analyzing the CIRs as they appear in FIG. 3(c).

(2) The Delay Spread (DS) that is defined as $$DS = \sqrt{\frac{1}{P_i} \sum_{l=1}^{L} P_l \cdot (\tau_l)^2 - \left(\frac{1}{P_i} \cdot \sum_{l=1}^{L} P_l \cdot \tau_l\right)^2}, \qquad (5)$$

where $P_i$ represents the total power, $P_l$ the power of the cluster l and $\tau_l$ is the cluster delay normalized by the LoS delay. Also here the values may be, in some examples, first estimated roughly or may be obtained by simulation.

DS and KF are both environment-dependent and can be modeled by statistical distributions. Unfortunately, if the DS is low compared to $1/fSmin$, several SINC functions overlap and form a new shape of the correlation function. We can clearly observe several correlation peaks only for high DS multipath propagation, but each peak may be composed of several SINC functions. The effect of DS (bandwidth limited) is also shown in FIGS. 3($a$) to 3($c$): (from left to right) at higher DS there are more MPCs clusters (see the three clusters of MPCs in FIG. 3($c$)) and it gets harder to identify the correct FDPoA. Thus, the KF gives a rough estimate of how many MPCs negatively affect the FDPoA estimate, and the DS gives a rough estimate of how far MPCs are delayed (delay between the MPC influencing the FDPoA most positively and the MPC influencing it most negatively). Of course, high DS and low KF values represent a worst-case situation to estimate a correct FDPoA in a band-limited channel. This becomes worse with lower SNRs. It is noted that $P_{LoS}$ may be understood as the power of the dominant "LoS" component in a Rician distribution of multipath components. It may occur that, in the real world, the values of the LoS component are unknown, as it might be shifted, delayed, disturbed and so on. A simulator like Quadriga can (e.g. at step 120) define a particular LoS component with a particular power (e.g., chosen with some criteria, chosen randomly, etc.); and the same may be made for the NLoS component(s). So from the perspective of deriving the LoS power from a real-world signal (e.g. from the measurements 113 obtained at step 112 of method 100), the $P_{LoS}$ as obtained could be incorrect: a wrong LoS component could be identified, and therefore the incorrect power can be calculated. This is again one reason for using the present techniques, and machine learning (ML) in general: the current channel state estimate may make mistakes here. The same holds for the power of NLoS.

FIGS. 3($a$) to 3($c$): 3($a$) No multipath. 3($b$) Low delay spread. 3($c$) High delay spread. CIR and related correlator output of different delay spreads (unlimited bandwidth vs limited bandwidth).

3.3 Dealing with Large DS, Low KF, and Low SNR

This is where deep learning (DL) comes in. In terms of interaction with the environment, urban, industrial, and other environments with many scattering, absorbing, and reflecting objects increase the variety of propagation paths and MPCs and hence the ToA estimation error. This becomes particularly critical when the bandwidth and transmission power are also limited. One DL-based approach may identify FDPoAs even in these complicated scenarios as it learns their complex spatial correlation of features from snapshots of CIRs.

4. Methods

Figure 4:
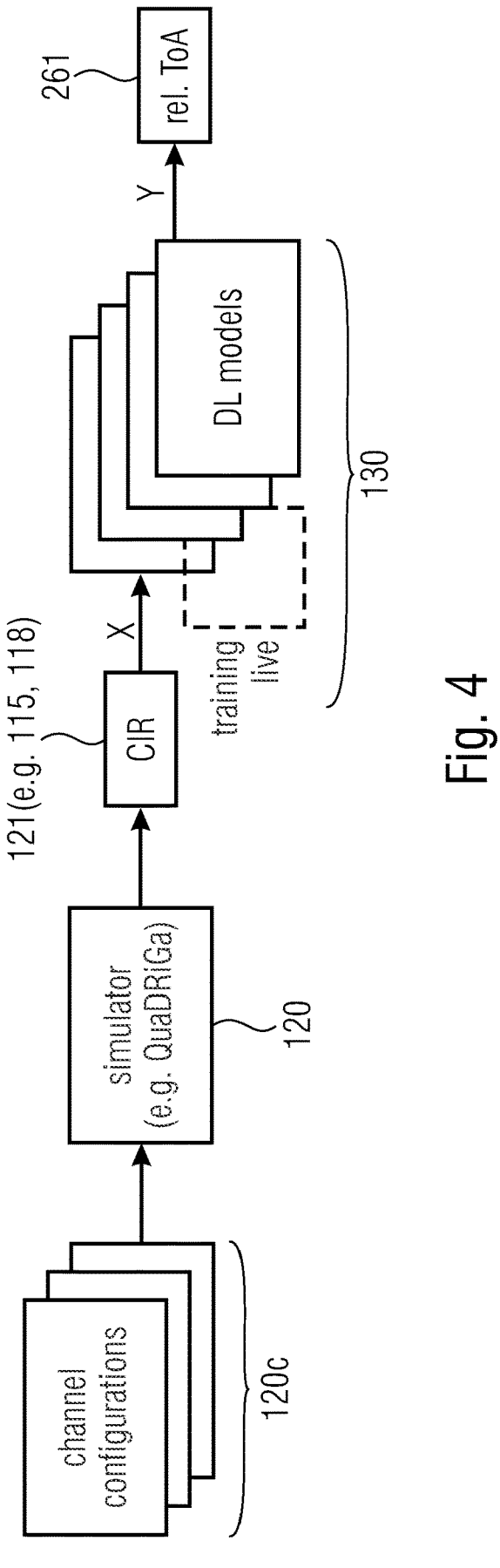
FIG. 4 shows a processing pipeline according to one example.

FIG. 4 shows a possible pipeline (which may follow, for example, method 100 of FIG. 12($a$)): To train our DL model for channel estimation, we generate for step 130 training, validation, and test data with different channel configurations 120$c$ using a simulator (e.g. QuaDRiGa). We sample, at step 120, different combinations of KF and DS along with a varying SNR to generate a variety of simulated CIRs 118 and corresponding ground truth ToA (for example, the ToA of the signal 143 may be obtained in this way). With such combinations we represent predefined propagation conditions for every possible environment. We train our models to assign the CIR to the corresponding ground truth ToA rel. In a subsequent step (not shown), we test all models on both unknown test data and real measurement data.

4.1 Processing Pipeline and Data Acquisition

The selection of the training dataset 121 is important for DL-based approaches. To avoid environment—and implementation-specific training datasets, we may create a composite dataset that covers different scenarios. Besides the probability density functions (PDF) defined in TR38.901 [1], that provide configurations for typical small-scale parameters (SSP), and LSPs like DS, KF, and Doppler, we may also generate data with intermediate values for the large-scale parameters (LSPs), path loss and shadowing. Note that when we simulate at constant velocity and take snapshots as input for our models, we do not explicitly examine the impact of Doppler on the accuracy of ToA, but this can be made when the impact of Doppler effect is relevant.

The entire training dataset 121 may consist of several subsets (which may be associated, for example, to different parametrizations 132 as discussed above). Each subset may be generated using a specific SSP/LSP table that represents an underlying channel characteristic. This approach enables better control of the overall statistics. Besides varying the CIR properties within a given environment, we can also control the probability of the environment. We can model/control the distribution of samples, i.e., where in the environment we want to have how many samples of CIRs being simulated by Quadriga. For example, at any of steps 110 and 120 we can generate different spatial environments with e.g. different furniture so that they lead to different propagation environments and hence we can specifically select the distribution of samples from a certain area. This may be interesting if or when an environment changes and new data needs to be specifically obtained from that environment. This enables the selection of the training dataset 121 according to the applications and the expected environmental conditions (e.g., during the selection at step 220 of method 200). A DL model trained on the entire training data may avoid or minimize scenario-specific training during a system deployment phase.

FIG. 4: Processing pipeline of our framework.

FIGS.: 4($a$) PDF (DS) for 3GPP. 5($b$) PDF (KF) for 3GPP. 5($c$) Joint PDFs for UMi. 5($d$) Joint PDFs for InF.

FIGS. 5($a$) to 5($d$): PDFs and joint PDFs of DS and KF for the 3GPP (TR38.901) scenarios: InF, InO, UMa, UMi, and QuaDRiGa Ind.

4.2 Channel Modelling

We may generate synthetic data using (e.g. at step 120) a geometry-based stochastic channel model such as QuaDRiGa [41]. The simulator (e.g. QuaDRiGa) may consist of at least two main components: A stochastic component, that creates a random propagation environment (LSPs, e.g., delay and angular spread) and calculates random 3D positions of scattering clusters within, and a deterministic part, that describes the interaction of transmitter and receiver with this random environment. From the plurality of scenarios, the most probably scenario may be chosen. Scatter clusters are fixed and the temporal development of the radio channel is deterministic. In particular, a QuaDRiGa model was validated based on real measurements in a coherent LTE Advanced Testbed [41]. Besides the SSP and LSP configurations, we may also provide the network layout, i.e., the positions of the basestations (e.g. 140-1, 104-2, 140-3), antenna configurations, downtilts, the positions and trajectories of the transmitters and receivers as well as the propagation scenarios as configuration variables for the simulator (e.g. QuaDRiGa). From there, the simulator (e.g. QuaDRiGa) calculates the channel coefficients, i.e., CIR, FDPoA, and ToA. At the end, the dataset 121 is obtained (ideally, we may "forget" the CIRCC 117, at least for a while)

(Note that QuaDRiGa divides the carrier signal into two parts during demodulation. One part is executed with the original phase position (in-phase, I) and describes the real part of the signal in the form of an amplitude. The second part is executed with a reference frequency that is 90° out of phase (quadrature, Q) and is also an amplitude that represents the associated imaginary part. This procedure takes into account the values of the LSPs and calculates the path powers and the path delays of the MPCs)

4.3 Datasets

We may generate our simulation data 121 (e.g. including the simulated CIRs 118 and/or measured CIRs 115) for various cases that are applicable in practice, i.e., we may differentiate LOS, OLOS, and NLOS conditions with different KF, DS, and SNR statistics of the MPCs to generate CIRs and corresponding ToAs at step 120. These channel properties depend on the distance to reflecting objects, the number of relevant reflectors, and the objects around the transmitter 145. The simulator (e.g. QuaDRiGa) may model them statistically to describe these statistical properties of the CIR. The statistical properties depend on the deployment scenarios (scenes) and the receiving conditions. In a subsequent step, we may resample each CIR from 60 to 120 components to increase its resolution (see below, Section 4.4).

3GPP [1] defines reference channel models that describe parameter sets that define the statistical properties of corresponding CIRs with probability density functions (PDFs) for DS and KF to represent the properties of a random environment. A detailed overview of the statistics for KF and DS are shown in FIGS. 5(*b*) and 5(*a*). Since KF and DS are typically correlated, we visualize their joint PDFs with pseudo 3D plots, wherein the probability is represented by the grey intensity, see FIGS. 5(*c*) to 5(*d*). In the following we may describe urban macro (UMa), urban micro (UMi), AWGN, and indoor scenarios with distributions of μ(KF), μ(DS), their σ, and SNR.

Figure 5A:
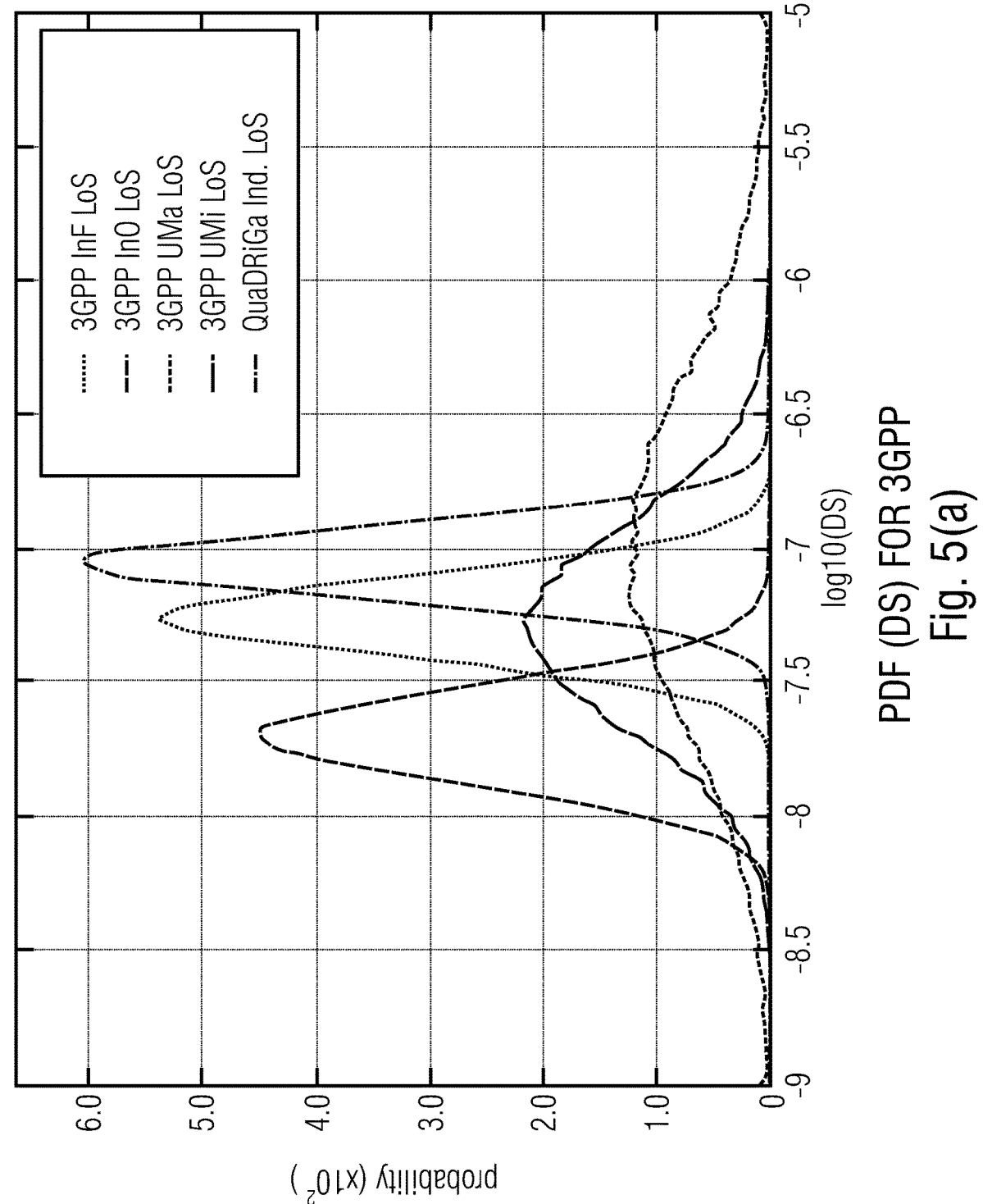
FIGS. 5($a$) to 5($d$) show PDFs and joint PDFs of DS and KF e.g. for the 3GPP (TR38.901) scenarios: InF, InO, UMa, UMi, and QuaDRiGa Ind.
Figure 5B:
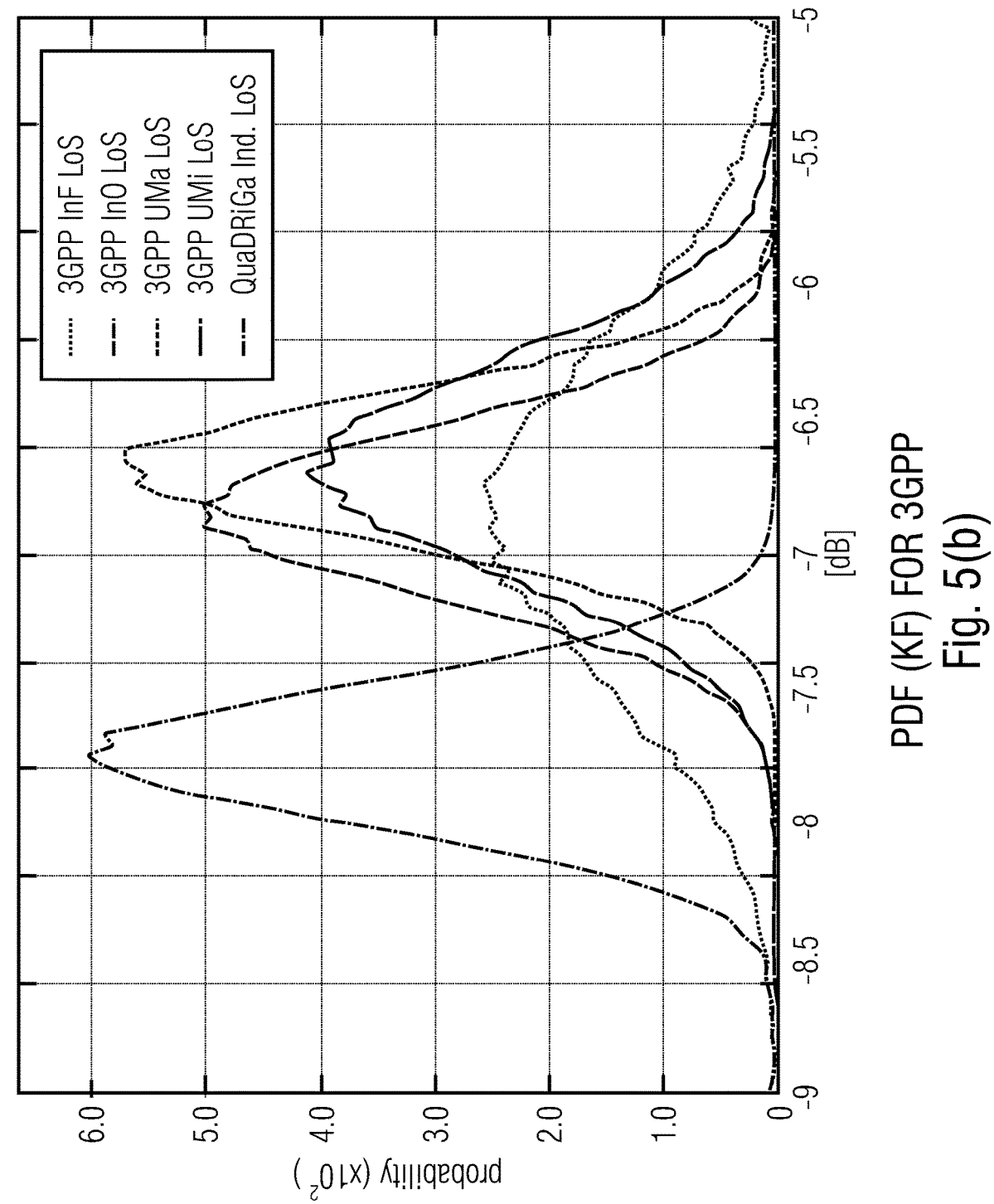
Figure 5C:
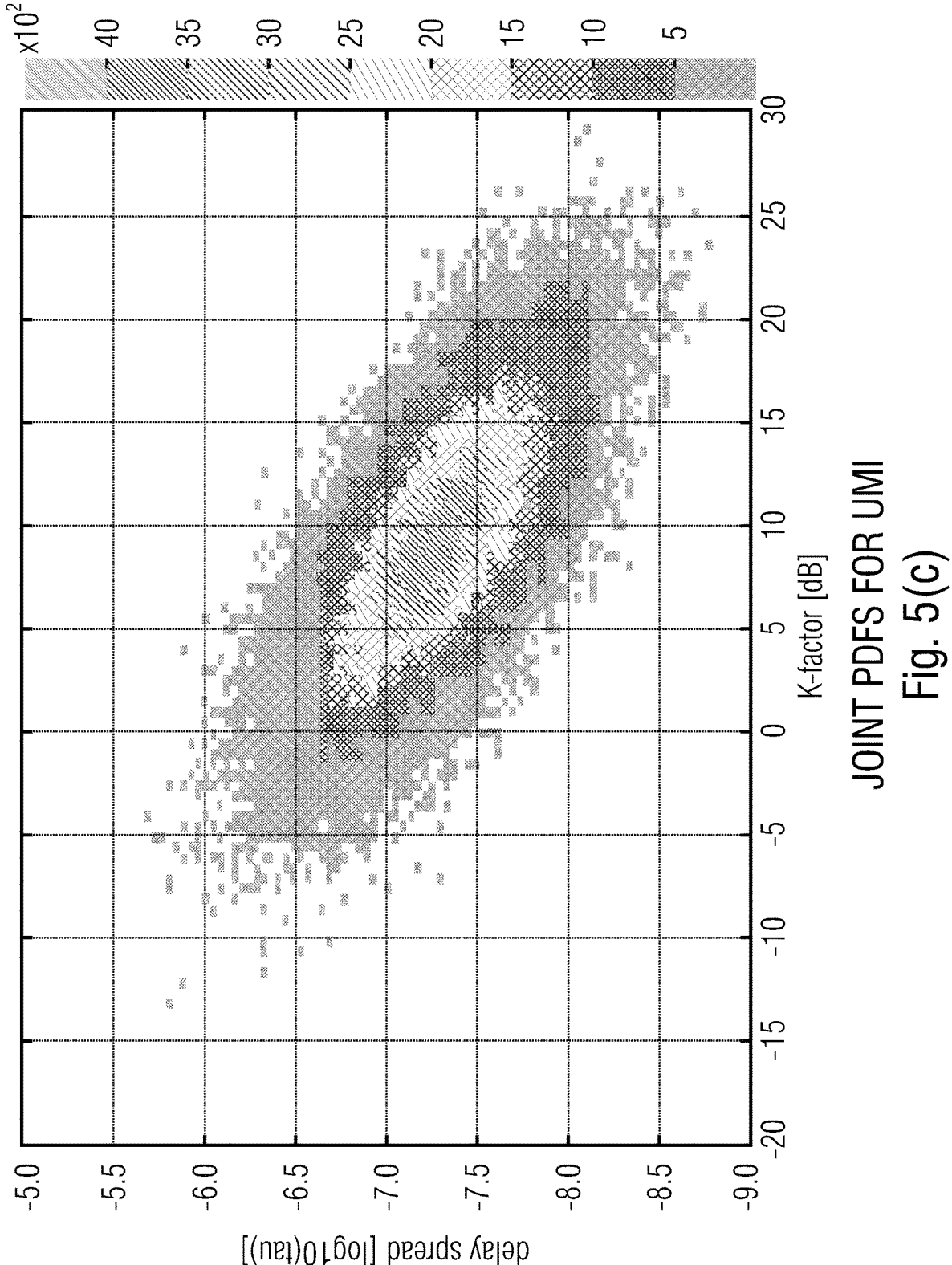
Figure 5D:
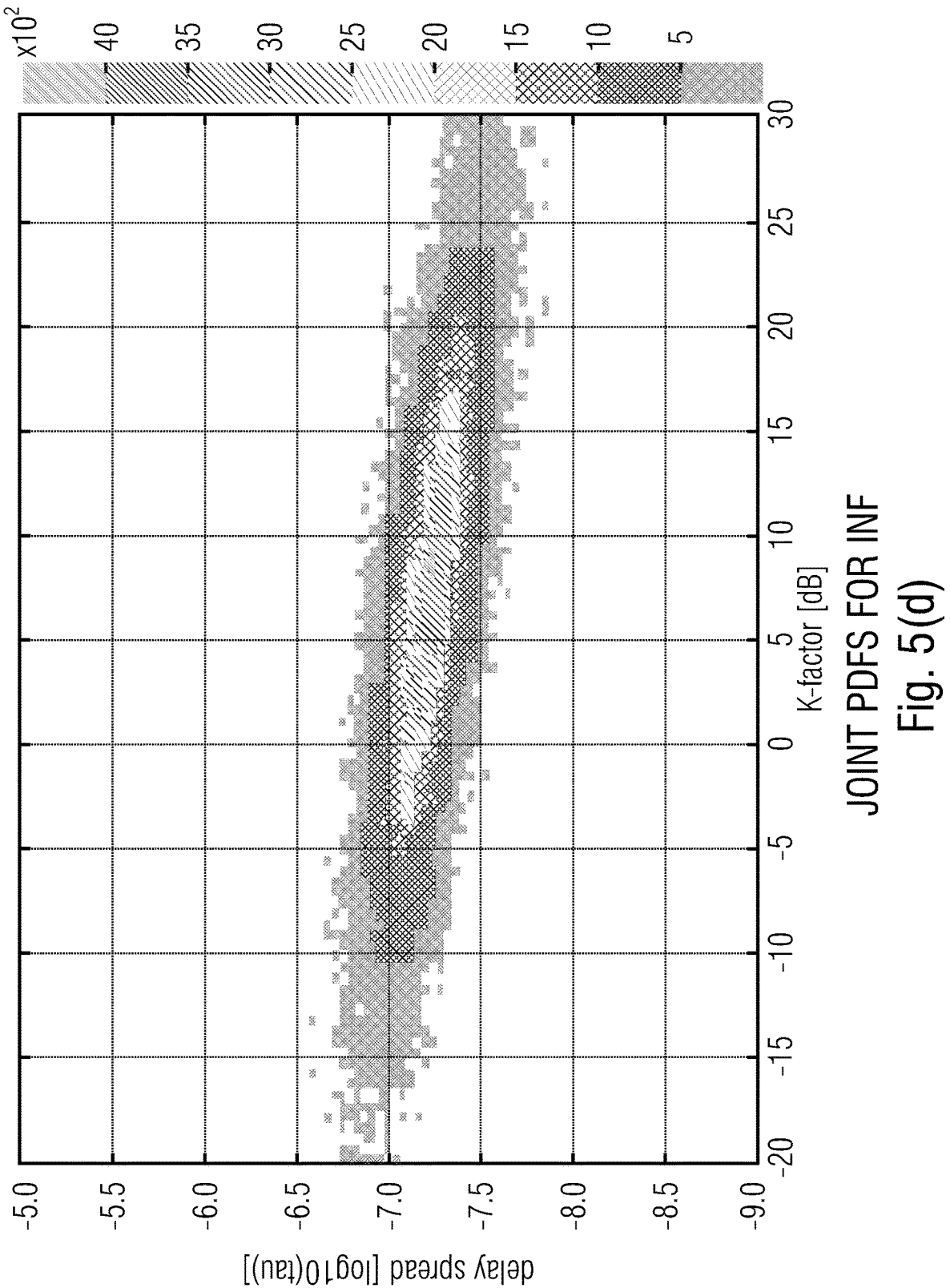

Urban. The TR38.901 [1] provides parameter sets for urban scenario assuming high basestation towers, i.e., urban macro (UMa) with high DS, areas with narrow streets, typically with dense deployments of the basestations, i.e., urban micro (UMi) with medium DS, and rural areas. FIG. 5*c* visualizes a possible map that covers the channel characteristics of UMi.

Indoor. To address typical indoor industrial applications, we may use multiple indoor factory InF datasets with low DS [7], whereas for open environments we include more data according to indoor open office, defined by TR38.901 [1]. For indoor applications parameter sets for typical office building (InO) or factories (InF) are available. FIG. 5(*d*) visualizes the map that covers the channel characteristics of InF. as there is no LoS components embedded in NLoS simulations, the delay in the FDPoA mainly depends on the DS statistics. Instead, LoS components are embedded in the OLOS scenario, but the MPCs have significantly reduced power. FIG. 6(*a*) shows the complete map of the channel characteristics UMa, UMi and Indoor (Inf and InO).

Real-World. We generated similar maps for our real measurement data, see FIG. 6(*b*) We derive the statistics by analyzing data from a real measurement study of a typical InF scenario. Our system that may be used for the simulations may receive a maximum of 50,000 signals per antenna on 16 antennas from up to 144 transmitters. These send out up to 2,000 tracking bursts per second. It runs in the worldwide license-free ISM band (industrial, scientific, and medical) of 2.4 GHz with a signal bandwidth of around 80 MHz. The transmitters generate short broadband signal bursts along with identification sequences that we correlate with FPGAs on each of the 16 receiver lines to obtain the correlation function that approximates the CIR [6, 16]. As the real data is part of InF and InO, they are only a small subset of the full simulated scenario (compare how the synthetic map in FIG. 6(*a*) covers the entire map of the real indoor scenario in FIG. 6(*b*). Hence, such maps visualize and ensure that the synthetic training data embed the channel characteristics of a real target application.

FIGS. 6(*a*) and 6(*b*): Distribution of channel characteristics for simulated and real data. The rectangles and circles classify UMi, UMa, and Indoor models spatially in this world map. Note that rectangles represent the area covered by the parameters μ(KF) and μ(DS), and the circles represent their corresponding σ. FIG. 6(*a*) Simulated data. FIG. 6(*b*) Real data.

FIG. 7(*a*): Overview of input vector types. FIG. 7(*b*) Input transformation. FIG. 7(*c*) Architecture of our 1D-CNN. FIGS. 7(*a*) to 7(*c*): Overview of the main components of our DL-based ToA estimation pipeline: With n kernels $k_{1,n}$, feature maps fm, input X, and output Y.

4.4 Deep Learning (DL)

It is now possible to discuss mainly the features of the NN (CNN) 131 (in case, according to the parametrizations 132 as discussed above), which may be obtained at step 130, for example, and may be used (e.g. at any of steps 260 of methods 200, 300, 400 for inferring the ToAs). Here, reference is made to a CNN according to the paradigm of deep learning. It is noted that, in examples, the trained NN will output relative ToAs (e.g., lags in the CIR corresponding to the FDPoA). Further, the NN 131 may be trained using the dataset 121 comprising the simulated CIRs 118 and the CIRs 115 obtained by actual measurement. The CIRs 118 and 115 are associated to relative ToAs. The NN 131 may be trained using relative ToAs obtained by actual measurement and/or by simulation, and these ToAs may be used in the dataset 121. Once trained (e.g. using method 100) the NN (CNN) 131 will have weights (e.g. kernels) which have been generated based on the CIRs 115 and/or 118.

DL has shown interesting results in which the position was estimated directly on CIRs in a consistent learning method that implicitly learns the features rather than manually creating representative features from the raw input data [16]. The key idea is that our DL-based method learns to identify spatial correlations of MPCs of different propagation scenarios to provide correct predictions using a large amount of available labeled data from the simulation. We formulate the problem of mapping a CIR to a ToA as a supervised regression problem. At this point (step 130), it doesn't really matter whether the CIR is a measured CIR obtained at step 110 by measurement or a simulated CIR obtained at step 120. During a training phase at step 130, the model learns to map the data sequence (CIR 115 and/or 118) to a corresponding ToA (either a ToA of an actual signal like 141 and 142, or a simulated ToA as for the simulated signal 143). At the inference time (e.g. at step 260 in any of methods 200, 300, 400), the model then predicts a ToA 261 from a CIR 271 measured from an actual signal sent by the transmitter whose position is to be known (the CIR 271 is in principle not originally known by the CNN 131, even though the CNN 131 will permit to obtain the ToA 261 that mostly approximates the ToA of the signal from which the CIR 271 has been obtained).

Model Selection. In a preliminary study, we may examine several ML (machine learning) models and DL models and assessed their feasibility of mapping CIR sequences to ToA values as a supervised regression problem. Besides classic ML models such as Linear Regression and Gaussian Processes, we examined a number of well-known DL architectures from the literature: SmallNet and MobileNetv3 [15, 16], ResNet18 [34], RNNs [32], LSTMs and BLSTMs [33], CNN and CNN-BLSTM [33, 34]. Since our study showed that a 1D-CNN offers both the highest computing efficiency and the highest accuracy, we only discuss it in detail below. Our 1D-CNN is inspired by temporal CNNs [29]. CNNs define a special architecture of NNs. They use pooling layers to reduce the spatial dimension and computing time, as well as normalization layers that are interchangeable between successive convolutional layers.

It is now possible to see how the ToAs 271 are inferred from the CIRs using a CNN (e.g. CNN 231) at step 260 of any of methods 200, 300, 400.

Pre-processing the Input. To evaluate our models on the trade-off between information gain, accuracy, and computational effort, we may optionally pre-process the input data in four variants, see FIG. 7(a): Two that work on 1D sequences of CIRs with dimensions of 60 (or another number of) samples over time (width, w=60 and height, h E [1,2]) and the remaining work on 1D sequences of resampled CIRs 271 with dimensions w=120 and h E [1,2]. We may resample the input sequence X at p/q times the original sampling rate of 60 (with upsampling p=8 and downsampling q=1). So we may insert zeros to increase the signal by p=8. We apply a FIR (finite impulse response) anti-aliasing lowpass filter to the upsampled signal (normalized cutoff frequency fc=x/max (p, q) and gain p). We may approximate the anti-aliasing filter with the Kaiser window method (filter order is 2×n×max(p, q), w. n=50 and shape parameter $\beta$=5). We may discard samples by q=1 to downsample the filtered signal. We may compensate for the delay introduced by the FIR filter by shifting the signal in time. In the case of h=1 we compute the magnitude vector of inphase (I) values, quadrature (Q) values, whereas in the case of h=2 we use the raw I, Q vectors. In a large-scale grid search, we may optimize each ML model and our DL architecture for each of these 4 input variants. We may evaluate every possible configuration (architecture and parameters) of these variants to find the optimal one. However, different implementations are possible.

Grid Search. Our architecture addresses under—and overfitting by training the network with balanced examples and optimizing its complexity, finding its optimal capacity and keeping performance high and computing effort low. We may derive an optimal capacity that best fits our dataset by optimizing the network architecture: Applying the structure (reducing the number of weights) and the network parameters (reducing the weight values) and regularization such as weight loss, dropout, and early stopping [58]. The structure can be even more complex: there may be layers and different possibilities to align and/or structure them; there may be more parameters to tune as well. One goal of our grid search may be to find the smallest network architecture that does not require pooling (as pooling layers tend to blur temporal causalities [48, 61]). (Grid Search for our 1D-CNN: Number of sequential Conv. Layer: 4∈ [1,2, . . . ,19,20], residual layer between each Conv. Layer∈ [yes, no], k=10∈ [2,3, . . . , 19,20] x1, x2, number of kernels: 100∈ [1,10, . . . ,190,200], dr=0.2∈ [0,0.1, . . . 0.9], lr∈ [0.0001, 0.001, . . . ,1.0], activatione [relu, sgd], epochse [early stopping w. patience=3, max. 1000], optimizer∈ [adam, rmsprop]. The numbers in bold highlight the final configuration that yields the highest accuracy that we use in our benchmarks in Sec. 6. Other possible implementations may be used).

Figure 6A:
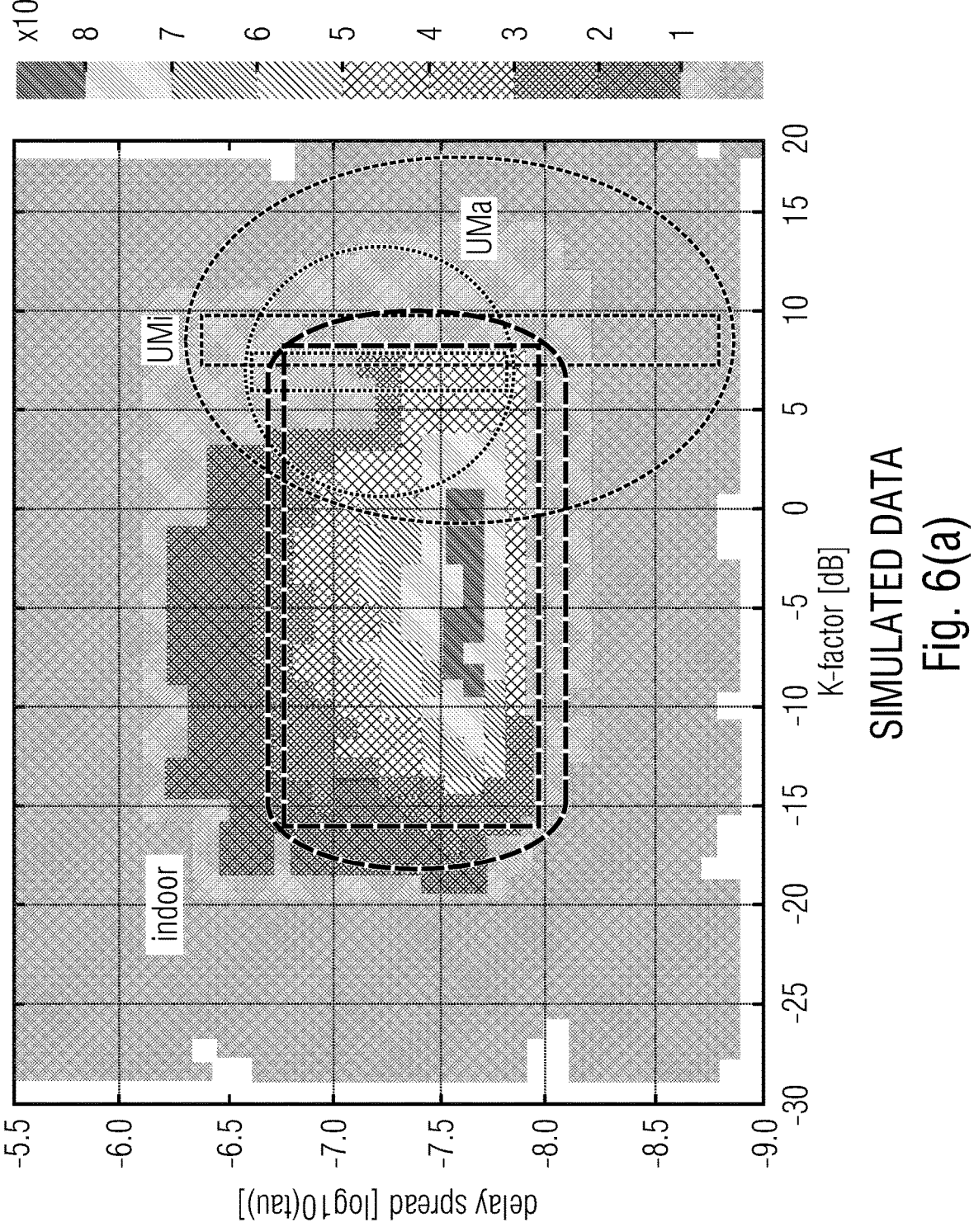
FIGS. 6($a$) and 6($b$) show a distribution of channel characteristics for simulated and real data. The rectangles and circles classify UMi, UMa, and Indoor models spatially in this world map. Note that rectangles represent the area covered by the parameters $\mu(KF)$ and $\mu(DS)$, and the circles represent their corresponding $\sigma$.
Figure 6B:
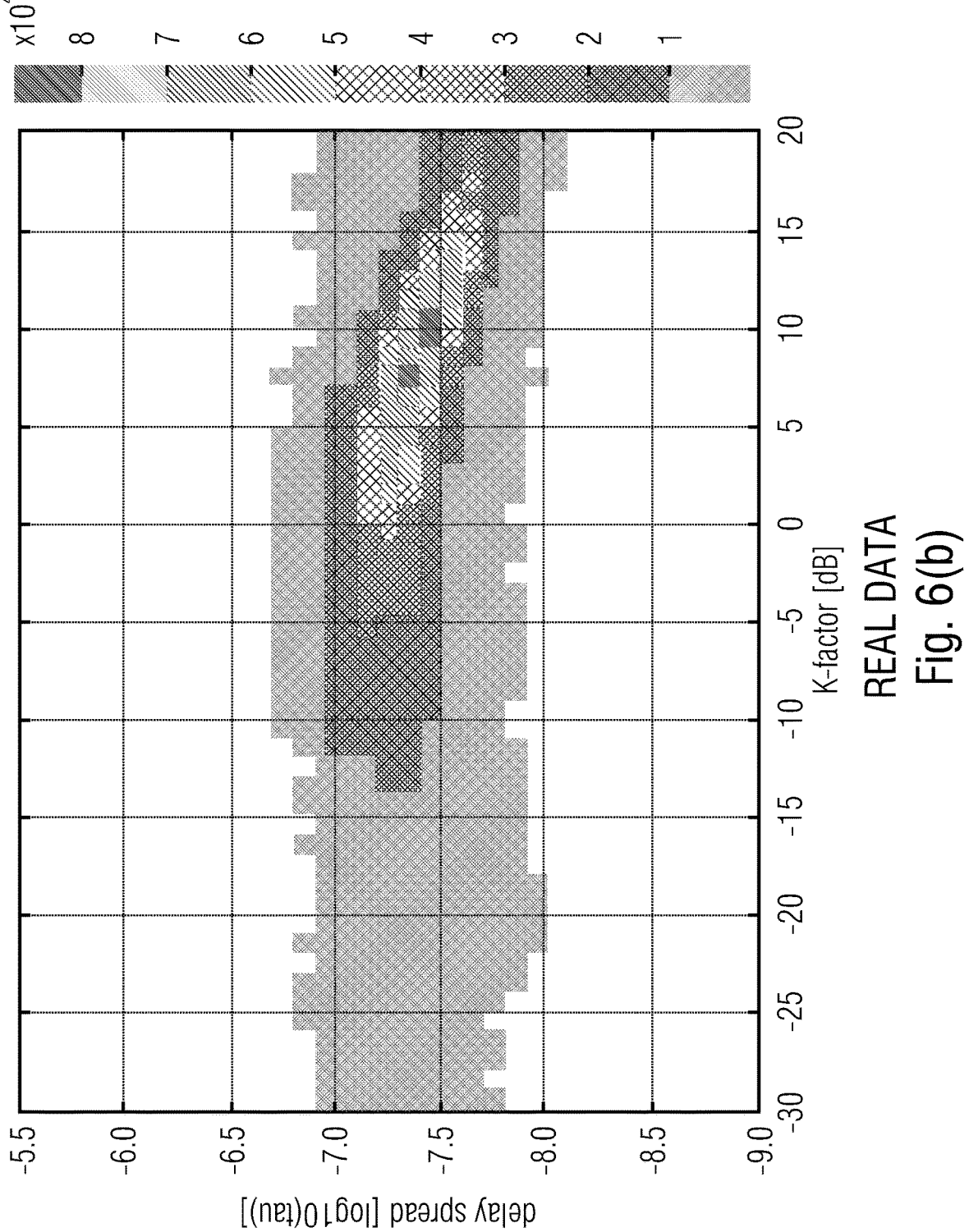
Figure 7A:
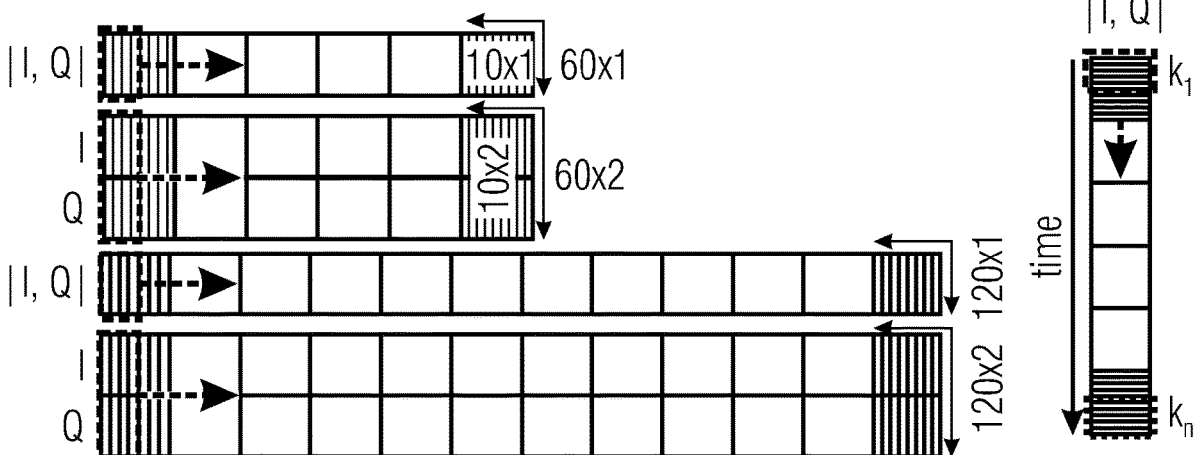
FIGS. 7($a$) to 7($c$) show an overview of the main components of a DL-based ToA estimation pipeline.
Figure 7B:
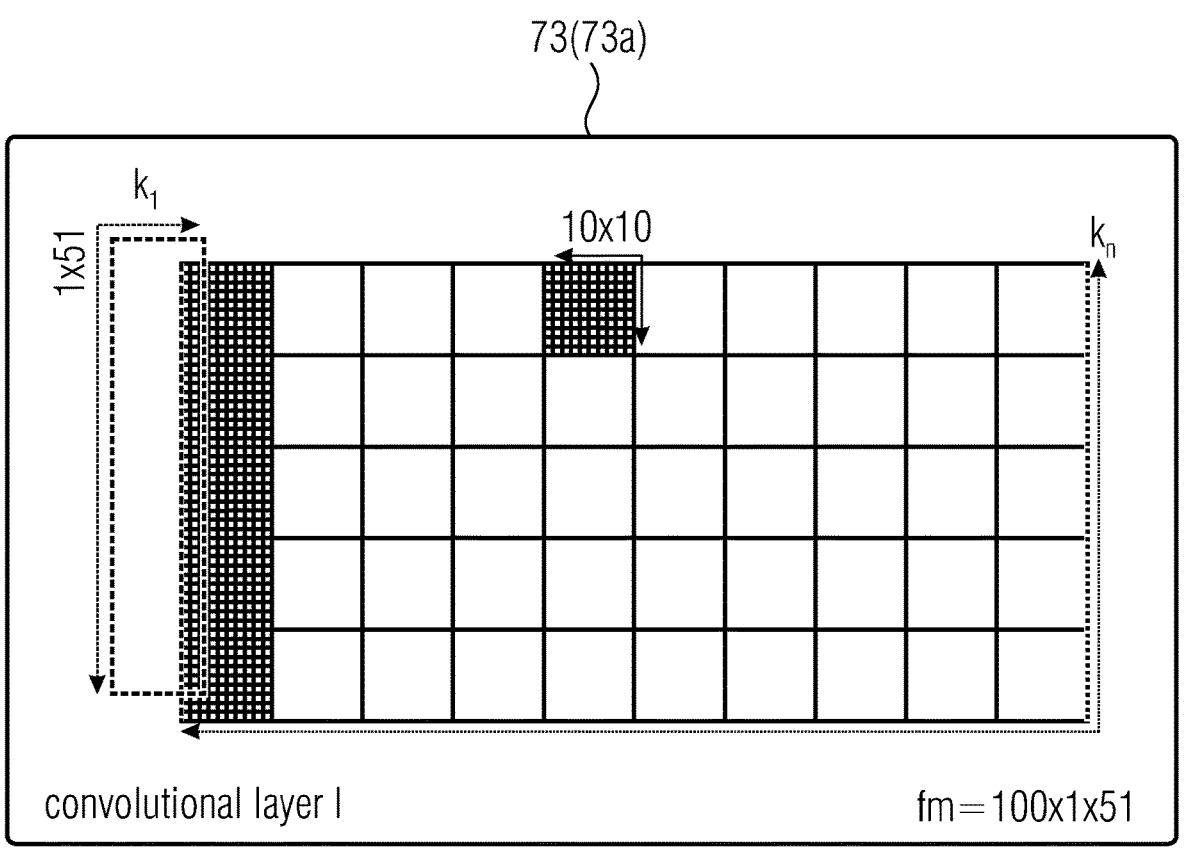
Figure 7C:
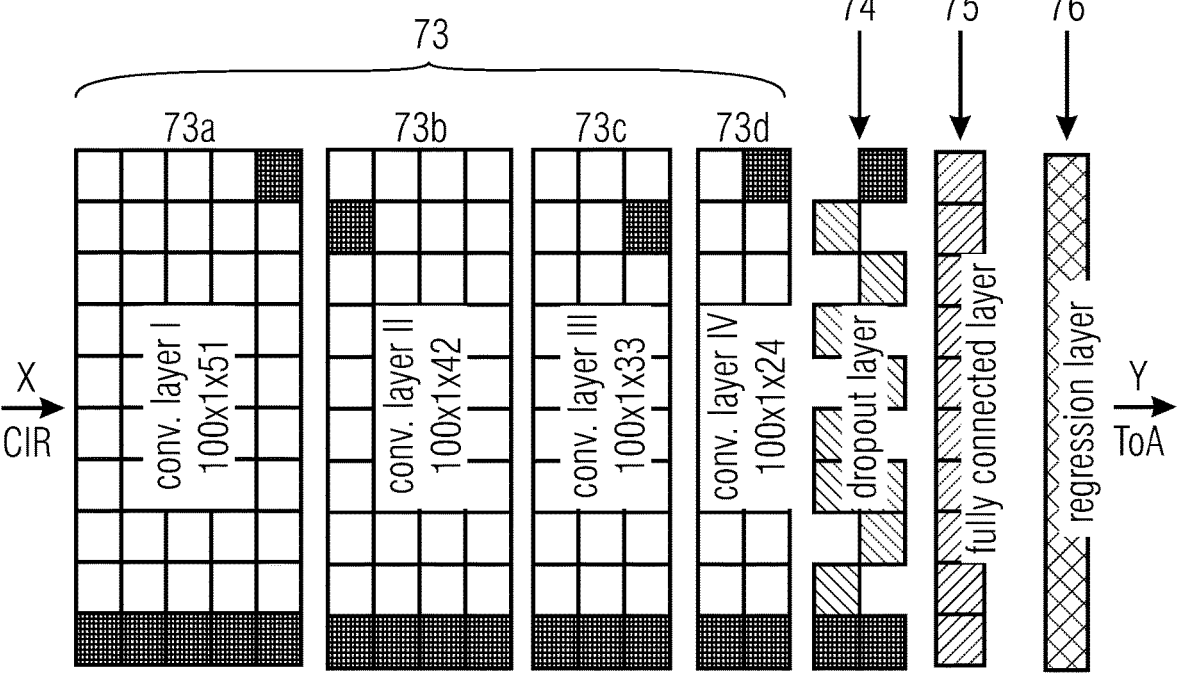

Architecture. FIGS. 7(a) to 7(c) show a possible architecture of a 1D-CNN. In a large-scale grid search, we may achieve highest accuracy with 100 (or another number, e.g. between 80 and 120) 1-dimensional (1D)-convolution filter kernels k that detect 100 (or another number, e.g. between 80 and 120) potential features. A k=10×1 (for 60×1 input, respectively k=10×2 for 120×2) kernel slides alongside 99 others, directly on a 1D input sequence, see FIGS. 6(a) to 6(c). They yield an output array, i.e., feature map fm, with dimensions: input dimension-ks+1. The grid search also revealed that a total of 4 convolutional layers yields the highest accuracy in our benchmarks. To transform an input sequence to the first convolutional layer (Conv. Layer I), n=100 filter kernels of size k=10×1 (respectively 20×2 for inputs with dim. 60×2 and 120×2) slide through the input sequence of length, e.g., 60 for 51 steps (60-10+1). This results in an output array of fm=51×100 of Conv. Layer I. We apply the same number and size of k to process each Conv. Layer (I-IV) and obtain the following architecture: Conv./(fm=100×51), Conv. II (fm=100×42), Conv. III (fm=100×31), and Conv. IV (fm=100×24). As a result, the dimensionality of fm decreases across the network, but still keeps performance and accuracy high. Instead of a pooling we use a dropout layer to prevent overfitting before applying a fully connected layer. A dropout layer is added to prevent overfitting. A fraction of 20%, i.e., dropout rate dr=0.2, of the input units is randomly set to zero. The network is therefore less sensitive to data fluctuations. The final layer is a fully connected layer to flatten the units of the output of the dropout layer. A final regression level predicts $\hat{Y}$, the ToA 261, which we optimize using back propagation e.g. using the ADAM optimizer and the RMSE loss function:

$$\mathcal{L} = \sqrt{\frac{1}{n}\sum_{i=1}^{n}\left(\hat{Y}_i - Y_i\right)^2}. \tag{6}$$

In general terms, the CNN 131 may foresee, at step 260 of any of methods 200, 300, 400:

performing a grid search 73 on the CIR 271 (the grid search may be reiterated multiple times, e.g. 2, 4, 5, 5, 6, times; in FIG. 7(c) there are shown iterations 73a, 73b, 73c, 73d) by using weights (e.g. $k_1$) obtained during the CNN training 130;

performing a dropout 75, e.g. by randomly discarding values (the percentage may vary between 10% and 30% and may be 20%, for example);

performing a regression 76 (e.g. a linear regression).

The fully connected layer shown at step 75 is just between the dropout layer (step 74) and the regression layer (step 76): it combines every neuron (cell) from the dropout layer (matrix with cells) with each other such that there is a complex interconnection between each neuron.

The pooling step may be avoided.

5. Baseline Estimators

Here, a comparison between the inventive results and the known technology is proposed.

We compare our data-driven method (DL) to the following three baseline algorithms: the peak-threshold-based (PEAK), see Sec. 5.1), the extended inflection point method (IFP), see Sec. 5.2, and the subspace method (MUSIC), see Sec. 5.3. Note that while PEAK, IFP, and DL predict ToAs in real time, MUSIC entails post-processing.

5.1 Peak and Threshold (PEAK)

A very popular ToA estimator is the so-called peak detector method. The maximum value of the correlator output C represents the ToA $ToA_{rel}$ value:

$$ToA_{rel} = \max C. \tag{7}$$

PEAK typically uses narrow bandwidth upsampling (interpolation) at the correlator output to minimize the quantization effects. If the correlator is running at a nominal sampling rate, the upsampling is only applied to the portion around the peak:

$$ToA_{rel} = \max(\text{upsample}(C)). \tag{8}$$

The main problem with this method is that the true ToA may not always reach the maximum of the signal, e.g., in more realistic scenarios when the signals are influenced by non-linear effects such as multipath, scattering, and shadowing. For example, when the maximum of the peak (FD-PoA) is delayed due to reflections, then the actual FDPoA is lower due to SNR or OLOS. As a result, PEAK is only applicable to the LoS scenarios with considerably high SNRs, i.e., when the FDPoA is clearly separable from other MPCs. Another weak point is that the threshold is selected a-priori according to known peaks and the ToA is selected based on the first value above this threshold, the so-called simplified version of the early detection of peaks [36]. We set the optimal threshold for different SNRs according to Guvenc et al. [37].

5.2 Inflection Point (IFP)

The IFP [8] is an advanced ToA estimator, which, instead of selecting the maximum of the correlator output, searches for the point with the maximum gradient of the rising edge (left edge) of the correlation curve. To estimate the ToA with IFP, we first define the maximum tolerable distance (d) between the maximum of the correlation peak and the leftmost turning point ($\delta = \max(d) = -10$) with upsampling—or interpolation factor (L=32), the start index of the inflection point search (i=1), and the group delay of the filter ($\tau=0$) in the absolute correlation signal c=|Corr|. Then, IFP either finds the first relevant peak $p_0$ using a simple method that uses a relative threshold, or finds the approximate position of $p_0$, where for the first time the threshold $p_\tau$, with respect to the maximum amount max (val), has been reached. The peak threshold $p_\tau$ is selected according to the SNR of c: SNR>−10: $p_\tau=-5$; SNR>−20: $p_\tau=-3$; SNR≤−20: $p_\tau=-2$. Thus, the first path must be smaller than 10. $\log_{10}(p_\tau)$ in dB below the main path so, that we do not run with pr on a secondary ripple:

$$P_0 = \text{find}(c \geq \max(val) * p_\tau). \tag{9}$$

The end of the peak search is determined according to $$Pn \lceil (P_0 - (2*\delta)*L) \rceil. \tag{10}$$

The absolute of the correlation function has an IFP before each peak, i.e., a point with a maximum in its first derivative. Then, we search for the index that is to the left of the left turning point, i.e., the last element with a positive second derivative. The search for this inflection point on the rising edge (left edge) is processed as long as the second derivative of $$p_0 \geq 0 \left( \frac{\partial p_0^2}{\partial t^2} \right)$$

iS a u-convex solution. In the end, we arrived after the inflection point, so we found the index before the inflection point. Instead, the following applies to n-convex solutions: If the second derivative of $$p_0 \leq 0, \frac{\partial p_0^2}{\partial t^2},$$

i.e., If the inflection point is on the left, the algorithm continues to the left. The position of the max. $p_i$ is then determined by $$P_i = \lceil (p_0 - \delta * L) \rceil. \tag{11}$$

If the first derivative of $$p_i \geq 0, \frac{\partial p_0}{\partial t},$$

the maximum is to the right of the current position. If the first derivative of $$p_i < 0, \frac{\partial p_i}{\partial t},$$

the maximum is to the left of the current position. $p_i$ represents the index of the point immediately to the left of the inflection point of the rising edge (left edge, le).

$$le = p_i + \frac{\partial p_i^2}{\partial t^2} / \left( \frac{\partial p_i^2}{\partial t^2} - \frac{\partial p_{i+1}^2}{\partial t^2} \right) \tag{12}$$

The exact position of the inflection point is calculated by linear interpolation. The group delay ($\tau$) of the filter is subtracted from le and $ToA_{rel}$ is determined:

$$ToA_{rel} = \frac{le - \tau}{L} - \delta. \tag{13}$$

5.3 Multiple Signal Classification (MUSIC)

Figure 8:
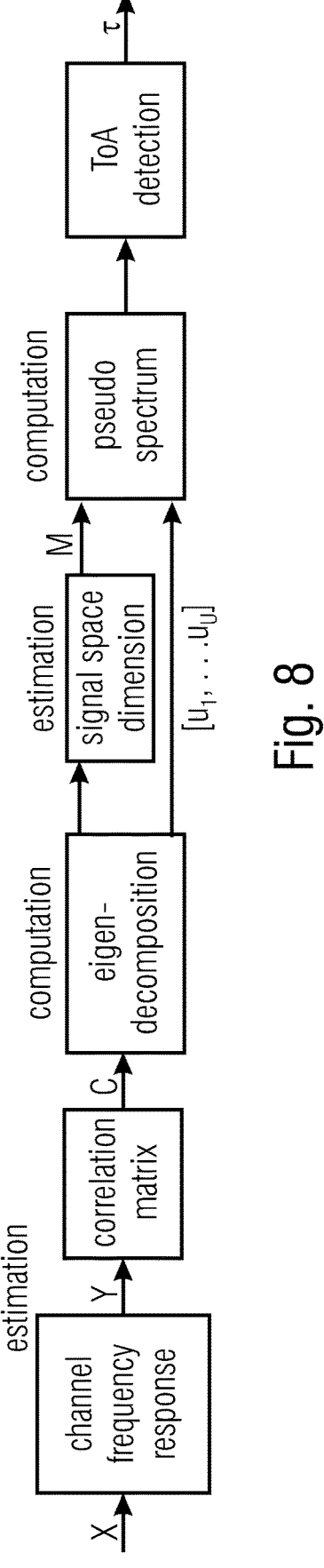
FIG. 8 shows a processing pipeline of MUSIC.
Figure 9A:
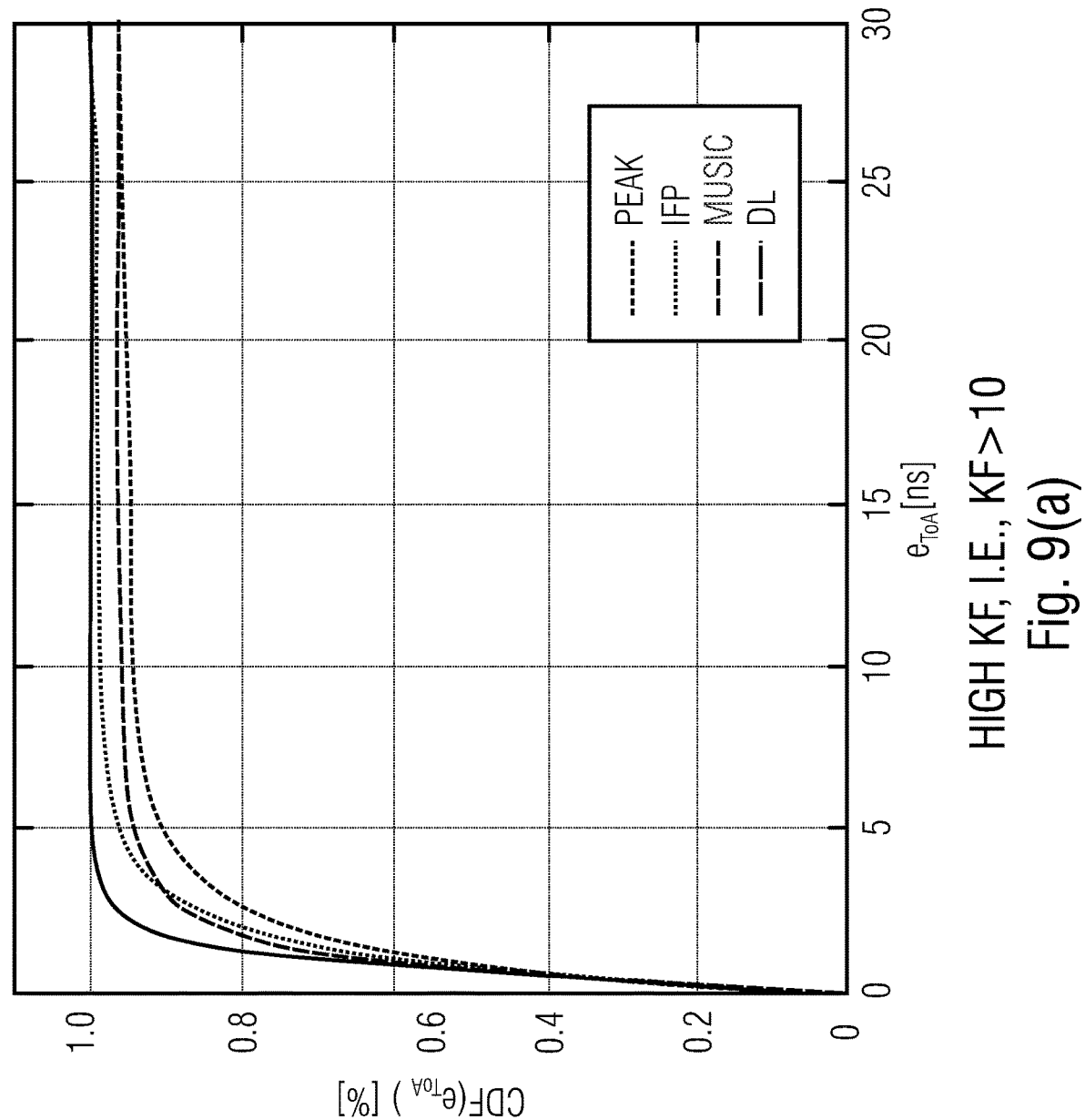
FIGS. 9($a$) to 9($d$) show the area between the two configurations.
Figure 9B:
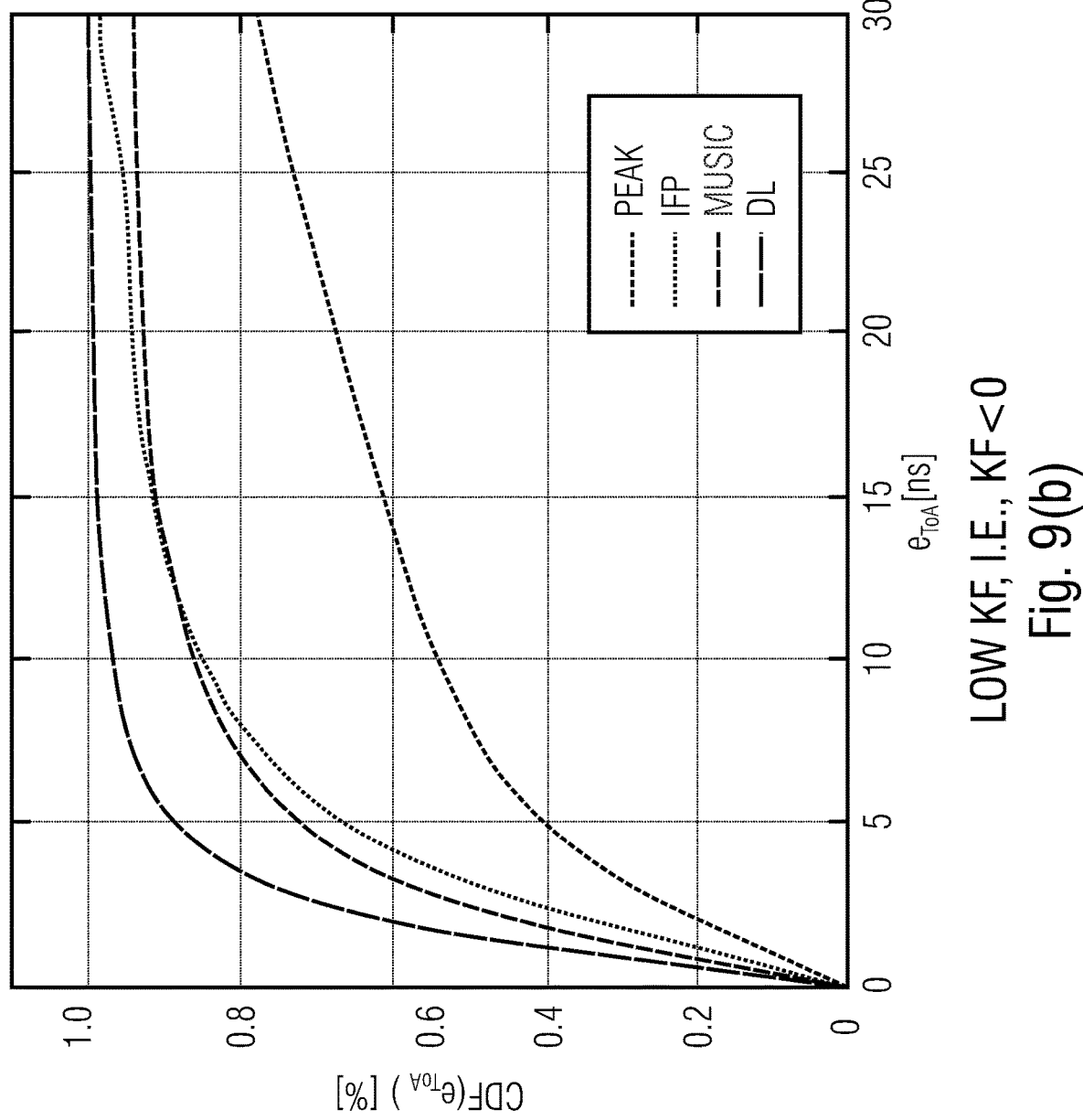
Figure 9C:
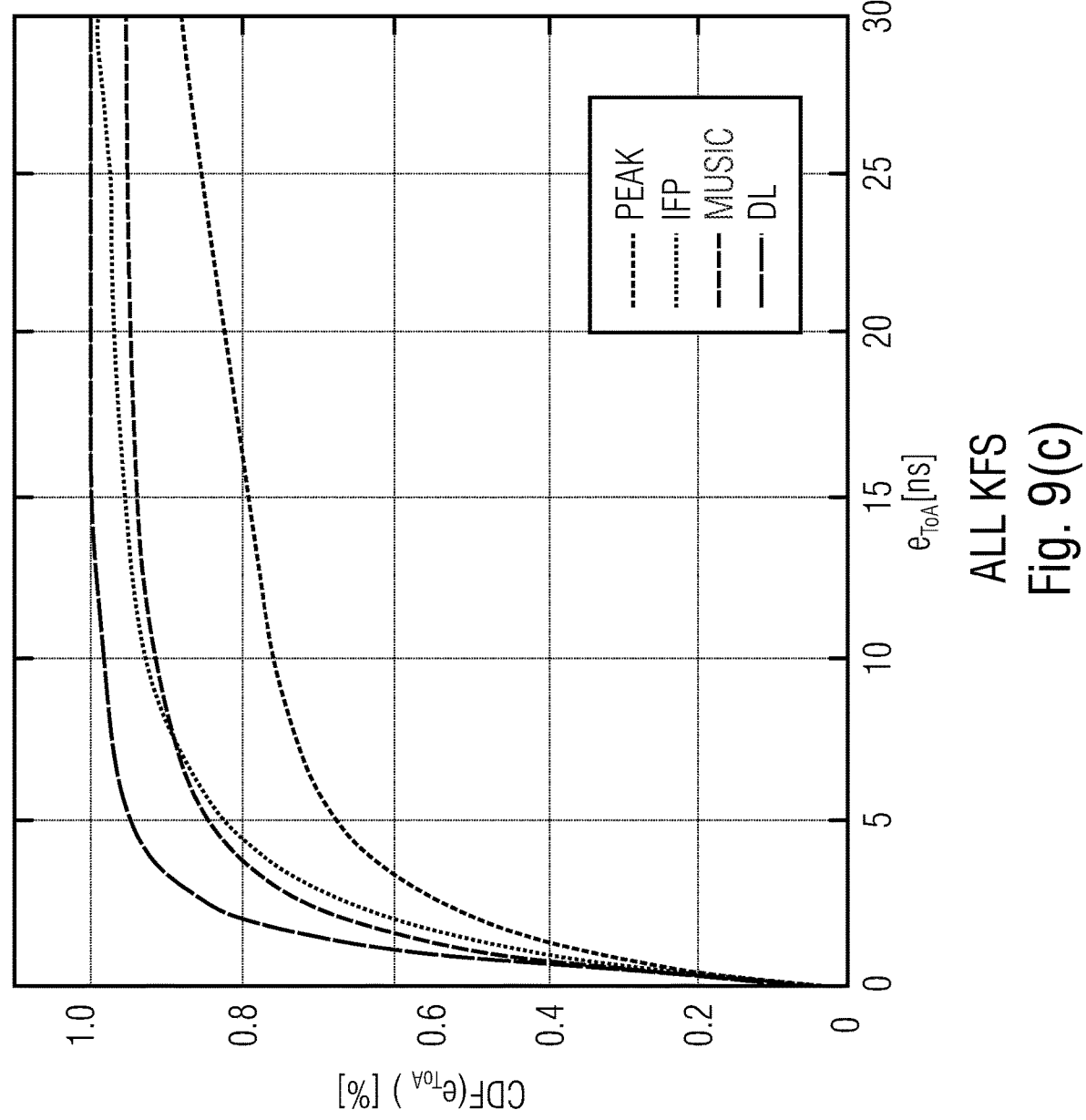
Figure 9D:
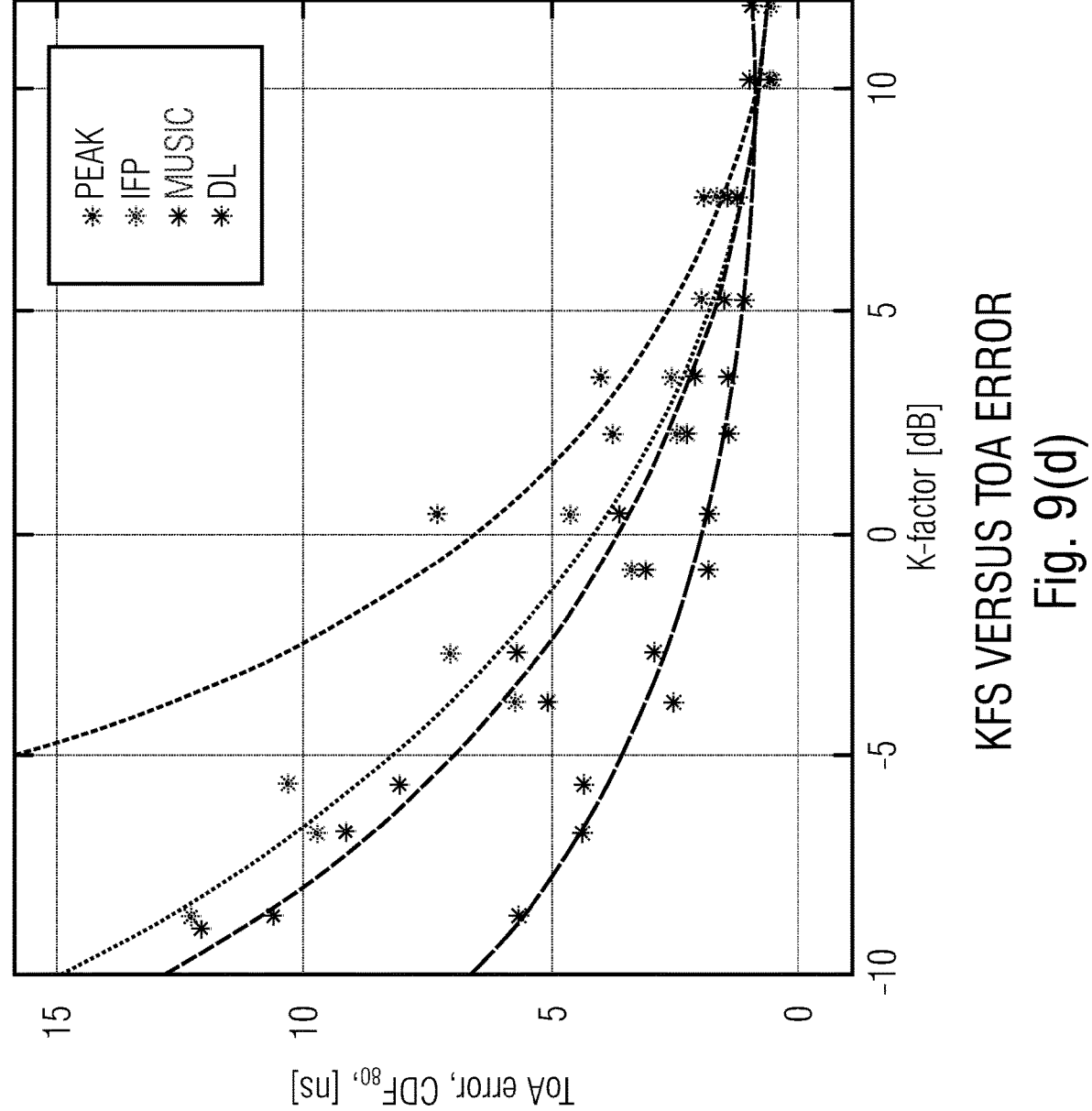

There are various subspace-based methods that are based on the eigenvalue decomposition of the covariance matrix to obtain CPs from the frequency domain of an impulse response. Typically, these frequency domain super-resolution techniques estimate multipath time dispersion parameters such as DS [46, 55, 62]. MUSIC [42, 46, 51] extracts multiple signals with different frequencies in noisy environments to estimate a ToA. For this purpose, an estimated frequency is translated into the propagation delay (from carrier frequency to frequency domain to time domain to delay). FIG. 8 visualizes a typical MUSIC pipeline. First, we convert several observations X of the received signal into the frequency range Y. Then, from the MUSIC pseudo spectrum M, U of these data we estimate the ToA as the time delay that corresponds to the first peak of this spectrum: A multipath channel with L MPCs with delays 11, the signal model simplifies to $$y_n = \sum_{i=0}^{L-1} a(\tau_i) e^{j\phi l + w_n}. \tag{14}$$

Therein, the signal vectors are modeled by a phase ramp $$a(\tau_i) = (1, e^{-j2\pi f_{sc}T}, \dots, e^{-j2\pi f_{cs}T(K-1)})^T, \tag{15}$$

for K subcarriers with spacing $f_{sc}$ and sampling T=K/B. The multipath signals share a common, practically random phase $\phi_l$. The noise $w_n$ is assumed to be (spectrally and temporally) uncorrelated Gaussian. For the current implementation, the number of signals is determined using the Minimum Description Length (MDL) algorithm [25]. However, in the presence of correlated signals and in the absence of a sufficient number of independent measurements $y_n$, data pre-processing is used to obtain a sufficient rank of the estimated covariance matrix. In fact, when using the demodulated signals, only one measurement $y_0$ is obtained for all subcarriers. As a result, we apply spatial smoothing and forward-backward averaging with a depth of smoothing of D=K/3, which is sufficient to achieve full-rank matrices but effectively loses a third of the bandwidth.

FIG. 8: Processing pipeline of MUSIC.

6. Results

We discuss the ToA estimation accuracy (the identification error of the FDPoA in ns=30 cm) in terms of mean absolute error (MAE), the circular error probabilities CEP of 50%, 75%, and 95%, and the root mean square error (RMSE) for each experiment as suggested in [49]. We list these error metrics in relation to varying SNRs in tables, best results are reported in bold. Note that in cases of SNR<OdB the methods PEAK, IFP, and MUSIC did not yield plausible results. We also visualize the errors as cumulative distribution functions (CDFs) and error world map graphs. The latter shows a heatmap of ToA errors (in ns), see FIG. 11. For all experiments, both (S)ynthetic and (R)eal-world, we always split each dataset into 60% for training, 10% for validation, and 30% for testing. We provide numbers for each experiment below. For a fair comparison, the results show the accuracy of all methods only for the 30% test dataset. Note that the split is based on a single random seed (from evenly distributed random samples) that applies to all datasets and methods in the same way. The datasets are shuffled so that history (the relation to neighboring snapshots) is not exploited. We evaluated the ToA estimation methods PEAK, IFP, MUSIC, and ours (1D-CNN) on individual (Sec. 6.1) and combined (Sec. 6.2) synthetic datasets. Sec. 6.3 evaluates the importance of KF on their accuracy. We also evaluate their ability to interpolate missing data (Sec. 6.4) and to generalize to a real-world scenario (Sec. 6.5).

6.1 Synthetic Experiments

We first evaluate the ToA accuracy of the 4 estimation methods for individual synthetic datasets with specific channel configurations: S1 (AWGN), S2 (UMi), S3 (UMa), and S4 (InF). Each of these datasets contains 3,202,000 training samples (1601×2000 uncorrelated QuADRiGa drops that provide random motion sequences of ToAs and corresponding FDPoAs and CIRs with a constant acceleration of 2 m/s$^2$) and 1,601,000 test samples (801×2000 uncorrelated sequences). We then summarize these configurations in a combined dataset S5 to investigate whether the DL method yields more accurate results if we train it specifically for each channel configuration or in general for all channel configurations S1 to S4. For each of the synthetic experiments we trained and evaluated datasets for different SNRs individually and optimized each method specifically for each dataset. Variations in the size and dimension of the input showed no significant impact on the accuracy of the DL method, which was trained and tested on the entire synthetic dataset (MAE on average: 2.48 with (1×60), 2.47 with (2×60), 2.49 with (1×120), and 2.48 with (2×120) in [ns], with SD<±0.1%). Instead, larger input vectors (120×2)

increase training and inference times. Hence, we only discuss the results of 1×60 configurations.

S1: AWGN. The dataset represents a typical AWGN channel [1] with KF: $\mu$=0.1, $\sigma$=1.1 and DS: $\mu$=0.2, $\sigma$=2. Table 1 lists the results. With an SNR≥0, all methods perform similarly (SD=0.53 ns). With an SNR of 20, the classic methods outperform DL. This is to be expected as both PEAK and IFP simply identify FDPoAs, i.e., separate peaks from the noise floor, while MUSIC and DL also simply optimize their mapping. However, at lower SNRs, DL performs best, and with SNRs<0, only DL yields plausible results at all.

S2: UMi. FIG. 6(a) shows the area, i.e., the channel configuration, that S2 covers, in the big oval. The rectangular area represents the $\mu$ of KF=[8.4, −11] and DS=[−8.82,−6.62], while the circle represents the $\sigma$ of KF=[2.2,7] and DS=[0.03,0.54]. S2 resulted in an accuracy on average that is slightly worse for all methods than for S1, as the range of both KF and DS increase significantly from S1 to S2. Table 2 shows that with an SNR≥0 all methods except PEAK show a similar estimation behavior within each method (all increase in error), but the error varies between the individual methods (SD=2.87), with IFP performing best among the baselines across all configurations. For SNR=+20 IFP performs best (RMSE=2.89), closely followed by PEAK that yields similar results (RMSE=2.92) at SNR=+20. However, PEAK does not provide any plausible results at SNR below 0. However, at SNR≤+10, DL outperformed all other methods. This is caused by the NLOS density, the smaller KF, and larger DS values. We found similar effects in the synthetic experiments S3 to S5 in the following.

TABLE 1

Results of S1: AWGN experiment.

| Method | Error [ns] | | | | | Params. |
| | CEP$_{50}$ | CEP$_{75}$ | CEP$_{95}$ | MAE | RMSE | SNR [dB] |
|---|---|---|---|---|---|---|
| PEAK | 0.90 | 1.10 | 1.39 | 1.24 | 1.36 | +20 |
| | 1.82 | 2.11 | 3.62 | 3.45 | 3.93 | +10 |
| | 5.12 | 7.11 | 11.23 | 8.54 | 12.67 | 0 |
| IFP | 0.89 | 1.08 | 1.32 | 1.17 | 1.31 | +20 |
| | 1.45 | 2.08 | 2.45 | 2.23 | 2.67 | +10 |
| | 3.23 | 4.34 | 5.23 | 4.65 | 6.56 | 0 |
| MUSIC | 0.91 | 1.12 | 1.31 | 1.27 | 1.34 | +20 |
| | 1.51 | 2.11 | 2.45 | 2.23 | 2.67 | +10 |
| | 3.56 | 4.12 | 5.89 | 5.78 | 7.34 | 0 |
| DL | 0.90 | 1.15 | 1.33 | 1.23 | 1.48 | +20 |
| | 1.23 | 1.34 | 2.23 | 2.12 | 2.43 | +10 |
| | 1.67 | 2.78 | 2.96 | 2.94 | 3.75 | 0 |
| | 2.32 | 3.65 | 4.78 | 3.65 | 4.76 | −10 |
| | 3.45 | 4.11 | 5.97 | 4.86 | 6.84 | −20 |

TABLE 2

Results of S2: UMi experiment.

| Method | Error [ns] | | | | | Params. |
| | CEP$_{50}$ | CEP$_{75}$ | CEP$_{95}$ | MAE | RMSE | SNR [dB] |
|---|---|---|---|---|---|---|
| PEAK | 1.74 | 2.73 | 2.74 | 2.66 | 2.92 | +20 |
| | 2.47 | 3.55 | 4.96 | 4.45 | 4.64 | +10 |
| IFP | 1.53 | 2.34 | 2.83 | 2.75 | 2.89 | +20 |
| | 2.91 | 3.63 | 3.97 | 3.51 | 3.84 | +10 |
| | 4.76 | 5.66 | 6.87 | 5.34 | 7.97 | 0 |
| MUSIC | 1.65 | 2.43 | 2.65 | 2.21 | 2.87 | +20 |
| | 2.67 | 3.34 | 4.79 | 3.65 | 3.72 | +10 |
| | 4.43 | 5.76 | 6.23 | 6.21 | 8.34 | 0 |
| DL | 1.62 | 2.34 | 2.67 | 2.54 | 2.73 | +20 |

TABLE 2-continued

| | | | | | | |
|---|---|---|---|---|---|---|
| | | Results of S2: UMi experiment. | | | | |
| | Error [ns] | | | | | Params. |
| Method | $CEP_{50}$ | $CEP_{75}$ | $CEP_{95}$ | MAE | RMSE | SNR [dB] |
| | 2.23 | 2.87 | 3.54 | 3.43 | 3.96 | +10 |
| | 2.47 | 3.32 | 4.51 | 3.78 | 4.65 | 0 |
| | 3.56 | 4.34 | 5.23 | 4.67 | 5.98 | −10 |
| | 4.34 | 5.56 | 6.38 | 5.45 | 7.56 | −20 |

S3: UMa. FIG. 5 shows the channel configuration, that S3 covers, in green: µ of KF=[7,9] and DS=[−7.76,−6.44] and the σ of KF=[3,5.7] and DS=[−7.76,−6.44]. For the S3 experiment, the error behavior of all methods is similar to that of S2 and the resulting accuracy on average is slightly worse for all methods than for both previous experiments S1 and S2. This is caused by the increase in NLOS density, the decreasing KF, and much larger DS values that are typical when we change from micro (UMi) to macro (UMa) outdoor scenarios. Table 3 lists the results. At SNR≥0, all methods perform similar, except PEAK, as they all increase the error. However, they differ in the error between the individual methods (SD of 3.34 ns). PEAK does not provide plausible results at SNR≤0. In contrast to S1 and S2, DL always provides the most accurate results for all SNRs. At SNR=0, IFP and MUSIC showed a significant increase in the RMSE (from 7.35 to 13.14, and 8.25 to 14.41). For DL we did not find such a big effect (from 3.90 to 4.47), while PEAK returned no result at all. Again, DL at SNR≤0 outperformed all other methods by more than 160% (RMSE of IFP: 7.35 vs. RMSE of DL: 4.47). And at SNR (<0), DL is again the only method that again yields plausible results at all.

S4: InF. FIG. 5 shows the channel configuration, in white: µ of KF=[−15,10], and DS=[−8.25,−6.45] and σ of KF=[0.2, 3.1] and DS=[0.76,0.44].

The S4 experiment resulted in an accuracy on average that is worse for all methods than for experiments S1, S2, and S3.

TABLE 3

| | | | | | | |
|---|---|---|---|---|---|---|
| | | Results of S3: UMa experiment. | | | | |
| | Error [ns] | | | | | Params. |
| Method | $CEP_{50}$ | $CEP_{75}$ | $CEP_{95}$ | MAE | RMSE | SNR [dB] |
| PEAK | 2.91 | 3.31 | 3.76 | 3.45 | 4.36 | +20 |
| | 3.43 | 4.29 | 5.52 | 4.86 | 5.42 | +10 |
| IFP | 2.46 | 3.45 | 4.56 | 4.16 | 5.34 | +20 |
| | 4.36 | 5.32 | 7.31 | 6.50 | 7.35 | +10 |
| | 9.25 | 10.58 | 12.81 | 11.63 | 13.14 | 0 |
| MUSIC | 3.85 | 4.27 | 5.47 | 4.79 | 6.58 | +20 |
| | 4.36 | 6.14 | 8.47 | 7.74 | 8.25 | +10 |
| | 9.84 | 11.52 | 14.36 | 13.41 | 14.41 | 0 |
| DL | 1.92 | 2.46 | 3.61 | 3.25 | 3.61 | +20 |
| | 2.36 | 3.01 | 3.85 | 3.58 | 3.90 | +10 |
| | 2.52 | 3.36 | 4.53 | 4.26 | 4.47 | 0 |
| | 3.84 | 4.72 | 5.37 | 5.14 | 5.56 | −10 |
| | 4.41 | 5.76 | 6.41 | 6.01 | 6.43 | −20 |

However, the error behavior of all methods is similar to that of S2 and S3 (the errors increase almost linear from SNR=20 to SNR=0). This is caused by the very high NLOS density, the very small KF, and very large DS values. Table 4 lists the result of the experiment. At SNR≥0, IFP and MUSIC show a similar error estimation behavior as they all increase the error. PEAK no longer provides a plausible result and DL shows no significant error (RMSE: from 3.85 to 4.13).

However, all methods vary much more than in S1 and S2 in the error within each method (SD=4.11 ns) with a decrease in SNR. Similar to S3, DL always provides the most accurate results for all SNRs. At SNR=0, IFP and MUSIC show a significant increase of the RMSE (from 8.74 to 14.66 and 9.54 to 15.45), while for DL we did not find such an effect (from 3.85 to 4.45).

Although DL also slightly increased the error with decreasing SNR, DL at SNR≤0 outperforms all other methods by more than 210% (RMSE of IFP: 14.66 and DL: 4.45 with SNR=0). And at SNR (<0), DL is the only method that yields plausible results at all.

Conclusion: The experiments S1 to S4 showed that PEAK (average inference time of 0.7 ms per window, processed with an Intel Core i7 1×3.6 GHz, excluding data loading times) and IFP at high SNRs (+20) performs quite well, as it simply detects FDPoAs. IFP and MUSIC perform similar at high to medium SNR (+20 to +10). However, we recommend IFP as it runs much faster than MUSIC (1.9 vs. 52,000 [ms]). Instead, while DL yields similar accuracies at high and medium SNRs, it performs best at medium to low SNR (0 to −20) with acceptable inference times (5.3 ms). Hence, we recommend DL when the environment, its propagation scenario, and the channel configuration is known.

TABLE 4

| | | | | | | |
|---|---|---|---|---|---|---|
| | | Results of S4: Indoor experiment. | | | | |
| | Error [ns] | | | | | Params. |
| Method | $CEP_{50}$ | $CEP_{75}$ | $CEP_{95}$ | MAE | RMSE | SNR [dB] |
| PEAK. | 3.35 | 3.99 | 4.84 | 4.70 | 5.84 | +20 |
| | 4.84 | 4.94 | 6.35 | 5.64 | 6.76 | +10 |
| IFP | 3.33 | 4.12 | 5.84 | 5.42 | 6.66 | +20 |
| | 5.45 | 6.86 | 8.45 | 7.55 | 8.74 | +10 |
| | 9.53 | 11.33 | 12.85 | 12.74 | 14.66 | 0 |
| MUSIC | 4.86 | 5.46 | 6.38 | 5.96 | 7.86 | +20 |
| | 5.55 | 7.87 | 9.46 | 8.66 | 9.54 | +10 |
| | 10.92 | 12.76 | 15.99 | 14.79 | 15.45 | 0 |
| DL | 2.27 | 2.64 | 3.88 | 3.76 | 3.85 | +20 |
| | 2.73 | 3.16 | 4.28 | 3.98 | 4.13 | +10 |
| | 2.91 | 3.46 | 4.77 | 4.25 | 4.45 | 0 |
| | 3.34 | 4.07 | 4.96 | 4.74 | 5.86 | −10 |
| | 3.72 | 4.56 | 5.89 | 4.88 | 6.73 | −20 |

6.2 Combination of AWGN, UMa, UMi, and InF

To examine DL's ability to capture general world knowledge, we combine the datasets from S1 to S4 into a new dataset S5. In this way we get an insight into whether a DL model trained on S5 yields more precise estimates if it has knowledge on all the properties of all possible and neighboring channel configurations such as AWGN, UMi, UMa, and InF, or if this confuses the DL approach and leads to poorer results. Note that, for reasons of fairness we cannot examine the performance of PEAK, IFP, and MUSIC on S5, as they use specific optimization 10 for each channel configuration to provide plausible results.

As the dataset combines AWGN, UMi, UMa, and InF (each with LoS and NLoS), it consists of 12,808,000 samples for training and 6,404,000 samples for testing. Hence, the entire area (S1 to S4) of FIG. 5 represents the information on which DL is trained on in a 60%/10%/30% split.

Table 5 lists the results of the experiment. Interestingly, the S5 experiment yields, on average, an accuracy similar to that of the S4 experiment. One reason for this is that S4 may already cover a large part of the entire area. Thus, the error behavior of DL is similar to that of S4 (the error seems to increase almost linearly). Similar to the other experiments, the results show that the error increases with increasing SNR. All errors are slightly higher in S5 than in S4 (RMSE increases on average by approx. 0.74 ns from 5.04 to 5.78). This may imply that more data and knowledge does not necessarily provide more accurate estimates, as the data in S5 are much more diverse and sparser than in S4.

TABLE 5

| Results of S5: combined dataset experiment. | | | | | | |
|---|---|---|---|---|---|---|
| | Error [ns] | | | | | Params. |
| Method | $CEP_{50}$ | $CEP_{75}$ | $CEP_{95}$ | MAE | RMSE | SNR [dB] |
| DL | 2.46 | 2.82 | 3.84 | 3.99 | 4.72 | +20 |
| | 2.96 | 3.32 | 4.31 | 4.47 | 4.56 | +10 |
| | 3.17 | 3.63 | 4.87 | 4.66 | 5.26 | 0 |
| | 3.43 | 3.95 | 4.92 | 5.06 | 6.91 | -10 |
| | 3.81 | 4.47 | 5.99 | 5.27 | 7.45 | -20 |

(a) High KF, i.e., KF > 10.
(b) Low KF, i.e., KF < 0.
(c) All KFs.
(d) KFs versus ToA error.

(a) High KF, i.e., KF>10. (b) Low KF, i.e., KF<0. (c) All KFs. (d) KFs versus ToA error.

Figure 10:
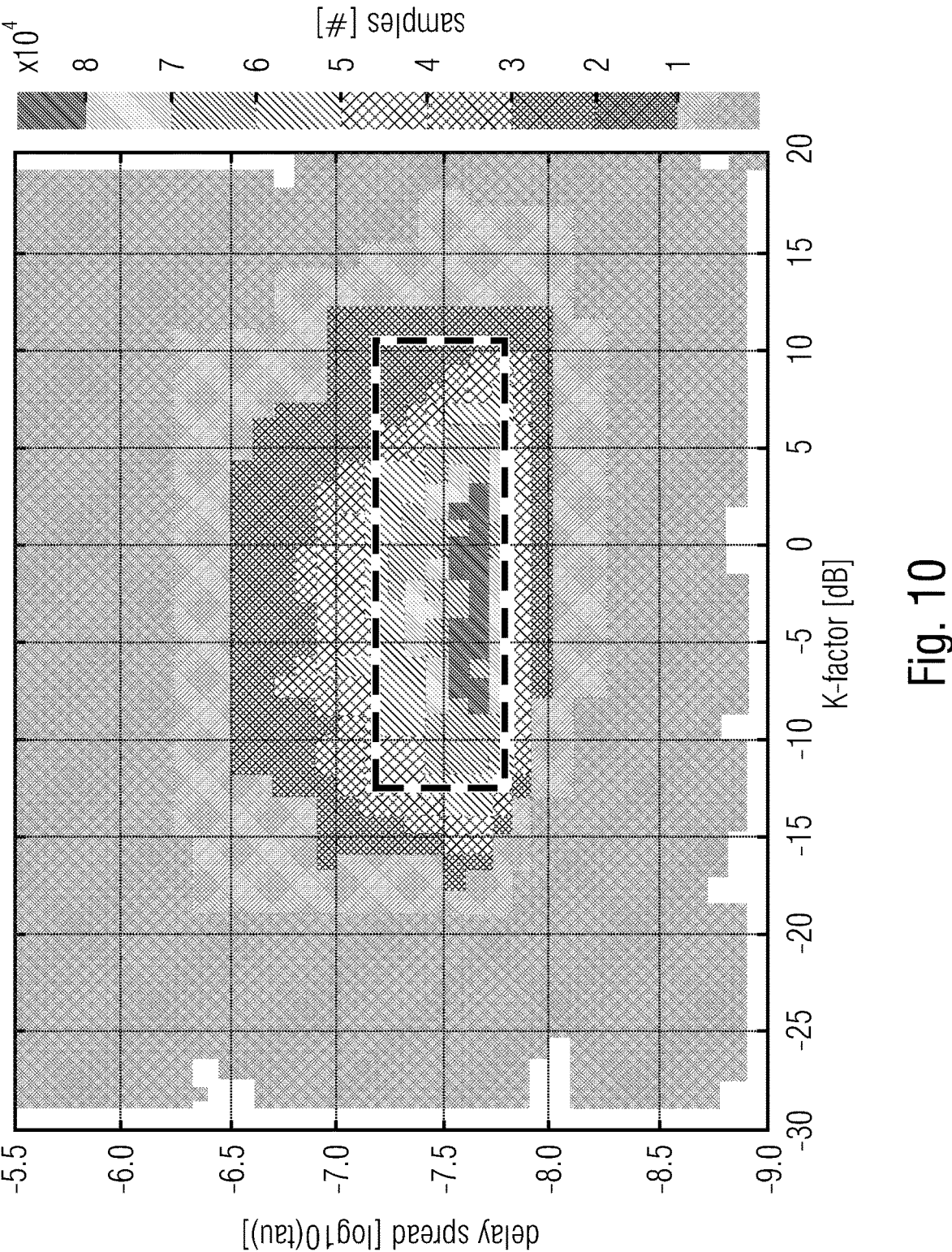
FIG. 10 shows a result according to an example.
Figure 11A:
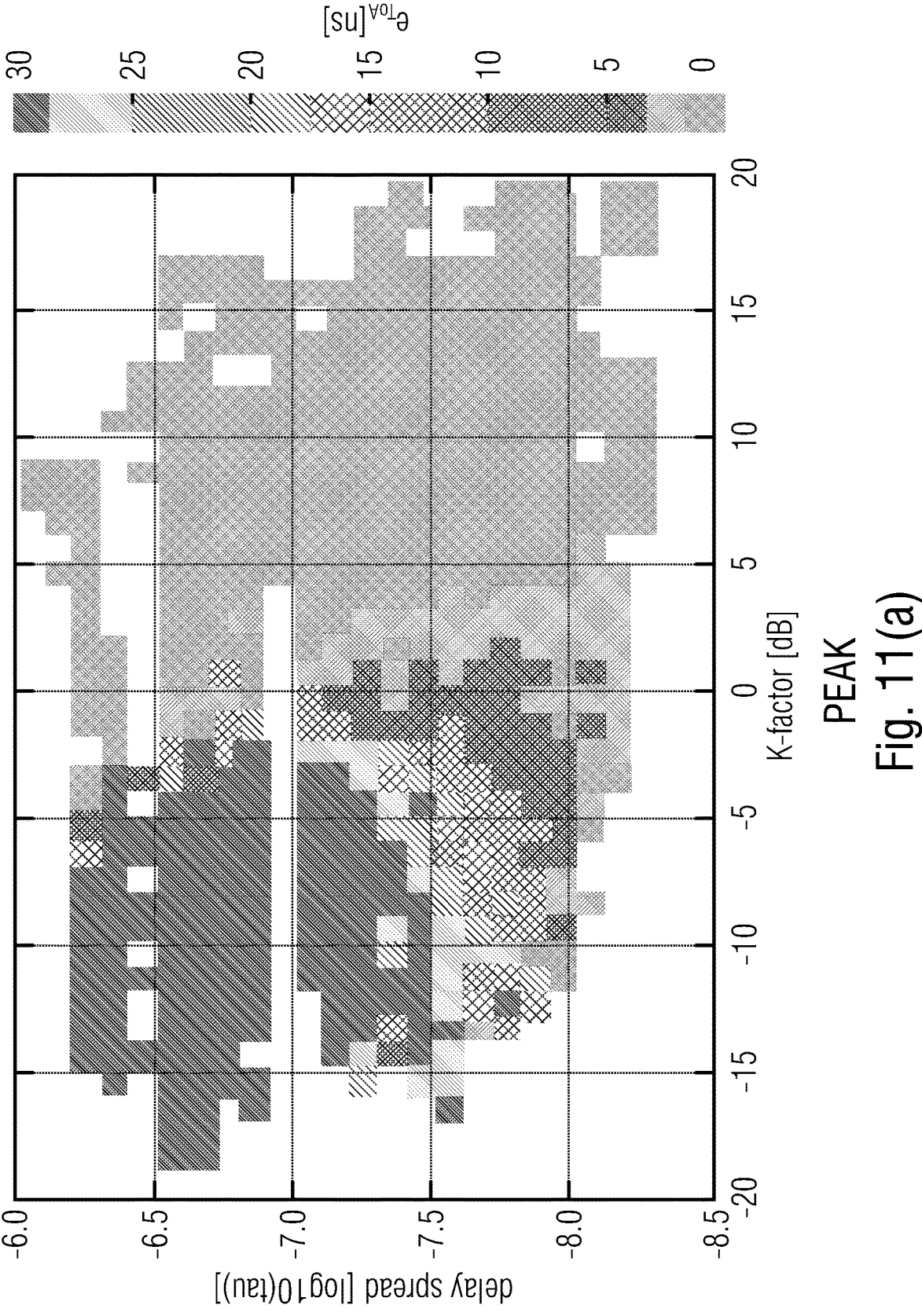
FIGS. 11($a$)-11($d$) show ToA error maps that shows the correlation among different parameters.
Figure 11B:
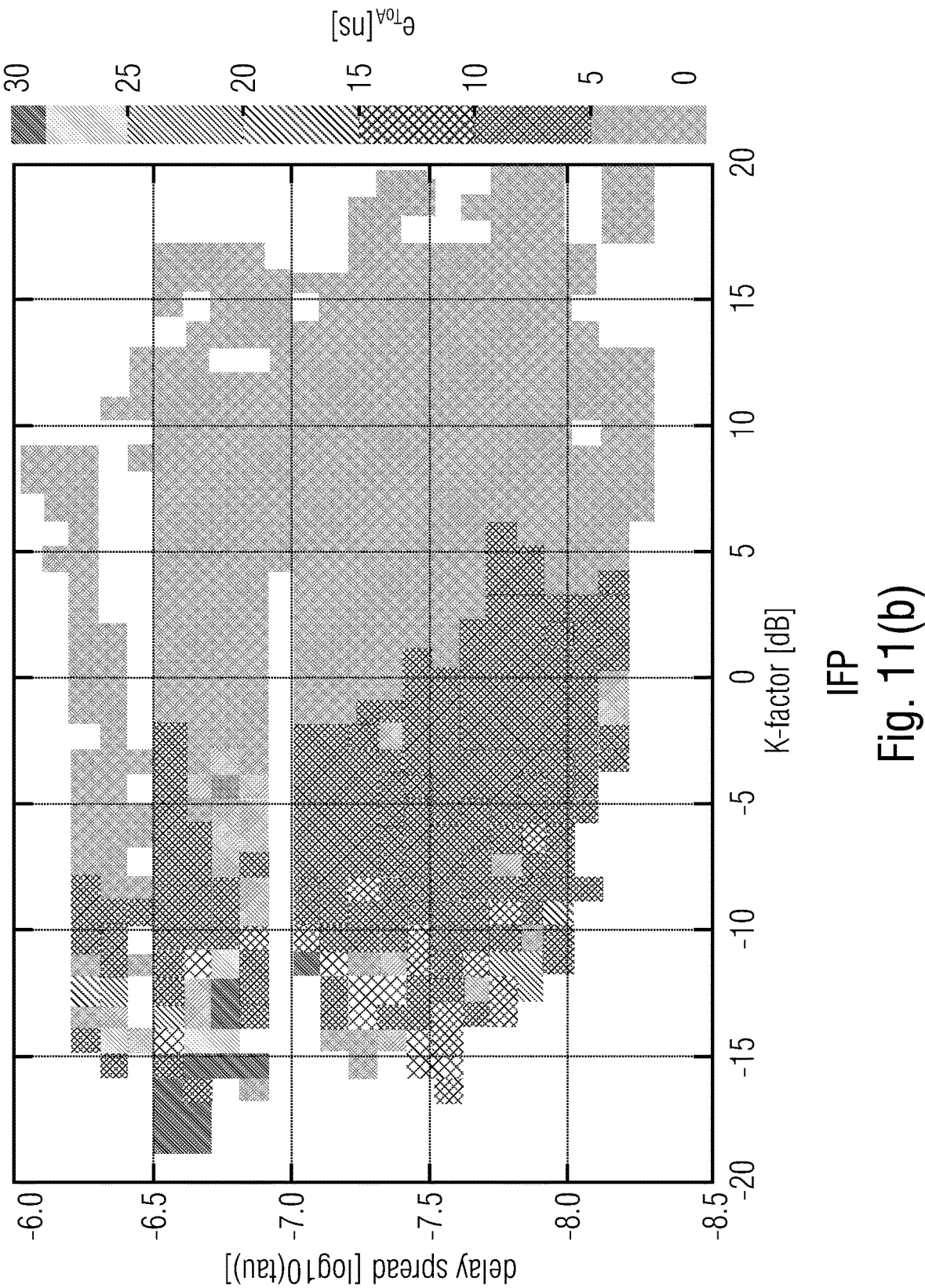
Figure 11C:
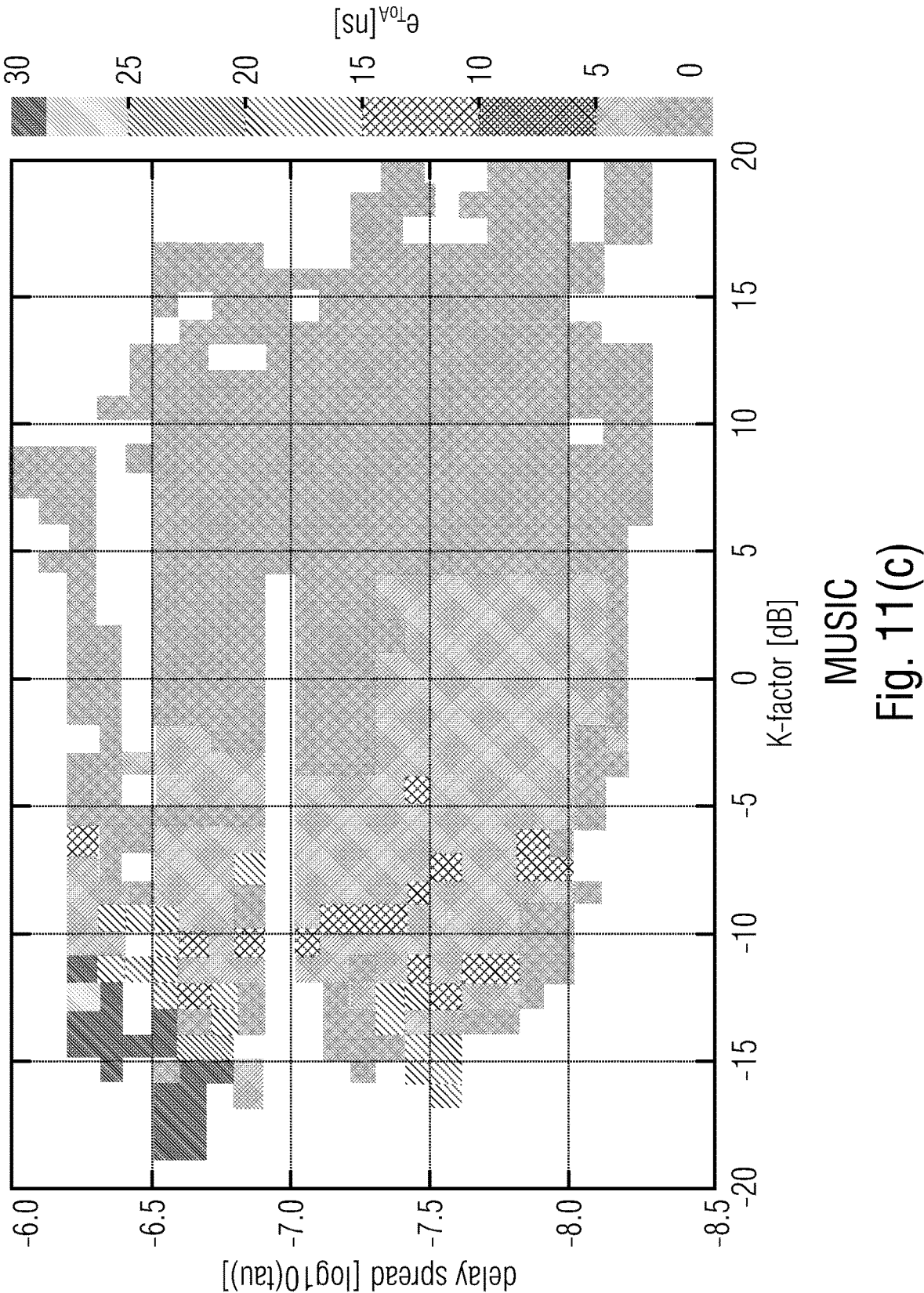
Figure 11D:
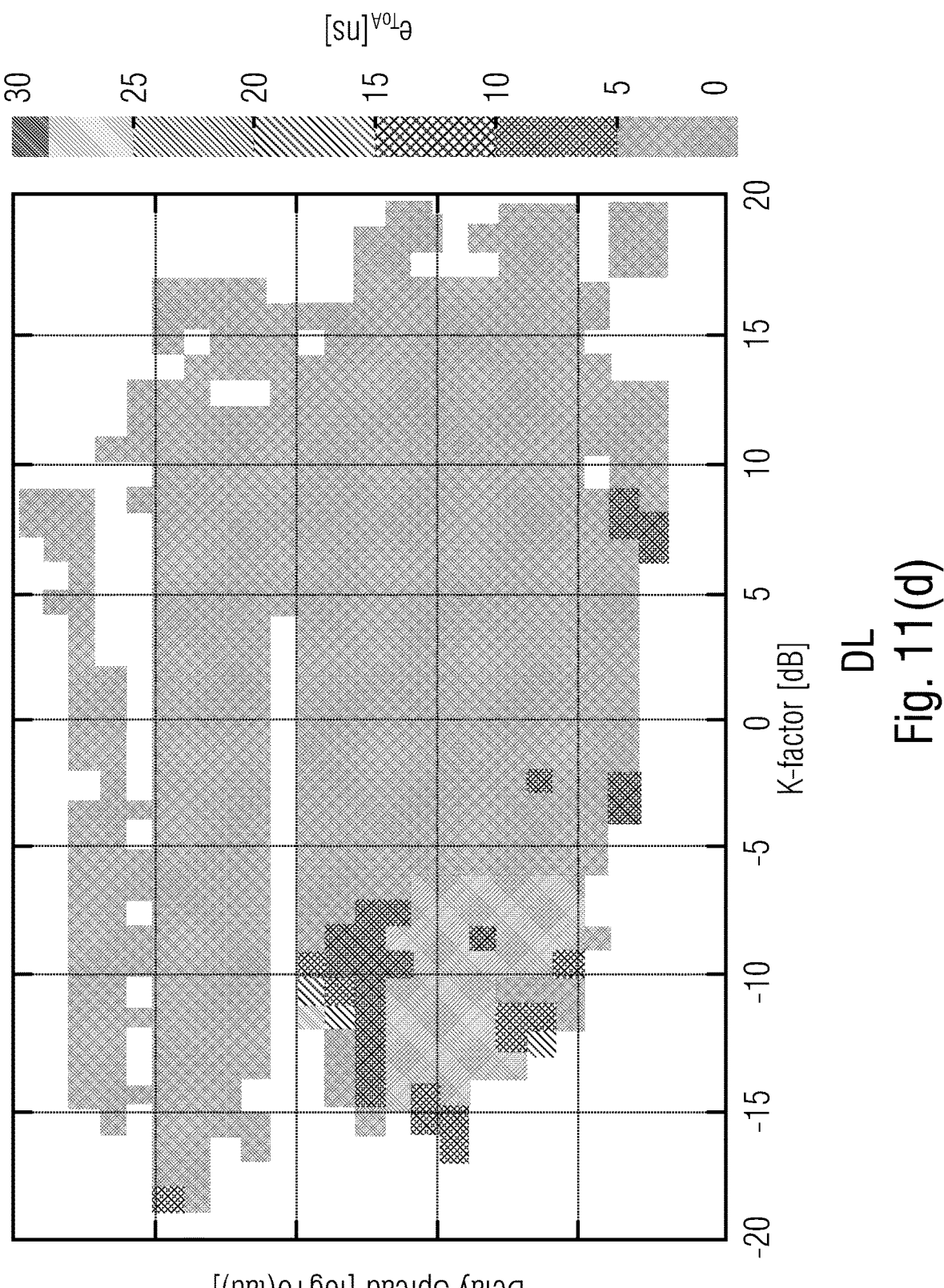

FIG. 10 shows Joint PDFs for the generalization benchmark (dataset split into data covered by the black rectangle and the remaining data).

6.3 Importance of KF in Indoor Environments

From the previous experiments we know that with a lower KF and higher DS (i.e., with stronger multipath components) the performance of all methods decreases. While DS correlates with the bandwidth (which was fixed in our experiments), the performance in terms of variations of only KF is still unclear.

To investigate this, we evaluated all methods on special subsets of the challenging S4 dataset. We separated the dataset and split the data by three intervals of KF to create three types of training and test datasets: S6.1 (KF>10), S6.2 (KF≤0), and S6.3 (all available KFs). For reasons of fairness and comparability, we optimized and trained all methods on subsets of S6.x scenarios with a KF≥0, 60% training data and 30% test data. Note that DL uses 10% validation data as part of its training phase.

FIG. 6(*a*)-6*c* show CDFs of the ToA error of all models on the 30% test datasets (in ns) of each experiment. We see that with KFs>0 (S6.1) all methods perform similarly. In contrast, with a smaller KF (S6.2) DL performs better than the others. On all KFs (S6.3) the results are more accurate than on S6.2, as there are many KF>0 available in the dataset that have a positive effect on the overall result. However, as expected they are still worse than in S6.1. FIG. 6(*d*) shows the $CDF_{80}$ accuracy of the ToA estimators over different KFs. We can see that for KFs>10 all models perform similarly. From KF<7.5, however, DL starts to outperform the other methods. By clearance, PEAK always yields the worst accuracy. From KF<5 to <−10, DL was always more accurate than the other methods. The higher the value of KF, the higher the error for PEAK, IFP, and MUSIC, while DL showed no significant outliers when its error increases almost linearly. Instead, at KF<0, PEAK no longer returns plausible results. While MUSIC slightly outperforms IFP in most cases when KF<5, DL always outperforms them considerably.

FIGS. 6.3(*a-d*) support these results and show the ToA error distribution as a heatmap over KF and DS. The smaller the KF and the higher the DS, the higher the error for all methods. From the left diagram (a) to the right diagram (d) we can see that the error decreases with the complexity of the procedure from the PEAK to the DL method.

FIGS. 11(*a*)-11(*d*) show a ToA error map that shows the correlation of KF, DS, and SR on S5 and an SNR=0 dB.

6.4 Generalization

PEAK, IFP, and MUSIC cannot generalize well to unknown environments and channel configurations, as they have to be optimized for each one to achieve plausible results. To examine DL's accuracy, robustness, and its ability to generalize on unknown data, we consider two experiments: G1 (interpolation) and G2 (interpolation from UMa to UMi).

G1: Interpolation of Different Channel Configurations. In this experiment we investigate the ability of DL to interpolate between two channel configurations. FIG. 10 shows the area between the two configurations. We cut the data from channel parameters from the boxed area and use data from the remaining channel configurations for training. We use the data from the box to test DL's ability to interpolate between the left- and right-hand sides (KF) and the top and bottom sides (DS). Hence, we split S6 into training −7.75>DS>−7.5 (above and below the box) and −10>KF>10 (left and right outside the box) and test-7.75<DS<−7.5 (above and below in the box) and −10<KF<10 (above and below in the box). We only used data with SNR=0 and SNR=20.

At SNR=20 dB, DL achieves a $CEP_{50}$ of 1.23, a $CEP_{75}$ of 2.56, a $CEP_{95}$ of 3.33, an MAE of 2.89, and an RMSE of 4.84, and at SNR=OdB, DL achieves a $CEP_{50}$) of 1.87, a CEP 75 of 2.99, a $CEP_{95}$ of 3.78, an MAE of 3.89, and an RMSE of 5.66. The results suggest that DL interpolates quite well between known data distributions, as the error increases only slightly from DL's original results on S6 (RMSE at SNR=20: +0.22; RMSE at SNR=0: +0.40). Hence, DL can (re) construct (new) channel models if it sees surrounding information in the training phase.

G2: Interpolation from UMi to UMa. In this experiment we investigate the ability of DL to process an unknown channel configuration. To test this, we trained on the complete S2 training dataset (UMi) and tested on the complete S3 test dataset (UMa), see FIG. 5. As UMa (S3) overlaps with UMi (S2) (similar to G1), the model may interpolate between those two configurations.

The results show that training DL on S2 and testing it on S3 works well: At SNR=20 dB, we achieve a $CEP_{50}$ of 1.35, a $CEP_{75}$ of 2.51, a $CEP_{95}$ of 3.31, an MAE of 3.76, and an RMSE of 3.87, and at SNR=OdB, we achieve a $CEP_{50}$ of 1.41, a $CEP_{75}$ of 2.98, a $CEP_{95}$ of 3.41, an MAE of 3.72, and an RMSE of 4.52. The results also show, that DL predicts almost the same results (SD<0.16 ns) as in S3. This supports our claim that a data-driven model can interpolate and reconstruct a gap in a data distribution.

6.5 Real-World Applicability

We conducted this experiment to evaluate the applicability of our DL method, which was trained on synthetic data, to real data. Since it is difficult in practice to acquire a ground truth estimate of the correct FDPoA (we would have to wire a mobile transmitter to a synchronized backend), we indirectly assessed the applicability in practice. To generate data that applies to a certain scenario in the real world, we estimate the DS and KF from real data that we captured in a study in our lab environment, and generate synthetic data from the estimated channel properties. FIG. 5 shows the measured distribution. The limited bandwidth and SNR of our system records limit the accuracy of the DS and KF estimates. We also observed that the recorded real data cover only a small part of the environment that is covered by our synthetic data.

We have derived the following channel requirements for our laboratory from the recorded data: high KF (>0), low DS (<7.75), i.e. correlation peak of LOS and overlap in near echoes, different SNRs, switching burst interference, different propagation conditions, jitter effects of ToA, synthetic noise-level corresponds to the settings for noise figure and gain of the radio tuner, and the signal level represents the signal strength. From there we configure QuaDRiGa based on S5 to provide synthetic data with these typical propagation conditions. We train DL on 60% of the data and test it on 30%. The results (CEP 50)=0.98, CEP 75=1.21, CEP 95=1.65, MAE=1.42, RMSE=2.13) show slightly lower errors for the real data than for S5. This suggests that our approach with QUADRIGa offers an even more complex and challenging channel configuration than in real scenarios. In any case, our DL-based approach lowers all errors of the ToA estimation.

Of course we will examine the applicability of our method to data that we collect in real scenarios with ground truth FDPoAs. However, for obvious technical reasons, the latter are difficult to acquire in the OLOS and NLOS scenarios.

7. Conclusion

This document proposes, inter alia, a novel data-driven ToA estimator that works directly on channel impulse responses. We lined out the details of our signal processing and our experiments show that data-driven approaches such as DL estimate ToAs accurately and in most cases also outperform known ToA estimators significantly. The difference becomes clear in the scenarios in which nonlinear effects such as multipath effects (scattering, attenuation, defraction, and refraction) are present and where the LoS is distorted by reflections.

Our experiments show an improvement of 26% over known technology on average. Even with SNRs below-10 dB there is an improvement of 17% on average. In addition, we showed that DL (which was trained on synthetic data) does not require any fine-tuning to work well on real data.

Further Examples

Even though some aspects have been described within the context of a method, it is understood that said aspects also represent a description of the corresponding device or a system, so that a block or a structural component of a device is also obtained from a corresponding method step or as a feature of a method step. Aspects that have been described in connection with or as a method step also represent a description of a corresponding block or detail or feature of a corresponding device. Some or all of the method steps may be performed by a hardware device (or while using a hardware device), such as a microprocessor, a programmable computer or an electronic circuit. In some examples, some or several of the most important method steps may be performed by such a device.

Depending on specific implementation requirements, examples of the present disclosure may be implemented in hardware or in software. Implementation may be affected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some examples in accordance with the preset disclosure thus comprise a data carrier which comprises electronically readable control signals that are capable of cooperating with a programmable computer system such that any of the methods described herein is performed.

Generally, examples of the present disclosure may be implemented as a computer program product having a program code, the program code being effective to perform any of the methods when the computer program product runs on a computer.

The program code may also be stored on a machine-readable carrier, for example.

Other examples include the computer program for performing any of the methods described herein, said computer program being stored on a machine-readable carrier.

In other words, an example of the inventive method thus is a computer program which has a program code for performing any of the methods described herein, when the computer program runs on a computer.

A further example of the inventive methods thus is a data carrier (or a digital storage medium or a computer-readable medium) on which the computer program for performing any of the methods described herein is recorded.

A further example of the inventive method thus is a data stream or a sequence of signals representing the computer program for performing any of the methods described herein. The data stream or the sequence of signals may be configured, for example, to be transferred via a data communication link, for example via the internet.

A further example includes a processing means, for example a computer or a programmable logic device, configured or adapted to perform any of the methods described herein.

A further example includes a computer on which the computer program for performing any of the methods described herein is installed.

A further example includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some examples, a programmable logic device (for example a field-programmable gate array, an FPGA) may be used for performing some or all of the functionalities of the methods described herein. In some examples, a field-programmable gate array may cooperate with a microprocessor to perform any of the methods described herein. Generally, the methods are performed, in some examples, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP Radio Access Network Working Group, et al., "Study on channel model for frequencies from 0.5 to 100 ghz (release 16)," tech. rep., 3GPP TR 38.901, 2020.

[2] C. S. Chen, "Artificial neural network for location estimation in wireless communication systems," *Sensors*, vol. 12, no. 1, pp. 2798-2817, 2012.

[3] M. Comiter, M. Crouse, and H. T. Kung, "A structured deep neural network for data driven localization in high frequency wireless networks," *Intl. J. Computer Networks and Comm.*, vol. 9, no. 1, pp. 21-39, 2017.

[4] X. Cui, H. Zhang, and T. A. Gulliver, "Threshold selection for ultra-wideband toa estimation based on neural networks," *J. Networks*, vol. 7, no. 9, pp. 1311-1318, 2012.

[5] S. Ergut, R. Rao, O. Dural, and Z. Sahinoglu, "Localization via tdoa in a uwb sensor network using neural networks," in *Proc. Intl. Conf. Communic.*, pp. 2398-2403, Beijing, China, 2008.

[6] T. v. d. Grun, N. Franke, D. Wolf, N. Witt, and A. Eidloth, "A real-time tracking system for football match and training analysis," in *Microelectronic Systems*, pp. 199-212, Springer Berlin, 2011.

[7] K. Haneda, J. Zhang, L. Tan, G. Liu, Y. Zheng, H. Asplund, J. Li, Y. Wang, D. Steer, C. Li, et al., "5 g 3gpp-like channel models for outdoor urban microcellular and macrocellular environments," in *Vehicular Technology Conf.* (VTC), pp. 1-7, Montreal, Canada, 2016.

[8] G. Hofmann and M. Breiling, "Device and method for determining a time of arrival of a receive sequence," 2009. U.S. Pat. No. 7,627,063.

[9] J. Xiao, "A survey on wireless indoor localization from the device perspective," *ACM Computing Surveys*, vol. 49, no. 2, pp. 1-9, 2016.

[10] G. Mendoza Silva, J. Torres-Sospedra, and J. Huerta, "A meta-review of indoor positioning systems," *Sensors*, vol. 19, no. 20, pp. 4507-4531, 2019.

[11] J. Yunye, S. Wee-Seng, and W. Wai-Choong, "Indoor localization with channel impulse response based fingerprint and nonparametric regression," *IEEE Trans. Wireless Communic.*, vol. 9, no. 3, pp. 1120-1127, 2010.

[12] K. Diederik P. and B. Jimmy, "Adam: A method for stochastic optimization," arXiv: 1412.6980, 2014.

[13] L. Weijie, Z. Tingting, and Z. Qinyu, "Experimental researches on an uwb nlos identification method based on machine learning," in *Proc. Intl. Conf. Comm. Tech.*, pp. 473-477, Guilin, China, 2013.

[14] G. Ä°smail, C. Chia-Chin, W. Fujio, and H. Inamura, "Nlos identification and weighted least-squares localization for uwb systems using multipath channel statistics," *J. Advances in Signal Processing (EURASIP)*, vol. 2008, no. 1, pp. 30-39, 2007.

[15] A. Niitsoo, T. Edelhäußer, and C. Mutschler, "Convolutional neural networks for position estimation in tdoa-based locating systems," in *Proc. Intl. Conf. Ind. Positioning and Ind. Nav.*, Nantes, France, 2018.

[16] A. Niitsoo, T. Edelhäußer, E. Eberlein, N. Hadaschik, and C. Mutschler, "Deep learning approach to position estimation from channel impulse responses," *J. Sensors*, vol. 19, no. 1064, pp. 1-24, 2019.

[17] S. U. Pillai and B. H. Kwon, "Forward/backward spatial smoothing techniques for coherent signal identification,"

*IEEE Trans. Acoustics, Speech, and Signal Processing*, vol. 37, no. 1, pp. 8-15, 1989.

[18] V. Savic, E. G. Larsson, J. Ferrer-Coll, and P. Stenumgaard, "Kernel methods for accurate uwb-based ranging with reduced complexity," *IEEE Trans. Wireless Communic.*, vol. 15, no. 3, pp. 1783-1793, 2016.

[19] P. Singh and S. Agrawal, "Tdoa based node localization in wsn using neural networks," in *Proc. Intl. Conf. Communication Systems and Network Technologies*, pp. 400-404, Gwalior, India, 2013.

[20] M. Stahlke, S. Kram, C. Mutschler, and T. Mahr, "Nlos detection using uwb channel impulse responses and convolutional neural networks," in *Intl. Conf. on Localization and GNSS*, Gothenburg, Sweden, 2020.

[21] J. Tiemann, J. Pillmann, and C. Wietfeld, "Ultra-wideband antenna-induced error prediction using deep learning on channel response data," in *Proc. Vehic. Techn. Conf.*, pp. 1-5, Sydney, Australia, 2017.

[22] S. Y. M. Vaghefi and R. M. Vaghefi, "A novel multilayer network model for toa-based localization in wireless sensor networks," in *Proc. Int. Conf. Neural Networks*, pp. 3079-3084, San Jose, CA, 2011.

[23] X. Wang, X. Wang, and S. Mao, "Cifi: Deep convolutional neural networks for indoor localization with 5 ghz wi-fi," in *Proc. Intl. Conf. Communic.*, pp. 1-6, Paris, France, 2017.

[24] W. Xuyu, G. Lingjun, M. Shiwen, and P. Santosh, "Csi-based fingerprinting for indoor localization: A deep learning approach," *IEEE Trans. Vehicular Technology*, vol. 66, no. 1, pp. 763-776, 2017.

[25] D. B. Williams and V. K. Madisetti, *Detection: Determining the number of sources*. Boca Raton, FL: CRC Press Inc., 1999.

[26] C. Xiao, D. Yang, Z. Chen, and G. Tan, "3-d ble indoor localization based on denoising autoencoder," *IEEE Access*, vol. 5, no. 1, pp. 12751-12760, 2017.

[27] L. Yu, M. Laaraiedh, S. Avrillon, and B. Uguen, "Fingerprinting localization based on neural networks and ultra-wideband signals," in *Proc. Intl. Symp. Signal Processing and Information Technology*, pp. 184-189, Bilbao, Spain, 2011.

[28] B. Alavi and K. Pahlavan, "Modeling of the distance error for indoor geolocation," in *IEEE Wireless Communic. and Networking*, pp. 668-672, Nantes, France, 2003.

[29] S. Bai, J. Z. Kolter, and V. Koltun, "An empirical evaluation of generic convolutional and recurrent networks for sequence modeling," arXiv:1803.01271, 2018.

[30] D. Dardari, C.-C. Chong, and M. Win, "Threshold-based time-of-arrival estimators in uwb dense multipath channels," *IEEE Trans. on Communic.*, vol. 56, no. 8, pp. 1366-1378, 2008.

[31] C. Falsi, D. Dardari, L. Mucchi, and M. Z. Win, "Time of arrival estimation for uwb localizers in realistic environments," *J. Advances in Signal Processing (EURASIP)*, vol. 2006, no. 1, pp. 32-82, 2006.

[32] T. Feigl, T. Nowak, M. Philippsen, T. Edelhäußer, and C. Mutschler, "Recurrent neural networks on drifting time-of-flight measurements," in *Intl. Conf. Ind. Positioning and Ind. Navigation*, Nantes, France, 2018.

[33] T. Feigl, S. Kram, P. Woller, R. H. Siddiqui, M. Philippsen, and C. Mutschler, "A bidirectional lstm for estimating dynamic human velocities from a single imu," in *Intl. Conf. Indoor Positioning and Indoor Nav.*, pp. 1-8, Nantes, France, 2019.

[34] T. Feigl, S. Kram, P. Woller, R. H. Siddiqui, M. Philippsen, and C. Mutschler, "Rnn-aided human velocity estimation from a single imu," *Sensors*, vol. 20, no. 13, pp. 3656-3690, 2020.

[35] L. B. Fertig and J. H. Mcclellan, "Instantaneous frequency estimation using linear prediction with comparisons to the desas," *IEEE Signal Processing Letters*, vol. 3, no. 2, pp. 54-56, 1996.

[36] I. Guvenc, C.-C. Chong, and F. Watanabe, "Joint toa estimation and localization technique for uwb sensor network applications," in *Vehicular Technology Conf.*, pp. 1574-1578, Dublin, Ireland, 2007.

[37] I. Guvenc, S. Gezici, and Z. Sahinoglu, "Ultra-wideband range estimation: Theoretical limits and practical algorithms," in *Intl. Conf. on Ultra-Wideband*, vol. 3, pp. 93-96, Hannover, Germany, 2008.

[38] I. Guvenc and C.-C. Chong, "A survey on toa based wireless localization and nlos mitigation techniques," *IEEE Communic. Surveys & Tutorials*, vol. 11, no. 3, pp. 107-124, 2009.

[39] B. Hanssens, E. Tanghe, D. P. Gaillot, M. Lienard, C. Oestges, D. Plets, L. Martens, and W. Joseph, "An extension of the rimax multipath estimation algorithm for ultra-wideband channel modeling," *Wireless Communic. and Networking*, vol. 2018, no. 1, pp. 164-176, 2018.

[40] Z. He, Y. Ma, and R. Tafazolli, "Improved high resolution toa estimation for ofdm-wlan based indoor ranging," *IEEE Wireless Communic. Letters*, vol. 2, no. 2, pp. 163-166, 2013.

[41] S. Jaeckel, L. Raschkowski, K. Borner, and L. Thiele, "Quadriga: A 3-d multi-cell channel model with time evolution for enabling virtual field trials," *IEEE Trans. on Antennas and Propagation*, vol. 62, no. 6, pp. 3242-3256, 2014.

[42] A. Jakobsson, A. L. Swindlehurst, and P. Stoica, "Subspace-based estimation of time delays and doppler shifts," *IEEE Trans. on Signal Processing*, vol. 46, no. 9, pp. 2472-2483, 1998.

[43] Y. Jin, W.-S. Soh, and W.-C. Wong, "Indoor localization with channel impulse response based fingerprint and nonparametric regression," *IEEE Trans. on Wireless Communic.*, vol. 9, no. 3, pp. 1120-1127, 2010.

[44] S. Kram, M. Stahlke, T. Feigl, J. Seitz, and J. Thielecke, "UWB Channel Impulse Responses for Positioning in Complex Environments: A Detailed Feature Analysis," *J. Sensors*, vol. 24, no. 1, 2019.

[45] J.-Y. Lee and R. A. Scholtz, "Ranging in a dense multipath environment using an uwb radio link," *Selected Areas in Communications*, vol. 20, no. 9, pp. 1677-1683, 2002.

[46] X. Li and K. Pahlavan, "Super-resolution toa estimation with diversity for indoor geolocation," *IEEE Trans. on Wireless Communic.*, vol. 3, no. 1, pp. 224-234, 2004.

[47] H. Li, N. Zheng, X. Song, and Y. Tian, "Fast estimation method of space-time two-dimensional positioning parameters based on hadamard product," *J. Antennas and Propagation*, vol. 2018, no. 1, pp. 1-9, 2018.

[48] C. Pelletier, G. I. Webb, and F. Petitjean, "Temporal convolutional neural network for the classification of satellite image time series," *J. Remote Sensing*, vol. 11, no. 5, pp. 523-548, 2019.

[49] F. Potort, A. Crivello, P. Barsocchi, and F. Palumbo, "Evaluation of indoor localisation systems: Comments on the iso/iec 18305 standard," in *Intl. Conf. Indoor Positioning and Indoor Nav.*, Nantes, France, 2018.

[50] M. Pourkhaatoun and S. A. Zekavat, *A review on TOA estimation techniques and comparison*. Hoboken, New Jersey: Wiley, 2011.

[51] A. Richter, *Estimation of radio channel parameters: Models and algorithms*. Ilmenau, Germany: ISLE, 2005.

[52] J. Rovnaková and D. Kocur, "Toa estimation and data association for through-wall tracking of moving targets," *J. Wireless Communic. and Networking (EURASIP)*, vol. 2010, no. 1, pp. 1-11, 2010.

[53] J. Salmi, A. Richter, and V. Koivunen, "Enhanced tracking of radio propagation path parameters using state-space modeling," in *European Signal Processing Conf.*, pp. 1-5, Florence, Italy, 2006.

[54] Radiocommunication Sector of ITU (ITU-R)-Spectrum Management, "Comparison of time-difference-of-arrival and angle-of-arrival methods of signal geolocation," tech. rep., SM.2211-2, 2018.

[55] H. Shi, H. Zhang, and X. Wang, "A tdoa technique with super-resolution based on the volume cross-correlation function," *IEEE Trans. on Signal Processing*, vol. 64, no. 21, pp. 5682-5695, 2016.

[56] L. Stoica, A. Rabbachin, and I. Oppermann, "A low-complexity noncoherent ir-uwb transceiver architecture with toa estimation," *Trans. on Microwave Theory and Techniques*, vol. 54, no. 4, pp. 1637-1646, 2006.

[57] A. J. Van der Veen, M. C. Vanderveen, and A. Paulraj, "Joint angle and delay estimation using shift-invariance techniques," *IEEE Trans. on Signal Processing*, vol. 46, no. 2, pp. 405-418, 1998.

[58] V. N. Vapnik, "An overview of statistical learning theory," *Trans. Neural Networks*, vol. 10, no. 5, pp. 988-999, 1999.

[59] J. Vidal and R. Jativa, "First arriving path detection for subscriber location in mobile communication systems," in *Intl. Conf. Acoustics, Speech, and Signal Processing*, pp. 2721-2733, Orlando, FL, 2002.

[60] J. Vidal, M. Najar, and R. Jativa, "High resolution time-of-arrival detection for wireless positioning systems," in *Proc. Intl. Conf. Vehicular Technology*, pp. 2283-2287, Miami Beach, Florida, 2002.

[61] P. Wang, Y. Cao, C. Shen, L. Liu, and H. T. Shen, "Temporal pyramid pooling-based convolutional neural network for action recognition," *IEEE Trans. Circuits and Systems for Video Technology*, vol. 27, no. 12, pp. 2613-2622, 2016.

[62] R. Wang, C. U. Bas, Z. Cheng, T. Choi, H. Feng, Z. Li, X. Ye, P. Tang, S. Sangodoyin, J. Gómez-Ponce, et al., "Enabling super-resolution parameter estimation for mm-wave channel sounding," *IEEE Trans. on Wireless Communic.*, vol. 19, no. 5, pp. 3077-3090, 2020.

[63] J. Winter and C. Wengerter, "High resolution estimation of the time of arrival for gsm location," in *Proc. Intl. Conf. Vehicular Technology*, pp. 1343-1347, Boston, MA, 2000.

[64] F. Zafari, A. Gkelias, and K. K. Leung, "A survey of indoor localization systems and technologies," *IEEE Communic. Surveys & Tutorials*, vol. 21, no. 3, pp. 2568-2599, 2019.

The invention claimed is:

1. A method for classifying a mobile antenna, exchanging predetermined transmitted signals with a fixed antenna, on the basis of a predetermined channel impulse response, CIR, from which a time-of-arrival measurement is to be performed, the method comprising:

using a neural network or a function approximator, which comprises a multidimensional polynomial function that learns a fitting function, for inferring from the CIRs of the predetermined transmitted signals, times of arrival of the predetermined transmitted signals exchanged between the mobile antenna and the fixed antenna, determining, based on the times of arrival, or channel impulse response condition characteristic, CIRCC, which is descriptive of channel impulse responses of the transmitted signals exchanged between the mobile antenna and the fixed antenna, a movement profile of the mobile antenna, analyzing the movement profile of the mobile antenna in terms of plausibility, in case of the movement profile of the mobile antenna being plausible, classifying the mobile antenna to a first antenna group, in case of the movement profile of the mobile antenna not being plausible, classifying the mobile antenna to a second antenna group.

2. The method of claim 1, further comprising, in case of classifying the mobile antenna to a second antenna group, to perform a further check for analyzing statistical data regarding measurements taken from the transmissions sent by the classified mobile antenna.

3. The method of claim 2, wherein the statistical data analyzed at the further check comprise the CIRCC of the signal from which the time of arrival has been acquired.

4. The method of claim 2, wherein the method comprises, if the further check reveals that the current neural network, or the function approximator, is incorrect, then using this conclusion for retraining the neural network, or the function approximator.

5. The method of claim 1, wherein the time of arrival measurement and times of arrival of the predetermined transmitted signals are relative times of arrival.

6. The method of claim 1, involving a plurality of receiving antennas.

7. The method of claim 1, wherein the neural network, or the function approximator, is trained using a method for training the neural network, or the function approximator, for inferring a predetermined time of arrival of a predetermined transmitted signal on the basis of channel-impulse-responses, CIRs, of transmitted signals between a mobile antenna and a fixed antenna, the method comprising:

acquiring a channel impulse response condition characteristic, CIRCC, which is descriptive of channel impulse responses of transmitted signals associated with mobile antenna positions within a reach of the fixed antenna;

generating, by simulation, a training set of simulated CIRs which are associated with different times of arrival in one or more simulated scenes, and which fit to the CIRCC; and training the neural network, or the function approximator, using the simulated CIRs and the different associated times of arrivals so as to acquire a parametrization of the neural network, or the function approximator, associated with the CIRCC.

8. The method of claim 1, wherein the neural network infers time of arrivals by performing a grid search on an input CIR by using weights acquired during the neural network training.

9. The method of claim 1, wherein the neural network performs a dropout by randomly discarding inferred values.

10. The method of claim 1, wherein the neural network performs a linear regression.

11. The method of claim 1, the neural network using a 1-dimensional kernel.

12. The method of claim 1, wherein the CIRCC comprises, for at least one spatial position, a large-scale parameter, LSP.

13. The method of claim 1, wherein the above-mentioned CIRCC comprises, for at least one spatial position, a Rician K-factor, KF.

14. The method of claim 1, wherein the above-mentioned CIRCC comprises, for at least one spatial position, a delay spread, DS.

15. The method of claim 1, wherein the above-mentioned CIRCC comprises a value roughly indicating how far multipath components are delayed.

16. The method of claim 1, wherein the above-mentioned CIRCC comprises, for at least one spatial position, a parameter expressed as a probability density function, PDF.

17. The method of claim 1, wherein the neural network is a supervised network.

18. The method of claim 1, wherein the neural network is an unsupervised network.

19. The method of claim 1, further comprising selecting, using a present CIRCC, out of a plurality of parametrizations associated with CIRCCs, a predetermined parametrization fitting to the present CIRCC, so that the neural network or the function approximator, so that the neural network is parametrized using the predetermined parametrization.

20. The method of claim 19, wherein selecting is performed during inference operations.

21. The method of claim 1, further comprising:

checking whether the CIRCC fits to a predetermined present CIRCC with which a predetermined parametrization of the neural network, or the function approximator, is parametrized, and as long as the check reveals that the CIRCC fits to the predetermined present CIRCC, inferring, using the neural network or the function approximator, parametrized using the predetermined parametrization, the times of arrival, and as soon as the present CIRCC no longer fits to the predetermined present CIRCC, initiate a compensation step in which the neural network, or the function approximator is retrained and/or reparametrized according to another parametrization.

22. The method of claim 1, further comprising checking whether the CIRCC is similar to a previously determined CIRCC, and, in case it is determined that the CIRCC fits to the previously determined CIRCC, the neural network or the function approximator is maintained, otherwise, in case it is determined that the CIRCC does not fit to the previously determined CIRCC, the neural network or the function approximator is maintained, the neural network or the function approximator is changed or retrained.

23. The method of claim 1, further comprising, in case of the mobile antenna being classified in the second group, retraining of the neural network or the function approximator.

24. The method of claim 1, wherein the method comprises analysing the CIRCC and, in case it is determined that a new neural network or the function approximator, or parametrization of the neural network or the function approximator, is needed, training a new neural network or function approximator.

25. A non-transitory digital storage medium having stored thereon a computer program for performing a method for classifying a mobile antenna, exchanging predetermined transmitted signals with a fixed antenna, on the basis of a predetermined channel impulse response, CIR, from which a time-of-arrival measurement is to be performed, the method comprising:

using a neural network or a function approximator, which comprises a multidimensional polynomial function that learns a fitting function, for inferring from the CIRs of the predetermined transmitted signals, times of arrival of the predetermined transmitted signals exchanged between the mobile antenna and the fixed antenna, determining, based on the times of arrival, or channel impulse response condition characteristic, CIRCC, which is descriptive of channel impulse responses of the transmitted signals exchanged between the mobile antenna and the fixed antenna, a movement profile of the mobile antenna, analyzing the movement profile of the mobile antenna in terms of plausibility, in case of the movement profile of the mobile antenna being plausible, classifying the mobile antenna to a first antenna group, in case of the movement profile of the mobile antenna not being plausible, classifying the mobile antenna to a second antenna group, when the computer program is run by a computer.

26. A user equipment, UE, for inferring a predetermined time of arrival of a predetermined transmitted signal on the basis of channel-impulse-responses, CIRs, of transmitted signals between the UE and a fixed antenna, the UE comprising a mobile antenna and being configured for:

intermittently acquiring a present channel impulse response condition characteristic, CIRCC, which is descriptive of CIRs of transmitted signals associated with UE positions within a reach of the fixed antenna;

checking whether the present CIRCC fits to a predetermined present CIRCC with which a predetermined parametrization of a neural network, or a function approximator which comprises a multidimensional polynomial function that learns a fitting function, is associated, and as long as the check reveals that the present CIRCC fits to the predetermined present CIRCC, inferring, using the neural network or the function approximator, parametrized using the predetermined parametrization, the predetermined time of arrival, and as soon as the present CIRCC no longer fits to the predetermined present CIRCC, cease the use of the neural network, or the function approximator, parametrized using the predetermined parametrization, for inferring the predetermined time of arrival, and/or initiate a compensation step in which the neural network, or the function approximator is analyzed and/or retrained.

27. The UE of claim 26, further comprising a sensor providing information suggesting a change of environment, the information suggesting the change of environment triggering a new session of intermittently acquiring a present CIRCC.

28. The UE of claim 27, wherein the sensor is an inertial sensor.

29. The UE of claim 27, wherein the sensor is global positioning navigation sensor.

30. The UE of claim 26, wherein the present CIRCC comprises, for at least one spatial position, a large-scale parameter, LSP.

31. The UE of claim 26, wherein the present CIRCC comprises, for at least one spatial position, a Rician K-factor, KF.

32. The UE of claim 26, wherein the present CIRCC comprises, for at least one spatial position, a delay spread, DS.

33. The UE of claim 26, wherein the present CIRCC comprises a value roughly indicating how far multipath components are delayed.

34. The UE of claim 26, wherein the present CIRCC comprises, for at least one spatial position, a parameter expressed as a probability density function, PDF.

35. A system for classifying a mobile antenna, exchanging predetermined transmitted signals with a fixed antenna, on the basis of a predetermined channel-impulse-response, CIR, from which a time-of-arrival measurement is to be performed, the system comprising the fixed antenna and being configured for:

using a neural network or a function approximator, which comprises a multidimensional polynomial function that learns a fitting function, for inferring, from the CIRs of the predetermined transmitted signals, times of arrival of the predetermined transmitted signals exchanged between the mobile antenna and the fixed antenna, determining, based on the time of arrival measurements, or channel impulse response condition characteristic, CIRCC, which is descriptive of channel impulse responses of the transmitted signals exchanged between the mobile antenna and the fixed antenna, a movement profile of the mobile antenna, analyzing the movement profile of the mobile antenna in terms of plausibility, in case of the movement profile of the mobile antenna being plausible, classifying the mobile antenna to a first antenna group, in case of the movement profile of the mobile antenna not being plausible, classifying the mobile antenna to a second antenna group.

* * * * *